United States Patent [19]
Trevett

[11] Patent Number: 5,546,532
[45] Date of Patent: Aug. 13, 1996

[54] DATA-ARRAY PROCESSING SYSTEM

[75] Inventor: Neil F. Trevett, Kingston-upon-Thames, United Kingdom

[73] Assignee: 3DLabs Limited, London, United Kingdom

[21] Appl. No.: 12,483

[22] Filed: Feb. 1, 1993

Related U.S. Application Data

[63] Continuation of PCT/GB90/01216, Aug. 3, 1990, published as WO92/02924, Feb. 20, 1992.

[51] Int. Cl.[6] .................................................. G06F 12/00
[52] U.S. Cl. ........................................ 395/164; 395/162
[58] Field of Search .................................. 395/162, 164, 395/165, 166, 400, 425, 427, 481, 483; 364/DIG. 1 MS File, DIG. 2 MS File; 345/207, 185, 112

[56] References Cited

U.S. PATENT DOCUMENTS

| 4,881,190 | 11/1989 | Priatko et al. | 364/718 |
| 4,954,966 | 9/1990 | Mooney et al. | 395/162 |
| 4,972,264 | 11/1990 | Bishop et al. | 358/183 |
| 5,111,385 | 5/1992 | Hattori | 364/DIG. 2 |

FOREIGN PATENT DOCUMENTS 328172  8/1989  European Pat. Off. .......... G06F 12/08

OTHER PUBLICATIONS

IBM Technical Disclosure Bulletin, vol. 30, No. 5, IBM Corp., Plc., (Armonk, New York, US), "Selective page updating", pp. 83–84.

Primary Examiner—Kee Mei Tung
Attorney, Agent, or Firm—Robert Groover; Betty Formby; Matthew Anderson

[57] ABSTRACT

A data-array processing system with a memory for storing an array of data-elements, a processor to perform a series of operations on data elements stored in a first section (832) of the memory and to copy data from the first section to a second section (830) of the memory after each series of operations, and output hardware, such a video processor and monitor, for outputting the data-elements in the second section. In order to reduce unnecessary copying of data-elements from the first section to the second section, the processor sets flags indicative of each of the of portions (e.g. P, Q, R, S) of the first section which is modified during that processing operation, and checks the flags during the subsequent copying operation to copy only the flagged portions.

20 Claims, 44 Drawing Sheets

VIRTUAL MEMORY SPACE

PAGE SELECTION

|  | IF 4px+mx<125 AND 4py+my<125 | IF 4px+mx>124 AND 4py+my<125 | IF 4px+mx<125 AND 4py+my>124 | IF 4px+mx>124 AND 4py+my>124 |
|---|---|---|---|---|
| IF bx≥mx AND by≥my | A | A | A | A |
| IF bx<mx AND by≥my | A | B | A | B |
| IF bx≥mx AND by<my | A | A | C | C |
| IF bx<mx AND by<my | A | B | C | D |

*FIG. 12*

PATCH ADDRESS INCREMENT SELECTION

X ADDRESS

| CONDITION | PATCH X ADDRESS |
|---|---|
| bx≥mx | px |
| bx<mx | px+1 |

*FIG. 13A*

Y ADDRESS

| CONDITION | PATCH Y ADDRESS |
|---|---|
| by≥my | py |
| by<my | py+1 |

*FIG. 13B*

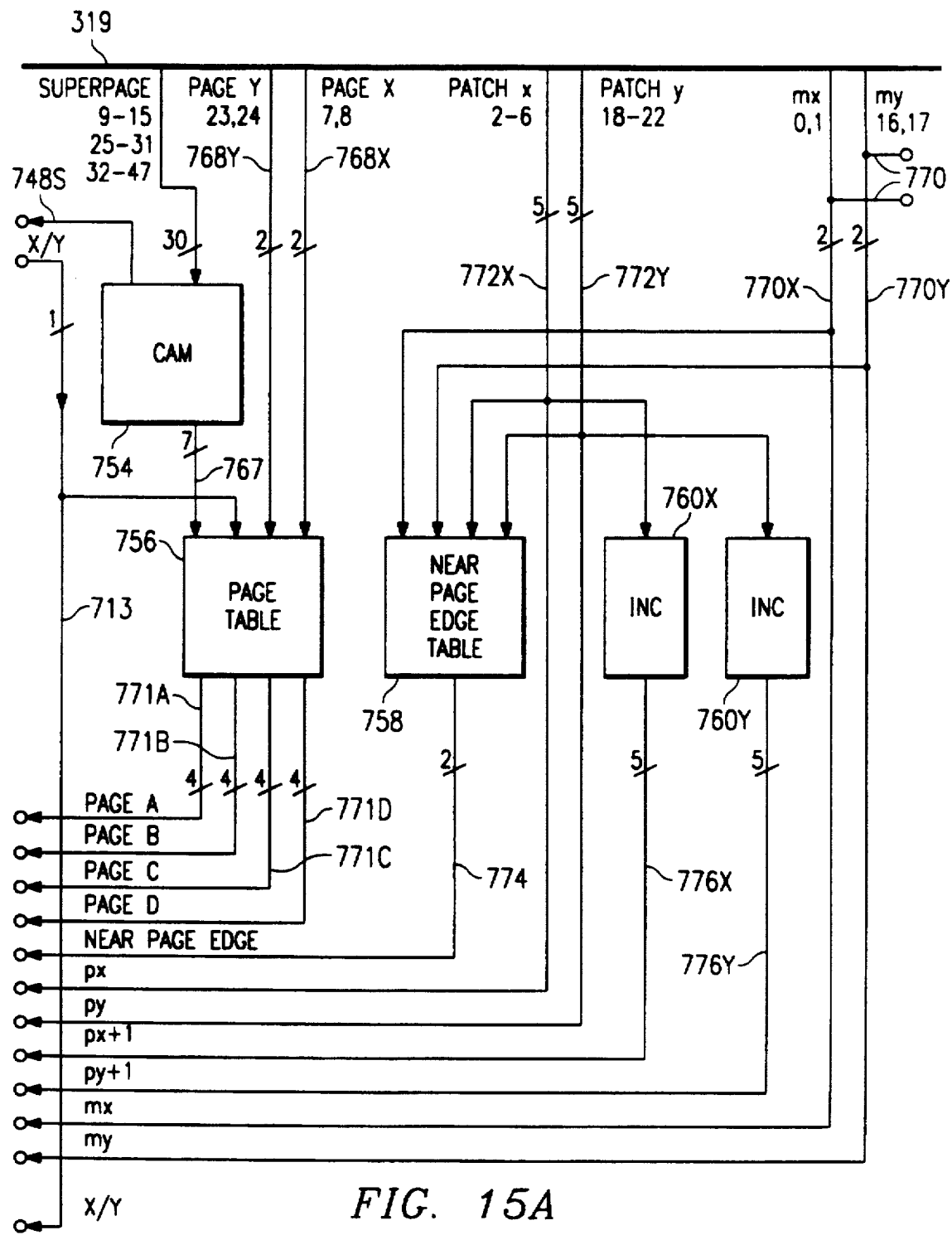
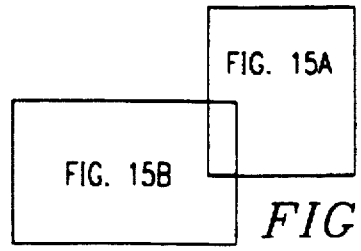
FIG. 15A
FIG. 15

FIG. 24

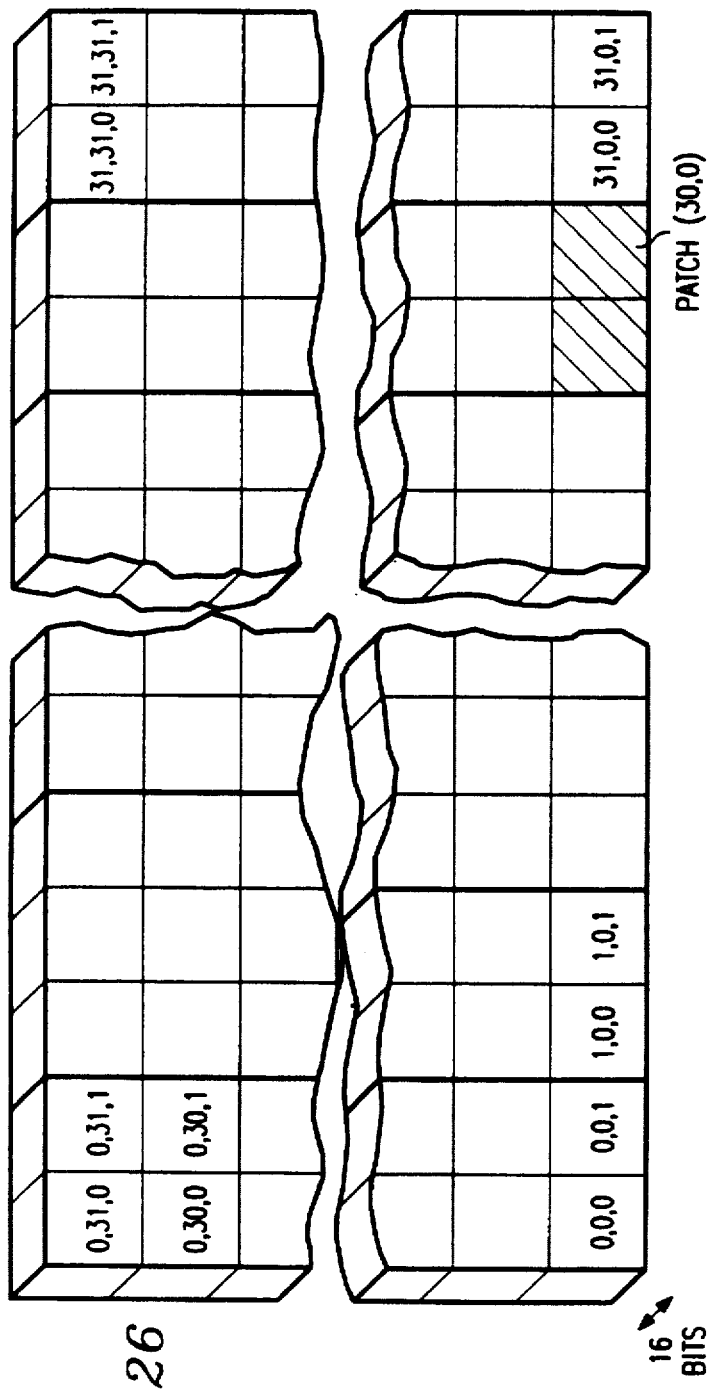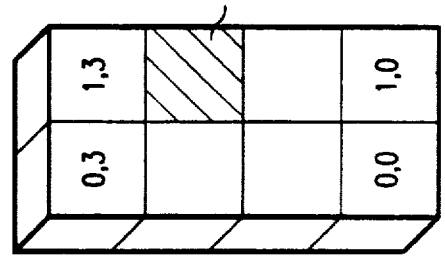
FIG. 26
FIG. 27

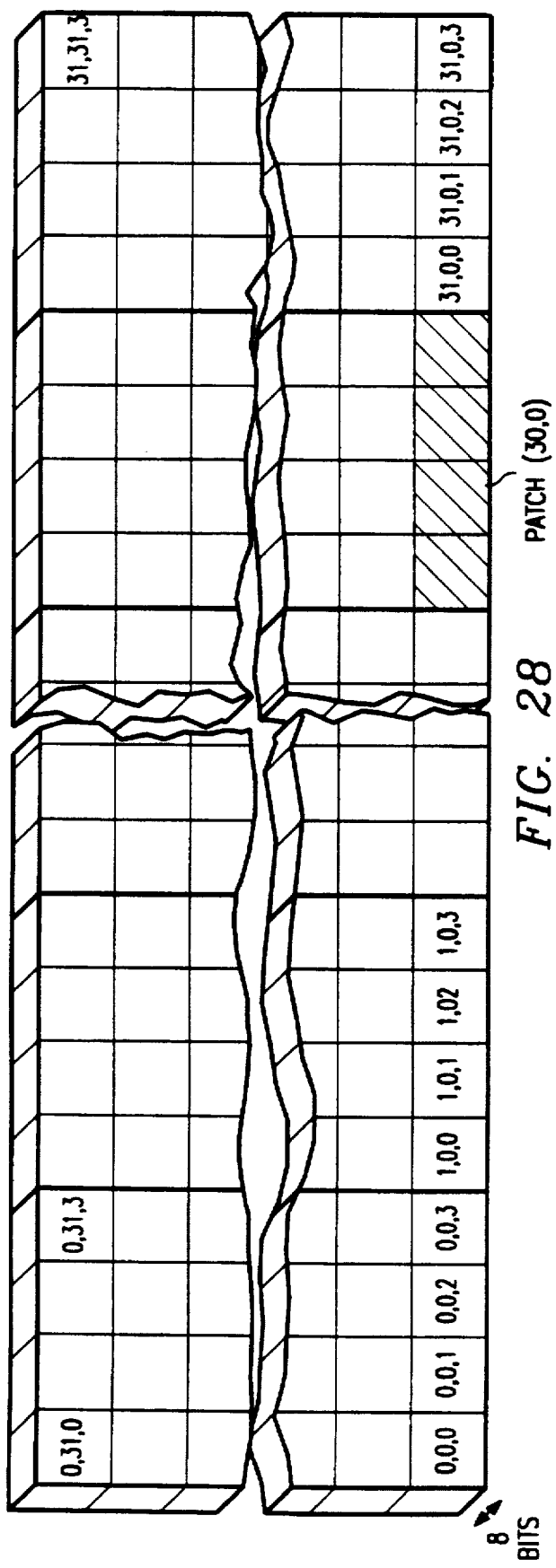
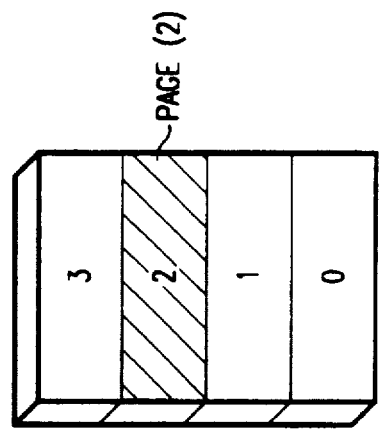
FIG. 28
FIG. 29

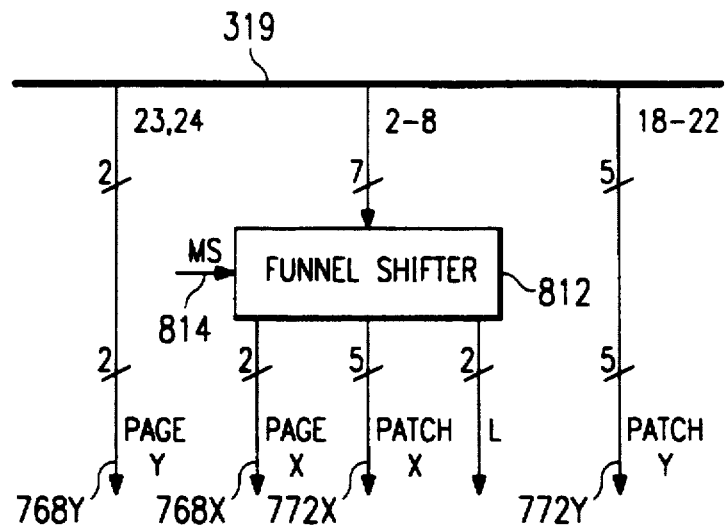
FIG. 30A
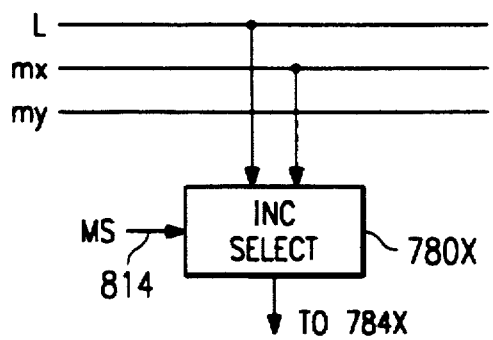
FIG. 30B
| CONDITION | | | PATCH X ADDRESS |
|---|---|---|---|
| 32-BIT L IGNORED | 16-BIT L=0 OR 1 | 8-BIT 0≤L≤3 | |
| bx≥mx | L=0 OR bx≥mx | L<>3 OR bx≥mx | px |
| bx<mx | L=1 AND bx<mx | L=3 AND bx<mx | px+1 |
FIG. 30C

VIRTUAL ADDRESS BITS

| MODE | 8 | 7 | 6 | 5 | 4 | 3 | 2 |
|------|---|---|---|---|---|---|---|
| 32-BIT | PAGE PX (2) | | patch px (5) | | | | |
| 16-BIT | PX (1) | px (5) | | | | | L (1) |
| 8-BIT | px (5) | | | | | L (2) | |

GENERAL ZSFT TABLE

| | 8-BIT MODE | | | | 16-BIT MODE | | 32-BIT |
|---|---|---|---|---|---|---|---|
| | IF L=0 | IF L=1 | IF L=2 | IF L=3 | IF L=0 | IF L=1 | |
| IF mx+x<4 | 0 | 1 | 2 | 3 | 0 | 2 | ALWAYS |
| IF mx+x>3 | 1 | 2 | 3 | 0 | 2 | 0 | 0 |

ZSFT TABLE 818b (x=1)
ZSFT (1), (5), (9), (13)

| mx \ L | 8-BIT MODE | | | | 16-BIT MODE | | 32-BIT |
|---|---|---|---|---|---|---|---|
| | 0 | 1 | 2 | 3 | 0 | 1 | |
| 0 | 0 | 1 | 2 | 3 | 0 | 2 | |
| 1 | 0 | 1 | 2 | 3 | 0 | 2 | ALWAYS |
| 2 | 0 | 1 | 2 | 3 | 0 | 2 | 0 |
| 3 | 1 | 2 | 3 | 0 | 2 | 0 | |

| CONDITION | | | |
|---|---|---|---|
| 32-BIT L=0 | 16-BIT L=0 OR 1 | 8-BIT 0≤L≤3 | |
| 4px+(4L)+mx<125 | 8px+4L+mx<253 | 16px+4L+mx<509 | NPEx=0 |
| 4px+(4L)+mx>124 | 8px+4L+mx>252 | 16px+4L+mx>508 | NPEx=1 |
| 4py+my<125 | 4py+my<125 | 4py+my<125 | NPEy=0 |
| 4py+my>124 | 4py+my>124 | 4py+my>124 | NPEy=1 |

GENERAL PWE TABLE

|  | 8-BIT MODE | | | | 16-BIT MODE | | 32-BIT |
|---|---|---|---|---|---|---|---|
|  | IF L=0 | IF L=1 | IF L=2 | IF L=3 | IF L=0 | IF L=1 |  |
| IF bx≥mx | 0001 | 0010 | 0100 | 1000 | 0011 | 1100 | ALWAYS 1111 |
| IF bx<mx | 0010 | 0100 | 1000 | 0001 | 1100 | 0011 |  |

PWE TABLE (bx=2)

| mx \ L | 8-BIT MODE | | | | 16-BIT MODE | | 32-BIT |
|---|---|---|---|---|---|---|---|
|  | 0 | 1 | 2 | 3 | 0 | 1 |  |
| 0 | 0001 | 0010 | 0100 | 1000 | 0011 | 1100 | ALWAYS 1111 |
| 1 | 0001 | 0010 | 0100 | 1000 | 0011 | 1100 |  |
| 2 | 0001 | 0010 | 0100 | 1000 | 0011 | 1100 |  |
| 3 | 0010 | 0100 | 1000 | 0001 | 1100 | 0011 |  |

| PAGE E' | PAGE C | PAGE D |
| PAGE B' | PAGE A | PAGE B |
| PAGE D' | PAGE C' | PAGE E |

PAGE A AT (PX,PY)
PAGE B AT (PX+1,PY); PAGE B' AT (PX-1,PY)
PAGE C AT (PX,PY+1); PAGE C' AT (PX,PY-1)
PAGE D AT (PX+1,PY+1); PAGE D' AT (PX-1,PY-1)
PAGE E AT (PX+1,PY-1); PAGE E' AT (PX-1,PY+1)

5,546,532

DATA-ARRAY PROCESSING SYSTEM

CROSS REFERENCE TO RELATED APPLICATIONS

This application claims priority from PCT/GB 90/01216, filed Aug. 3, 1990, published as WO92/02924, Feb. 20, 1992, and now expired.

BACKGROUND AND SUMMARY OF THE INVENTION

This invention relates to a data-array processing system.

The invention is concerned more particularly with a system having a memory for storing an array of data-elements, a processing means which can perform a series of processing operations on data-elements stored in a first section of the memory and which can perform a copying operation after each processing operation in which data-elements are copied from the first section to a second section of the memory, and means for outputting the data-elements in the second section of the memory. More particularly, but not exclusively, the data elements may be pixel data, the processing operations may be pixel rendering operations, the memory may be a video RAM, and the output means may be a monitor which displays the pixel data in the second section of the memory, leaving the first section of the memory hidden.

A problem with such a system as described above is that the copying of a complete image from the second section to the first section of the memory would absorb a significant amount of processor time, especially since it is an operation which would be required continuously in some applications, such as animation.

In accordance with the present invention, the processing means is operable in connection with a processing operation (such as a rendering operation) to set a respective flag indicative of the or each of a plurality of portions of the first (or hidden) section which is modified during that processing operation, and is operable during a subsequent copying operation to copy the or each flagged portion of the first section.

The present invention has evolved from a recognition that in many applications, only a small part of the data-array in the first section is modified in a typical processing operation, and the invention enables only the or each portion making up the modified part to be copied. By reducing the amount of copying which is carried out, a substantial increase in performance can be achieved.

Preferably, after each copying operation, the or each set flag is reset. The data-elements may be arranged to be stored in the memory as a plurality of aligned pages, and in this case a respective flag is provided for each page of data-elements in the first section of the memory. The invention may be employed in a demand-paged dual memory system having a second memory and in which the processing means is operable to transfer data-elements between the first-mentioned memory and the second memory page-by-page. In this case, the processing means is preferably operable in connection with a processing operation to set a respective second flag indicative of the or each page of data-elements which has been modified since that page has been stored in the first memory, and the processing means is operable, when a page in the first memory is to be replaced by a further page from the second memory, firstly to copy the page of data-elements in the first memory to the second memory, but only if the respective second flag is set, before copying the new page from the second memory to the first memory. In this case, preferably upon each copying operation of a page of data-elements from the second memory to the first memory, the second flag for that page of data-elements is reset. The invention may be employed in a system in which each page of data-elements is arranged in the first memory as a plurality of aligned patches of data-elements, with the processing means being operable to perform the processing operations on patches of data-elements stored in the first memory so that a processed patch can comprise data-elements from more than one patch. In this case each first flag preferably has associated therewith at least one further flag which is set when the rendered patch has data-elements in a respective further patch, and the processing means is operable during a copying operation from the first section to the second section of the first memory to copy the or each flagged further group of data-elements.

BRIEF DESCRIPTION OF THE DRAWING

Preferred embodiments of the invention will now be described, by way of non-limiting example, with reference to the drawings, in which FIGS. 4 to 11 and 42 to 45 are of major relevance to the present invention, and in which:

FIG. 4 is an illustration in greater detail of a renderer employed in the systems of FIGS. 1 to 3;

FIG. 5 is an illustration in greater detail of a front-end processor board employed in the systems of FIGS. 1 to 3;

FIG. 8 is a schematic illustration of a physical image memory and the address lines therefor, used in the renderer of FIG. 4;

FIG. 9B is a 2-D representation of a page, showing the patch of

FIG. 9A;

FIG. 11A is a 2-D representation of four pages in a virtual memory, showing a non-aligned patch which crosses the page boundaries and an enlargement of the circled part of the page boundary intersection;

FIG. 11C is a 3-D representation of the non-aligned patch of FIG. 11A;

FIG. 12 is a truth table showing how page selection is made for patches which cross page boundaries;

FIG. 13 shows two truth tables for selecting, respectively, X and Y patch address incrementation;

FIGS. 15A and 15B are schematic illustration in greater detail of an address translator of FIG. 14;

FIG. 24 is a table giving an example of the operation of the priority encoder of FIG. 22;

FIGS. 26 and 27 show how pages of patch data, and superpages of page data are made up in a 16-bit split patch system;

FIGS. 28 and 29 correspond to FIGS. 26 and 27 respectively in an 8-bit split patch system;

FIGS. 30A to C shows modifications of parts of the address translator of FIG. 15 used in the split patch system;

FIG. 42 is a representation of the VRAM memory space, showing how pages of data are rendered in one section of the memory and then copied to another monitoring section of the memory;

FIG. 43 shows a circuit for determining which pages need not be copied from the rendering section to the monitoring section and to the virtual memory;

FIG. 44 illustrates the setting and resetting of flags in a table of the circuit of FIG. 43;

HARDWARE OVERVIEW

DETAILED DESCRIPTION

Figure 1:
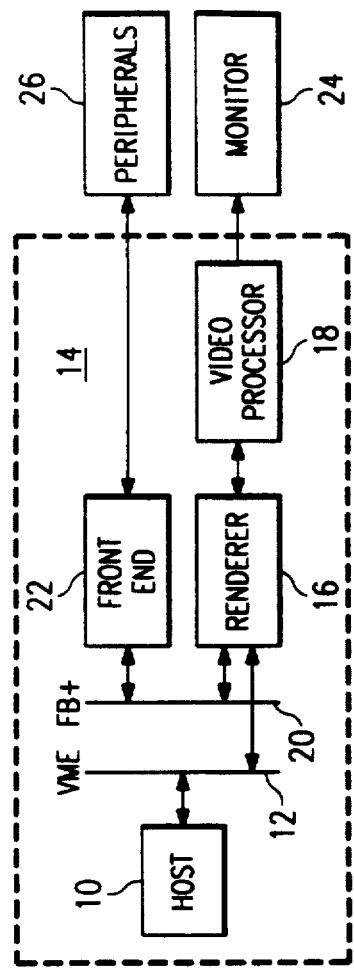
FIG. 1 is a nigh-level schematic illustration of a computer system embodying the invention.
Figure 2:
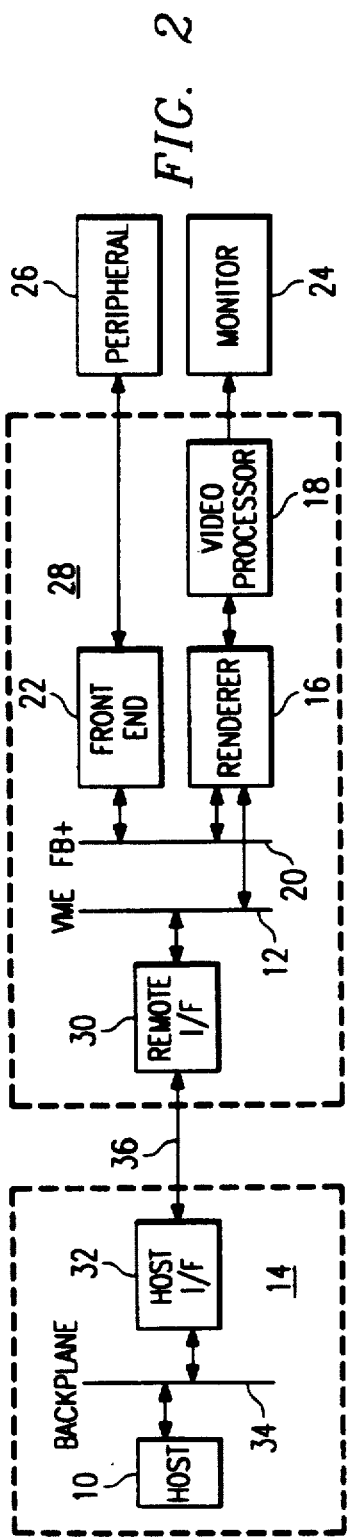
FIGS. 2 and 3 illustrations of modified forms of the system of FIG. 1.
Figure 3:
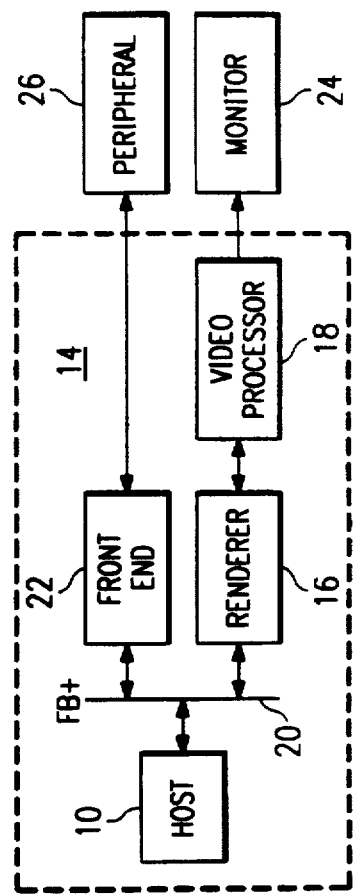

FIGS. 1 to 3 show three different hardware configurations of computer systems embodying the invention. Referring firstly to FIG. 1, a host computer 10 has its own backplane in the form of a VME bus 12 which provides general purpose communications between various circuit boards of the computer, such as processor, memory and disk controller boards. To this known configuation, and within a standard housing 14 for the computer 10, there is added a board on which is provided a renderer 16 and a video processor 18, a Futurebus+ 20, and a front-end board 22. The renderer 16 is connected to the VME bus 12 and the Futurebus+ 20, and also communicates with the video processor 18, which in turn drives an external colour monitor 24 having a high-resolution of, for example, 1280×1024 pixels. The front-end board 22 is also connected to the Futurebus+ 20 and can communicate with a selection of peripherals, which are illustrated collectively by the block 26. The configuration of FIG. 1 is of use when the host computer 10 has a VME backplane 12 and there is sufficient room in the computer housing 14 for the renderer 16, video processor 18, Futurebus+ 20 and front-end board 22, and may be used, for example, with a 'Sun Workstation'.

In the case where the computer housing 14 is physically too small, or where the host computer 10 does not have a VME or Futurebus+ backplane, the configuration of FIG. 2 may be employed. In FIG. 2, a separate housing 28 is used for the renderer 16, video processor 18, front-end board 22 and Futurebus+ 20, as described above, together with a VME bus 12 and a remote interface 30. In the host computer housing 14, a host interface 32 is connected to the backplane 34 of the host computer 10, which may be of VME, Qbus, Sbus, Multibus II, MCA, PC/AT, etc. format. The host interface 32 and remote interface 30 are connected by an asynchronous differential bus 36 which provides reliable communication despite the physical separation of the host and remote interfaces. The configuration of FIG. 2 is appropriate when the host computer 10 is, for example, an 'Apple Mackintosh', 'Sun Sparkstation', 'IBM-PC', or 'Du Pont Pixel Systems bRISC'.

In the event that a host computer becomes available which has a Futurebus+ backplane and sufficient space in its housing for the additional components, then the configuration of FIG. 3 may be employed. In FIG. 3, the renderer 16 and the front-end board 22 are directly connected to the Futurebus+ backplane 20.

The general functions of the elements shown in FIGS. 1 to 3 will now be described in more detail. The host computer 10 supplies data in the form of control information, high level commands and parameters therefor to the renderer 16 via the VME backplane (FIG. 1), via the backplane 34, host and remote interfaces 32, 30 and the VME bus 12 (FIG. 2), or via the Futurebus+ backplane 20 (FIG. 3). Some of this data may be forwarded to the front-end board via the Futurebus+ 20 (FIGS. 1 and 2), or sent direct via the Futurebus+ backplane 20 (FIG. 3) to the front-end board 22.

The Futurebus+ 20 serves to communicate between the renderer 16 and the front-end processor 22 and is used, in preference to a VME bus or the like, in view of its high bit width of 128 bits and its high bandwidth of about 500 to 800 Mbytes/s.

As will be decribed in greater detail below, the renderer 16 includes an image memory, part of which is mapped to the monitor 24 by the video processor 18, and the renderer serves to perform image calculations and rendering, that is the drawing of polygons in the memory, in accordance with the commands and parameter supplied by the host computer 10 or the front-end board 22.

The front-end board 22 serves a number of functions. It includes a large paging RAM, which also interfaces with external disk storage, to provide a massive paging memory, and pages of image data can be swapped between the paging RAM and the image memory of the renderer 16 via the Futurebus+ 20. The front-end board also has a powerful floating-point processing section which can be used for graphics transformation and shading operations. Furthermore, the front-end board may provide interfacing with peripherals such as a video camera or recorder, monitor, MIDI audio, microphone, SCSI disk and RS 232.

Overall, therefore, the renderer 16, video processor 18 and front-end board 22 can accelerate pixel handling aspects of an application, and also accelerate other computation intensive aspects of an application.

Figure 4:
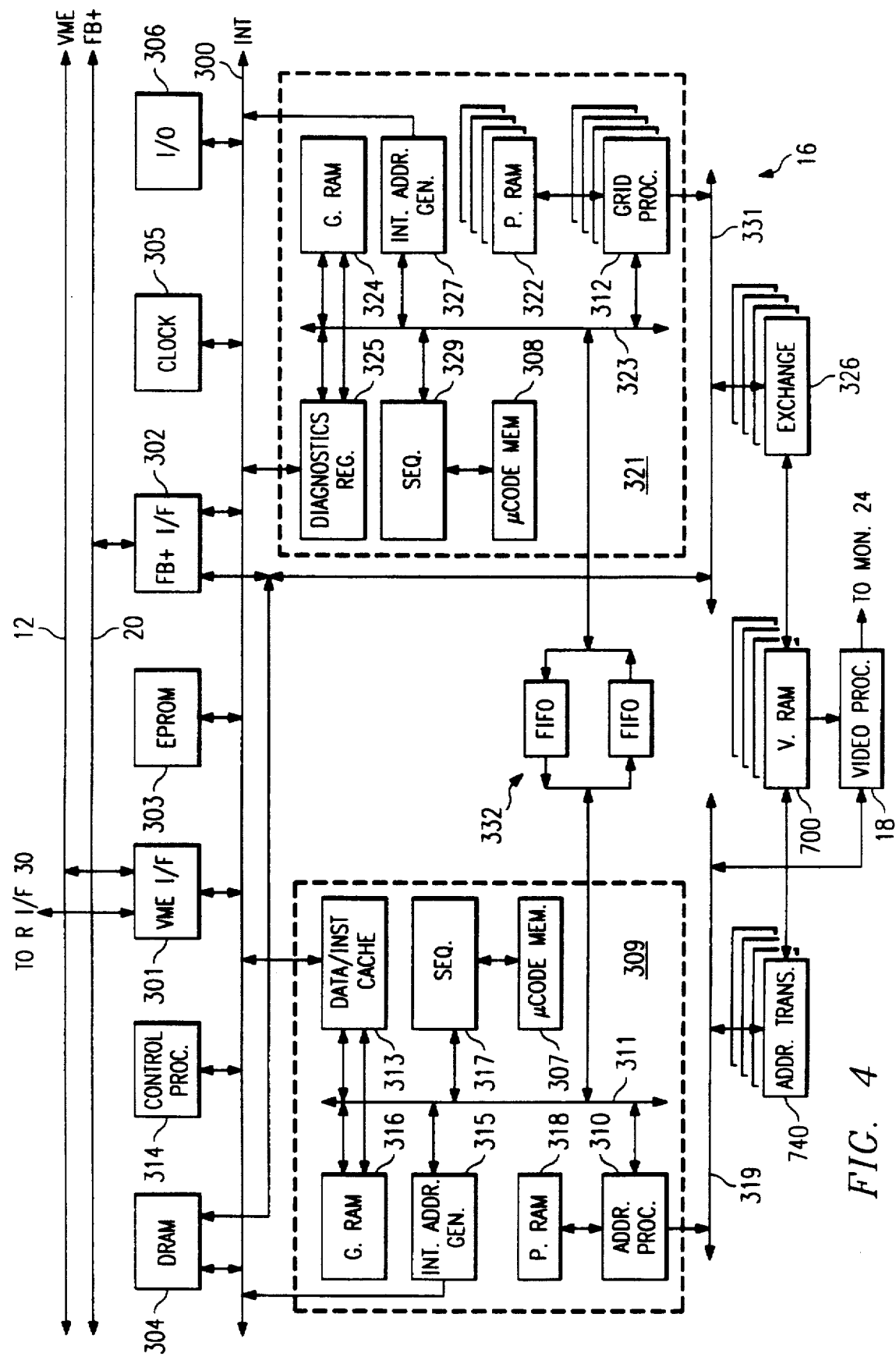

The renderer 16 and video processor 18 will now be described in greater detail with reference to FIG. 4, which shows the main elements of the renderer 16 and the main data and address pathways.

The renderer 16 includes a 32-bit internal bus 300, a VME interface 301 which interfaces between the VME bus 12 (FIG. 1) or the remote interface 30 (FIG. 2) and the internal bus 300, and a Futurebust+ interface 302 which interfaces between the Futurebus+ 20 and the internal bus 300. Also connecting to the internal bus 300 are a control processor 314 implemented by an Intel 80960i, an EPROM 303, 4 or 16 Mbyte of DRAM 304, a real time clock and an I/O block 306 including a SCSI ports. The functions of the control processor 314 and the associated DRAM 304 and EPROM 303 are (a) to boot-up and configure the system; (b) to provide resource allocation for local PRAM 318, 322 of address and grid processors 310, 312 (described in detail below) to ensure that there is no memory space collision; (c) to control the loading of microcode into microcode memories 307, 308 (described below); (d) to run application specific remote procedure calls (RPCs); and (e) to communicate via the I/O block 306 with a diagnostics port of the host computer 10 to enable diagnostics information to be displayed on the monitor 214. The DRAM 304 can also be used as a secondary image page store for the VRAM 700 described below.

The renderer 16 also includes an address processing section 309 comprising an address broadcast bus 311 to which are connected 64 kbyte of global GRAM 316, a data/instruction cache 313 which also connects to the internal bus 300, an internal bus address generator 315 which also connects to the internal bus 300, an address processor 310 with 16 kbyte of local PRAM 318, and a sequencer 317 for the address processor 310 which receives microcode from a microcode memory 307. The address processor 310 also connects to a virtual address bus 319. The main purpose of the address processing section 309 is to generate virtual addresses which are placed on the virtual address bus under control of microcode from the microcode memory 307.

Also included in the renderer 16 is an address translator 740 (described in further detail below) which receives the virtual addresses on the virtual address bus 319 and translates them into physical addresses of data in the video RAM 700, if the required data is present, or interrupts the address processor 310 to cause the required data to be swapped in from the paging RAM 304 or other page stores on the external buses, if the required data is not present in the VRAM 700.

The renderer 16 furthermore includes a data processing section 321 which is somewhat similar to the address processing section 309 and comprises a data broadcast bus 323, to which are connected 64 kbyte of global CRAM 324, a diagnostics register 325 which also connects to the internal bus 300 and which may be used instead of the I/O block 306 to send diagnostics information to the host computer 10, an internal bus address generator 327 which also connects to the internal bus 300, a grid processor 312 having sixteen processors each with 8 kbyte of local PRAM 322, and a sequencer 329 for the grid processor 312 which receives microcode from a microcode memory 308. The processors of the grid processor 312 also connect to a data bus 331. The main purpose of the data processing section 321 is to receive data on the data bus 331, process the data under control of microcode from the microcode memory 308, and to put the processed data back onto the data bus 331.

The physical VRAM 700 connects with the data bus 331 via an exchange 326 which is described in detail below, but which has the main purposes of shuffling the order of the sixteen pixels read from or written to the VRAM 700 at one time, as desired, to enable any of the sixteen processors in the grid processor 312 to read from or write to any of the sixteen addressed locations in the VRAM 700 and to enable any of the sixteen processors toe transfer pixel data to any other of the sixteen processors.

The last main element of the renderer 16 is a bidirectional FIFO 332 connecting between the broadcast buses 311, 323 of the address and data processing sections 309, 321, which enables virtual addresses to be transferred directly between these two sections.

Figure 5:
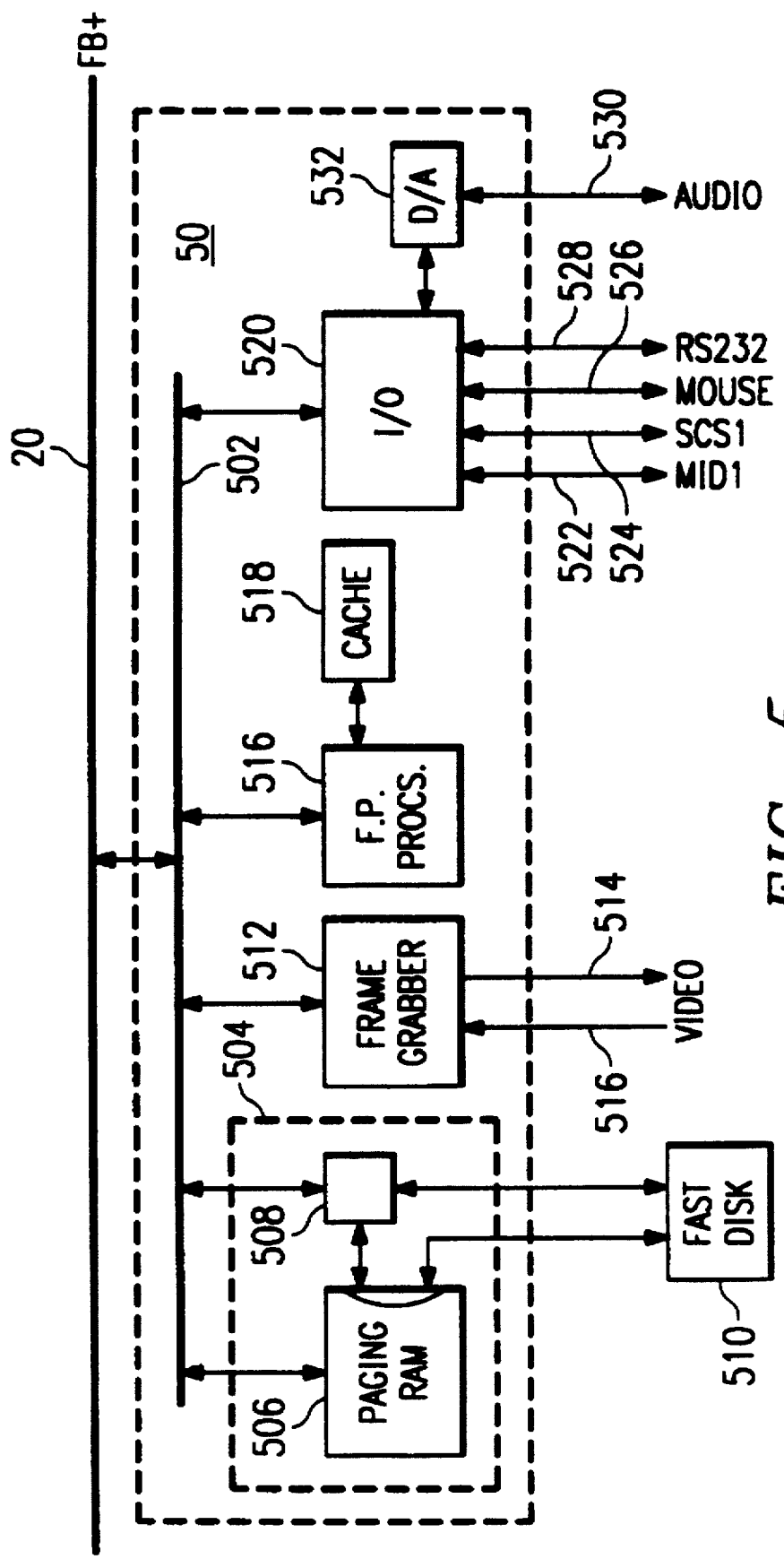

The front-end board 22 will now be described in greater detail with reference to FIG. 5.

The front-end board 22 has an internal bus 502 which communicates with the Futurebus+ 20, A paging memory section 504 is connected to the internal bus 502 and comprises a large paging RAM 506 of, for example, 4 to 256 Mbytes capacity which can be used in conjunction with the DRAM 304 of the renderer, a paging memory control processor 508, and connections to, for example, two external high speed IPI-2 disk drives 510 (one of which is shown) each of which may have a capacity of, for example, 4 Gbytes, and a data communication speed of 50 Mbytes/s, or two external SCSI drives. The paging RAM 506 enables an extremely large amount of pixel data to be stored and to be available to be paged into the renderer 32 as required, and the fast disk 510 enables even more pixel data to be available ready to be transferred into the paging RAM 506.

Floating point processing is provided by 1 to 4 Intel 80860 processors 516, each rated at 80 MFlops peak. The general purpose processing power can be used on dedicated tasks such as geometric pipeline processing, or to accelerate any part of an application which is compute-intensive, such as floating point fast Fourier transforms. Each of the floating point processors 516 has a 128 KByte secondary cache memory 518 in addition to its own internal primary cache memory.

The front-end board 22 may also, if desired, include a broadcast standard 24-bit frame grabber connected to the internal bus 502 and having a video input 514, and output 516 for connection to video camera or television-type monitor.

The front-end board 22 may also, if desired, include an input/output processor 520 which provides interfacing with MIDI on line 522. SCSI disk on line 524, at least one mouse on line 526, RS232 on line 528, and audio signals on line 530 via a bi-directional digital/analogue convertor 532.

VIDEO RAM AND ADDRESSING THEREOF

Now that an overview of the hardware of the whole system has been set out, the image memory configuration will be described in more detail.

Figure 6A:
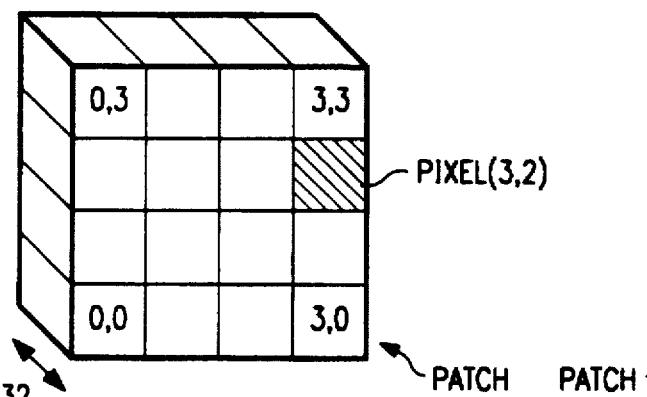
FIGS. 6A and 6B show how patches of pixel data are made up.
Figure 6B:
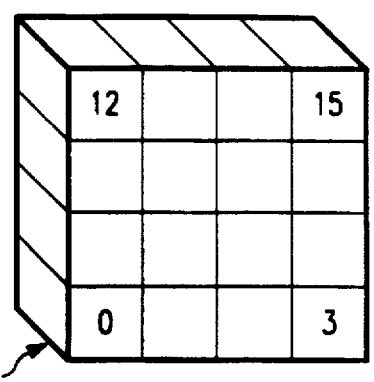
Figure 7A:
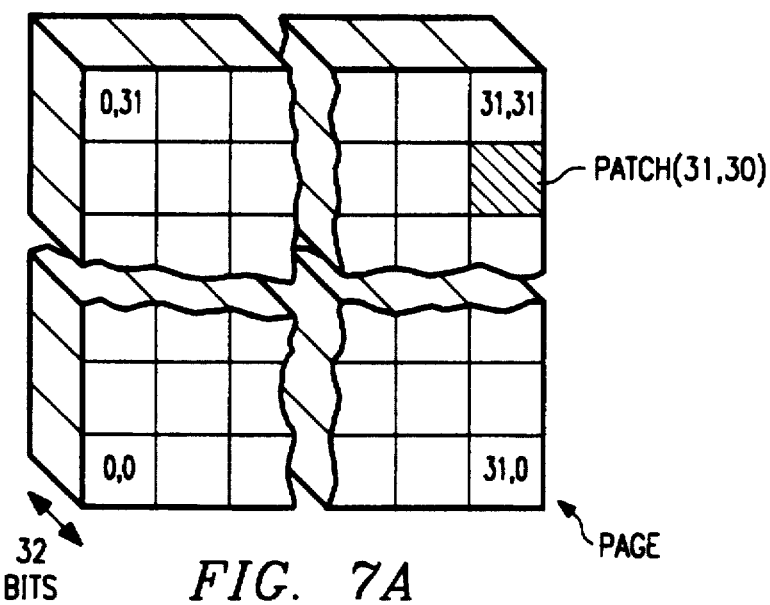
FIGS. 7A and 7B show how pages of patch data, and groups or 'superpages' of page data are made up.
Figure 7B:
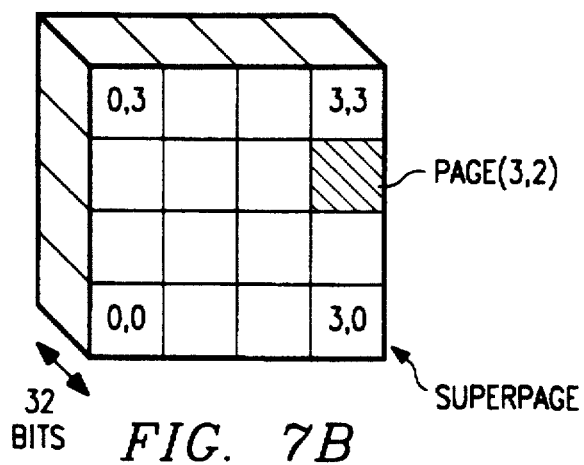

As mentioned above, the VRAM has a of 16 Mbyte capacity. The system is capable of operating with 32-bit pixels, and therefore the image memory has a capacity of 16M×8/32=4 Mpixels. As illustrated in FIGS. 6A and 6B, pixels are arranged in 4×4 groups referred to as 'patches'. FIGS. 6A and 6B show, respectively, two-and one-dimensional notations for designating a pixel in a patch, as will be used in the following description. In turn, as illustrated in FIG. 7A, the patches are arranged in 32×32 groups referred to as 'pages'. Furthermore, as illustrated in FIG. 7B, the pages are arranged in 4×4 groups referred to as 'superpages'. The VRAM therefore has a capacity of 4 Mpixels, or 256 k patches, or 256 complete pages, or 16 complete superpages. However, not all pages of a particular superpage need be stored in the memory at any one time, and support is provided for pages from parts of up to 128 different superpages to be stored in the physical memory at the same time.

Figure 8:
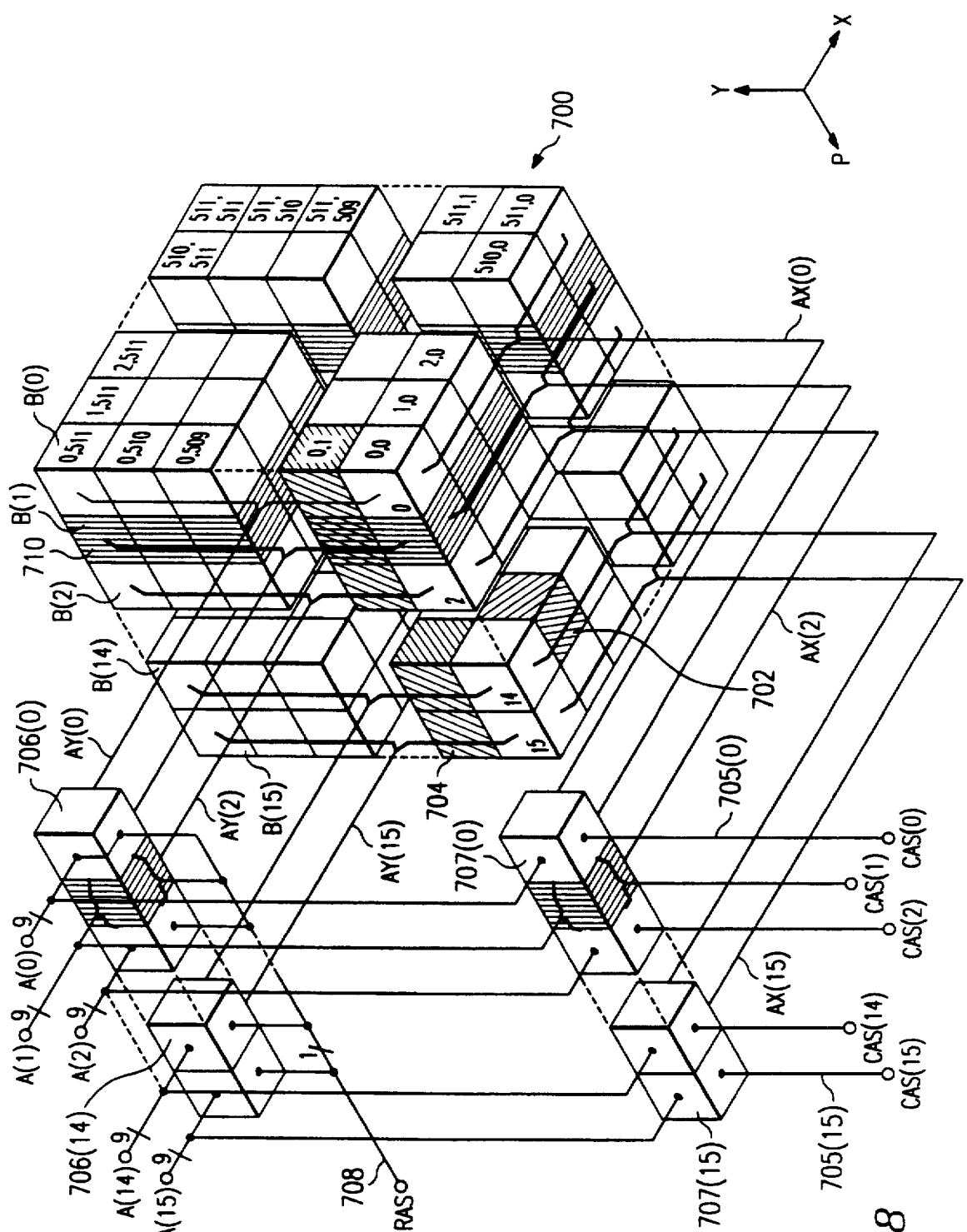

The VRAM 700 and addressing lines therefor are shown schematically in FIG. 8. Each small cube 702 in FIG. 8 represents a 32-bit pixel. The pixels are arranged in 512 pixel×512 pixel banks B(0)– B(15) lying in the XY plane, and these pixel banks are 16 pixels deep (in the P direction). A line of 16 pixels in the P direction provides an aligned patch 704. The pixels in each bank are addressable as to X address by a respective one of 16 9-bit X address lines AX(0) to AX(15) and are addressable as to Y address by a respective one of 16 9-bit Y address lines AY(0) to AY(15). The Y and X addresses are sequentially supplied on a common set of 16 9-bit address lines A(0) to A(15), with the Y addresses being supplied first and latched in a set of 16 9-bit Y latch groups 706-0 to 706-15 each receiving a row address strobe (RAS) signal on 1-bit line 708, and the X addresses then being supplied and latched in a set of 16 9-bit X latch groups, 707-0 to 707-15 each receiving a respective column address strobe signal CAS(0) to CAS(15) on lines 709(0) to 709(15), respectively.

The memory for each XY bank of pixels (512 pixels×512 pixels×1 pixel) is implemented using eight video-RAM (VRAM) chips 710, each 258K (4-bit) nibbles. Each chip provides a one-eighth thick slice of each pixel bank, whereby 8×16=128 chips are required. Each Y latch group and X latch group comprises eight latches (shown in detail for Y latch group 708(1) and X latch group 707(1)) and a respective one of the X and Y latches is provided on each VRAM chip 710.

In this specification, the banks of memory will sometimes be referred to by the bank number B(0) to B(15) and at other times by a 2-dimensional bank address (bx,by) with the correlation between the two being as follows:

| Bank Number | (bx,by) | Bank Number | (bx,by) |
|---|---|---|---|
| B(0) | (0,0) | B(8) | (0,2) |
| B(1) | (1,0) | B(9) | (1,2) |
| B(2) | (2,0) | B(10) | (2,2) |
| B(3) | (3,0) | B(11) | (3,2) |
| B(4) | (0,1) | B(12) | (0,3) |
| B(5) | (1,1) | B(13) | (1,3) |
| B(6) | (2,1) | B(14) | (2,3) |
| B(7) | (3,1) | B(15) | (3,3) |

Figure 9A:
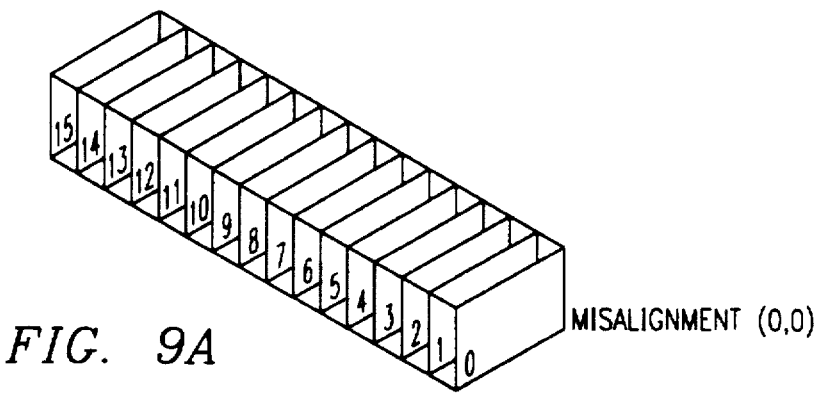
FIG. 9A is a 3-D representation of an aligned patch of data within a single page in the image memory.
Figure 9B:
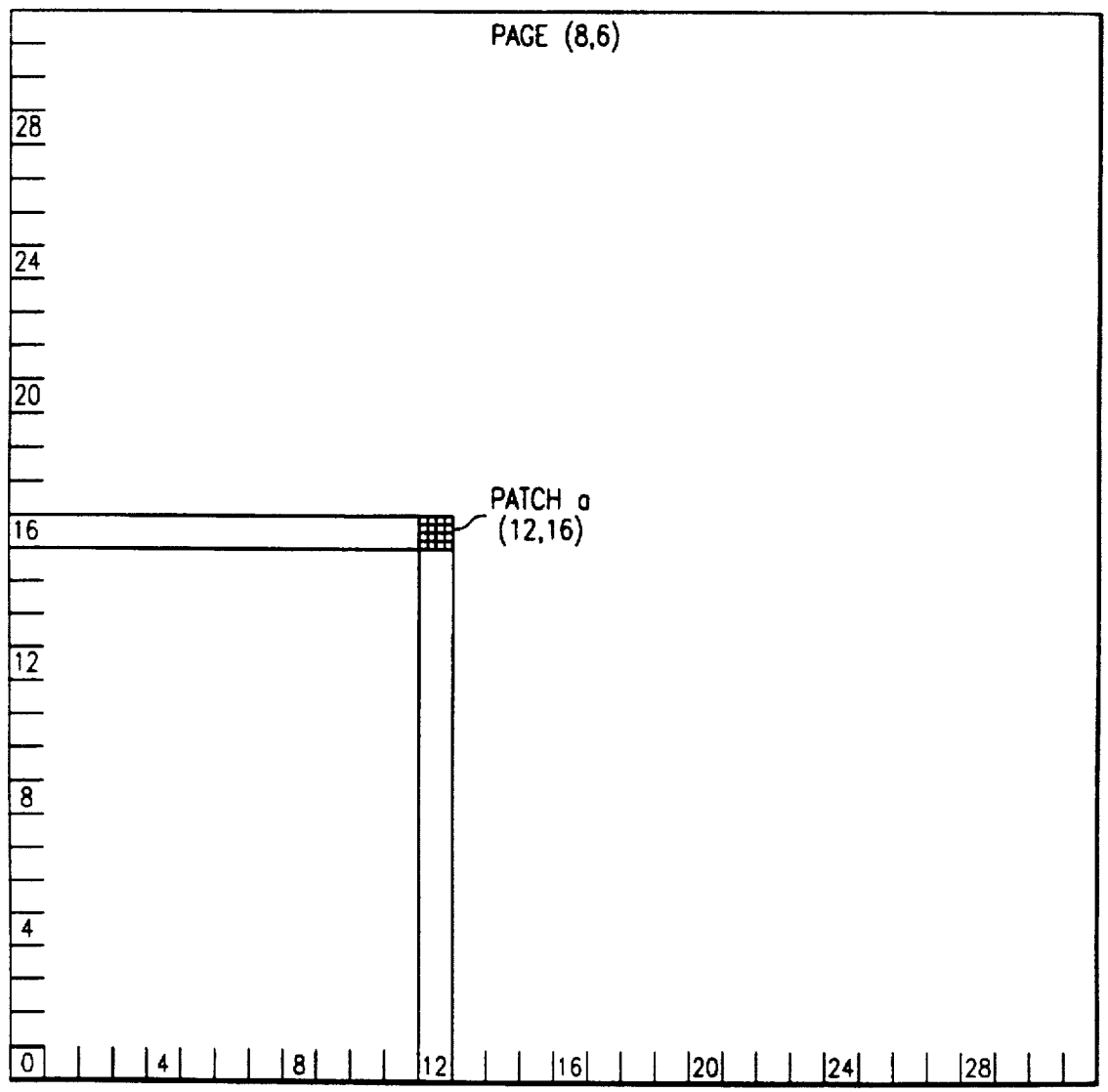

When a location in the memory 700 is to be accessed, a patch of 16 pixels is made available for reading or writing at one time. If the Y address and X address for all of the VRAMs 710 is the same, then an "aligned" patch of pixels (such as patch 704) will be accessed. However, it is desirable that access can be made to patches of sixteen pixels which are not aligned, but where various pixels in the patch to be accessed are derived from two or four adjacent aligned patches.

it will be appreciated that access to an aligned patch in memory is more straightforward than access to a non-aligned patch, because for an aligned patch the (x,y) address of each pixel in the different XY planes of memory as shown in FIG. 8 is the same. Furthermore, the (x,y) address of each pixel in the patch is equal to the bank address (bx,by) of the memory cell from which that pixel is derived. Referring to FIGS. 9A and 9B, an aligned patch "a" having a patch address (12, 16) in a page "A" having a page address (8, 6) is shown, as an example. The pixels in the aligned patch all have the same address in the sixteen XY banks of the memory, as represented in FIG. 9A, and when displayed would produce a 4×4 patch of pixels offset from the page boundaries by an integral number of patches, as represented in FIG. 9B. In the particular example the absolute address of the aligned patch in the memory would be (8×32+12, 6×32+16)=(268, 208).

Figure 10A:
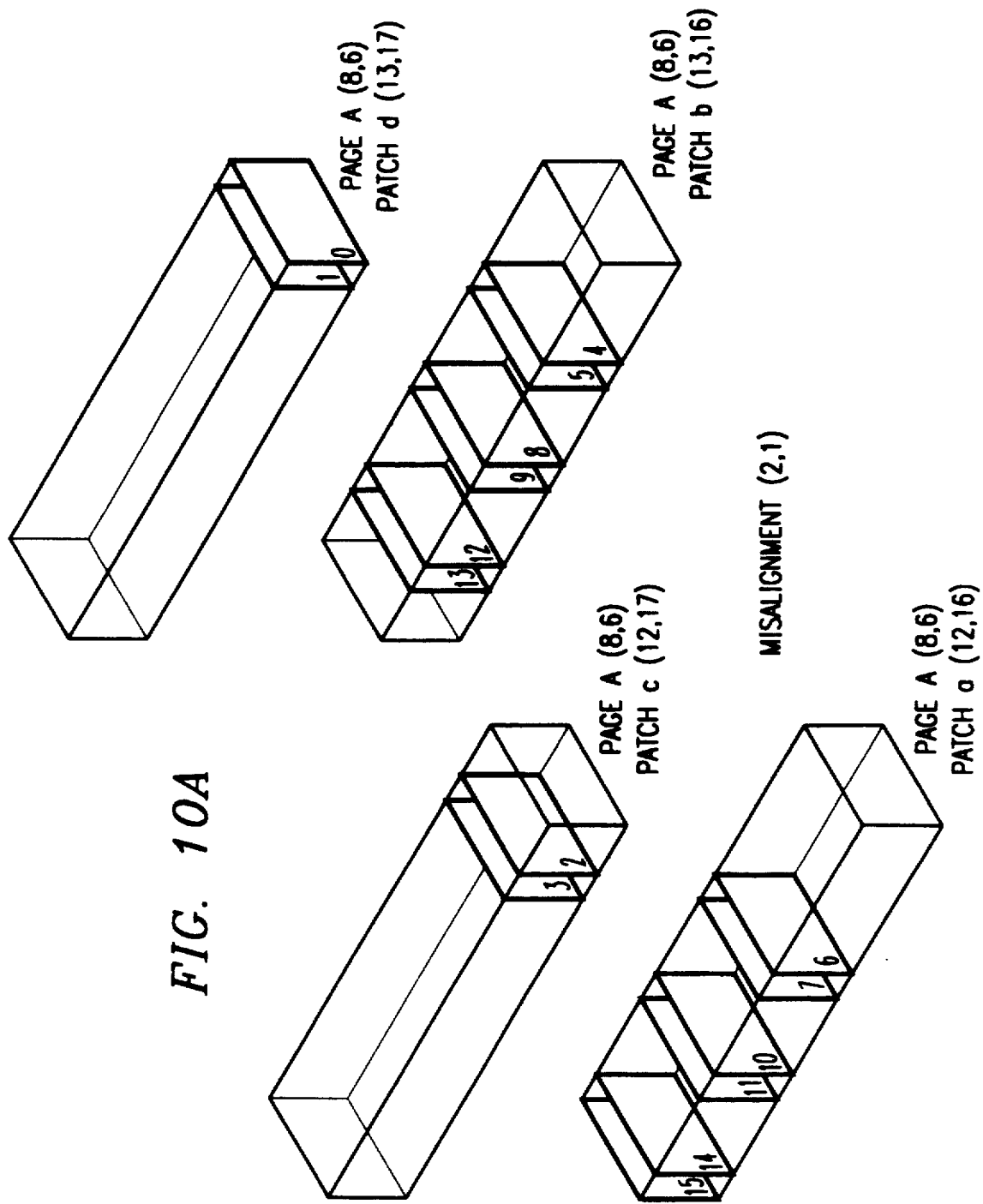
FIG. 10A is a 3-D representation of a non-aligned patch of data within a single page in the image memory.
Figure 10B:
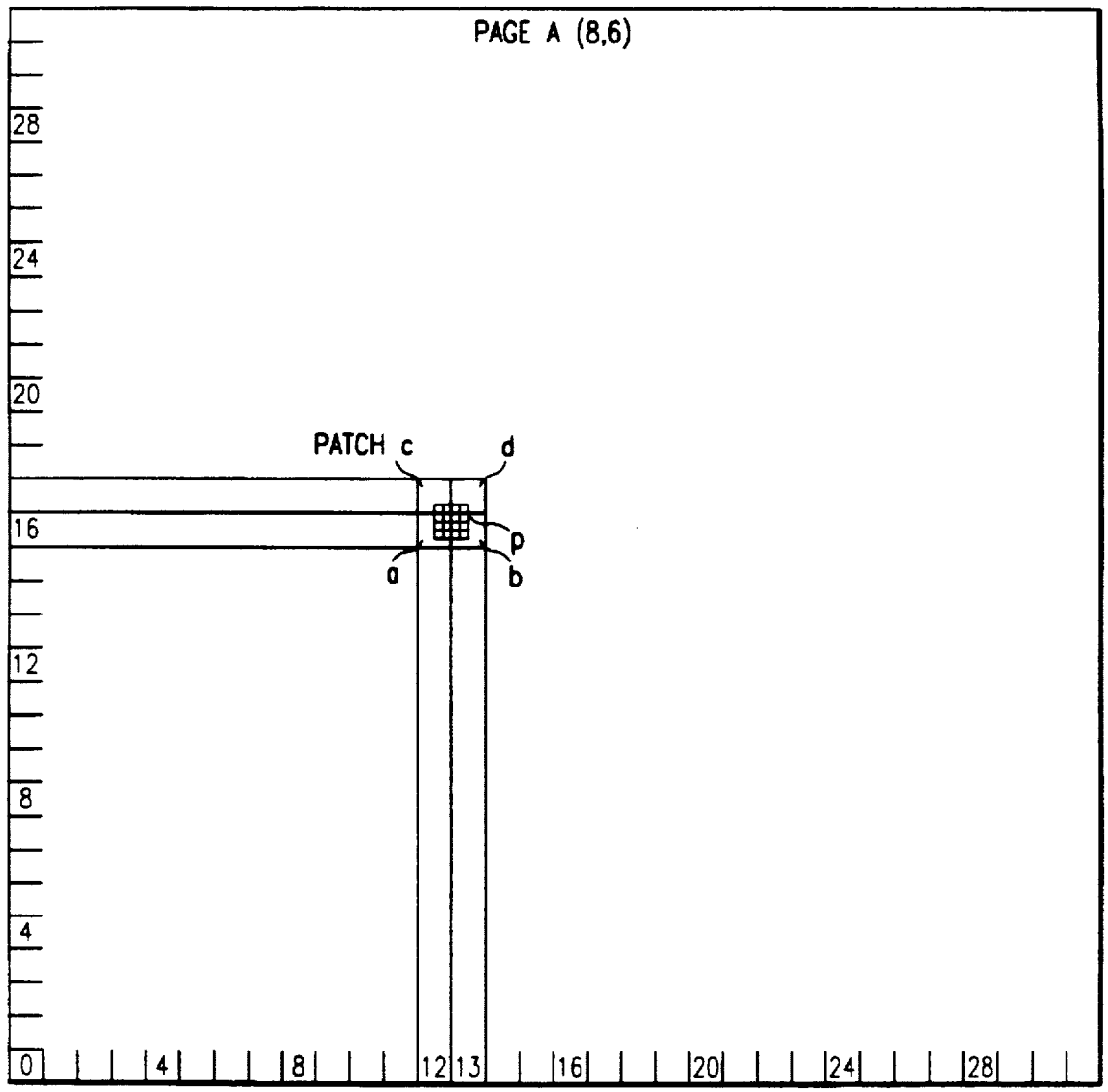
FIG. 10B is a 2-D representation of a page, showing the patch of FIG. 10A.

If, however, a patch "p" is non-aligned, and has a misalignment (mx,my)=(2,1), for example, from the previously considered aligned patch "a" at patch address (12, 16) in page A at page address (8, 6), then some of the pixels of patch "p" will need to be derived from three other aligned patches "b", "c" and "d" having patch addresses (12+1, 16), (12, 16+1) and (12+1, 16+1), or (13, 16), (12, 17) and (13, 17) in page A at page address (8, 6). This situation is represented in FIGS. 10A and 10B. The absolute address of these patches "b", "c" and "d" in the VRAM 700 are (269, 208), (268, 209) and (269, 209); respectively.

A further problem which arises in accessing a non-aligned patch "p" is that the (x,y) address of each pixel in the patch "p" does not correspond to the bank address (bx,by) in the memory from which that pixel is derived. In the particular example, the following pixel derivations and translations are required.

| Address (x,y) of pixel in non-aligned patch "p" | Aligned patch (px,py) from which pixel is derived | Bank address (bx,by) from which pixel is derived | Translation required from bank address (bx,by) to pixel address (x,y) in patch "p" |
|---|---|---|---|
| (0,0) | a (12,16) | (2,1) | (−2,−1) |
| (1,0) | a (12,16) | (3,1) | (−2,−1) |
| (2,0) | b (13,16) | (0,1) | (−2,−1) mod 4 |
| (3,0) | b (13,16) | (1,1) | (−2,−1) mod 4 |
| (0,1) | a (12,16) | (2,2) | (−2,−1) |
| (1,1) | a (12,16) | (3,2) | (−2,−1) |
| (2,1) | b (13,16) | (0,2) | (−2,−1) mod 4 |
| (3,1) | b (13,16) | (1,2) | (−2,−1) mod 4 |
| (0,2) | a (12,16) | (2,3) | (−2,−1) |
| (1,2) | a (12,16) | (3,3) | (−2,−1) |
| (2,2) | b (13,16) | (0,3) | (−2,−1) mod 4 |
| (3,2) | b (13,16) | (1,3) | (−2,−1) mod 4 |
| (0,3) | c (12,17) | (2,0) | (−2,−1) mod 4 |
| (1,3) | c (12,17) | (3,0) | (−2,−1) mod 4 |
| (2,3) | d (13,17) | (0,0) | (−2,−1) mod 4 |
| (3,3) | d (13,17) | (1,0) | (−2,−1) mod 4 |

From the right hand column above, it will be noted that the translation from the bank address (bx,by) to the corresponding address in the non-aligned patch is constant for a particular non-aligned patch and in particular is equal to the negative of the misalignment (mx,my) of the non-aligned patch "p" from the base aligned patch "a", all translations being in modulus arithmetic with the modulus equal to the patch dimension.

Yet another further complication arises with non-aligned patches, and that is that the patch may extend across the boundary between two or four pages. To provide flexibility, not all pages which make up an image and which are contiguous in the virtual address space need to be stored in the VRAM at one time, and pages are swapped between the paging memory and the VRAM as required. This results in those pages making up an image which are in the VRAM not necessarily being stored adjacent each other in the VRAM, but possibly being scattered in non-contiguous areas of the VRAM.

Figure 11B:
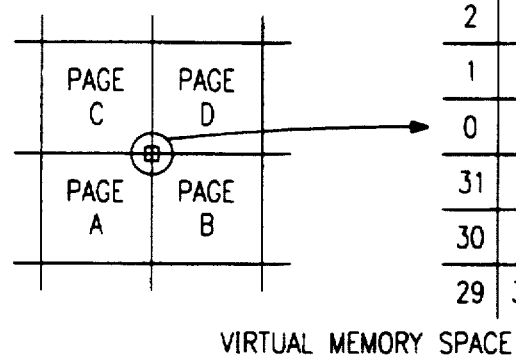
FIG. 11B is a 2-D representation of the physical memory illustrating locations of the four pages shown in FIG. 11A.

For example, FIG. 11A represents four contiguous pages A, B, C, D in the virtual address space. When these pages are swapped into the physical memory 700, they may be scattered at, for example, page addresses (8,6), (4,8), (12,12) and (6,10) in the VRAM, as represented in FIG. 11B Now, if it is desired to access a non-aligned patch "p" who base aligned patch "a" in page A has an x or y patch address of 31, then the non-aligned patch "p" may extend into page B, page C or pages B, C and D, depending on the direction of the misalignment. In the example shown specifically in FIG. 11, the patch "p" to be accessed has a misalignment (mx, my)=(2,1) relative to base aligned patch "a" having patch address (px,py)=(31,31) in page A having page address (8,6) in the VRAM. It will be appreciated that, in addition to translating accessed pixels between their bank addresses (bx,by) and the addresses (x,y) in the non-aligned patch as described above with reference to FIG. 10, it is also necessary to determine the various pages B, C, D which are to be accessed in addition to the basic page A and furthermore to determine the addresses in these other pages B, C, D of the aligned patches to be accessed, it being noted in the example that although the aligned patch "a" in page A has a patch address of (31,31), different patch addresses need to be used in other the pages B, C, D, that is (0,31), (31,0) and (0,0), respectively. The following table sets out, for each of the pixels in the patch "p" to be accessed: the page and patch address of the aligned patch from which that pixel is derived; the translation necessary from the patch address of the basic patch "a" in page A to the patch address of the patch from which the pixel is derived; the bank address from which the pixel is derived; and the translation necessary from this latter address to the address of the pixel in the patch "p".

| Address (x,y) of pixel in non-aligned patch "p" | Page and aligned patch from which pixel is derived P/(px,py) | Translation necessary from address of patch "a" to address (px,py) of patch from which pixel is derived | Bank address (bx,by) of pixel | Translation necessary from bank address (bx,by) to pixel address (x,y) in patch "p" |
|---|---|---|---|---|
| (0,0) | A/(31,31)a | (0,0) | (2,1) | (−2,−1) |
| (1,0) | A/(31,31)a | (0,0) | (3,1) | (−2,−1) |
| (2,0) | B/(0,31)b | (1,0) mod 32 | (0,1) | (−2,−1) mod 4 |
| (3,0) | B/(0,31)b | (1,0) mod 32 | (1,1) | (−2,−1) mod 4 |
| (0,1) | A/(31,31)a | (0,0) | (2,2) | (−2,−1) |
| (1,1) | A/(31,31)a | (010) | (3,2) | (−2,−1) |
| (2,1) | B/(0,31)b | (1,0) mod 32 | (0,2) | (−2,−1) mod 4 |
| (3,1) | B/(0,31)b | (1,0) mod 32 | (1,2) | (−2,−1) mod 4 |
| (0,2) | A/(31,31)a | (0,0) | (2,3) | (−2,−1) |
| (1,2) | A/(31,31)a | (0,0) | (3,3) | (−2,−1) |
| (2,2) | B/(0,31)b | (1,0) mod 32 | (0,3) | (−2,−1) mod 4 |
| (3,2) | B/(0,31)b | (1,0) mod 32 | (1,3) | (−2,−1) mod 4 |
| (0,3) | C/(31,0)c | (0,1) mod 32 | (2,0) | (−2,−1) mod 4 |
| (1,3) | C/(31,0)c | (0,1) mod 32 | (3,0) | (−2,−1) mod 4 |
| (2,3) | D/(0,0)d | (1,1) mod 32 | (0,0) | (−2,−1) mod 4 |

-continued

| Address (x,y) of pixel in non-aligned patch "p" | Page and aligned patch from which pixel is derived P/(px,py) | Translation necessary from address of patch "a" to address (px,py) of patch from which pixel is derived | Bank address (bx,by) of pixel | Translation necessary from bank address (bx,by) to pixel address (x,y) in patch "p" |
|---|---|---|---|---|
| (3,3) | D/(0,0)d | (1,1) mod 32 | (1,0) | (−2,−1) mod 4 |

A representation of the locations of the pixels in the four aligned patches is shown in FIG. 11C.

In the example, the basic patch "a" has a patch address (px,py) of (31,31) and the non-aligned patch "p" to be accessed has a misalignment (mx, my) (2,1) relative to the basic patch "a". In the general case of a base patch address (px, py), where 0<=px, py<=31, and a misalignment (mx, my), where 0<=mx, my<=3, the table of FIG. 12 sets out which page A, B, C or D should be used when accessing a pixel at bank address (bx,by), where 0<=bx,by<=3, in dependence up bx, by, mx, my, px and py, and the table of FIG. 13 sets out the X patch address px, or px+1 mod 4, and the Y patch address py, or py+1 mod 4, which should be used in order to obtain the address of the aligned patch a, b, c or d to be accessed, in dependence upon bx, by, mx and my. The increment is calculated using modular arithmetic of base 32. It is also to be noted that for all pixels where (mx, my)<> (0,0), a translation of (−mx, −my) is required between the bank address (bx,by) from which the pixel is derived and the address (x,y) of the pixel in the non-aligned patch "p".

Having described various addressing functions which it is required to be performed, there now follows a description in greater detail of the apparatus for performing these functions.

Figure 14:
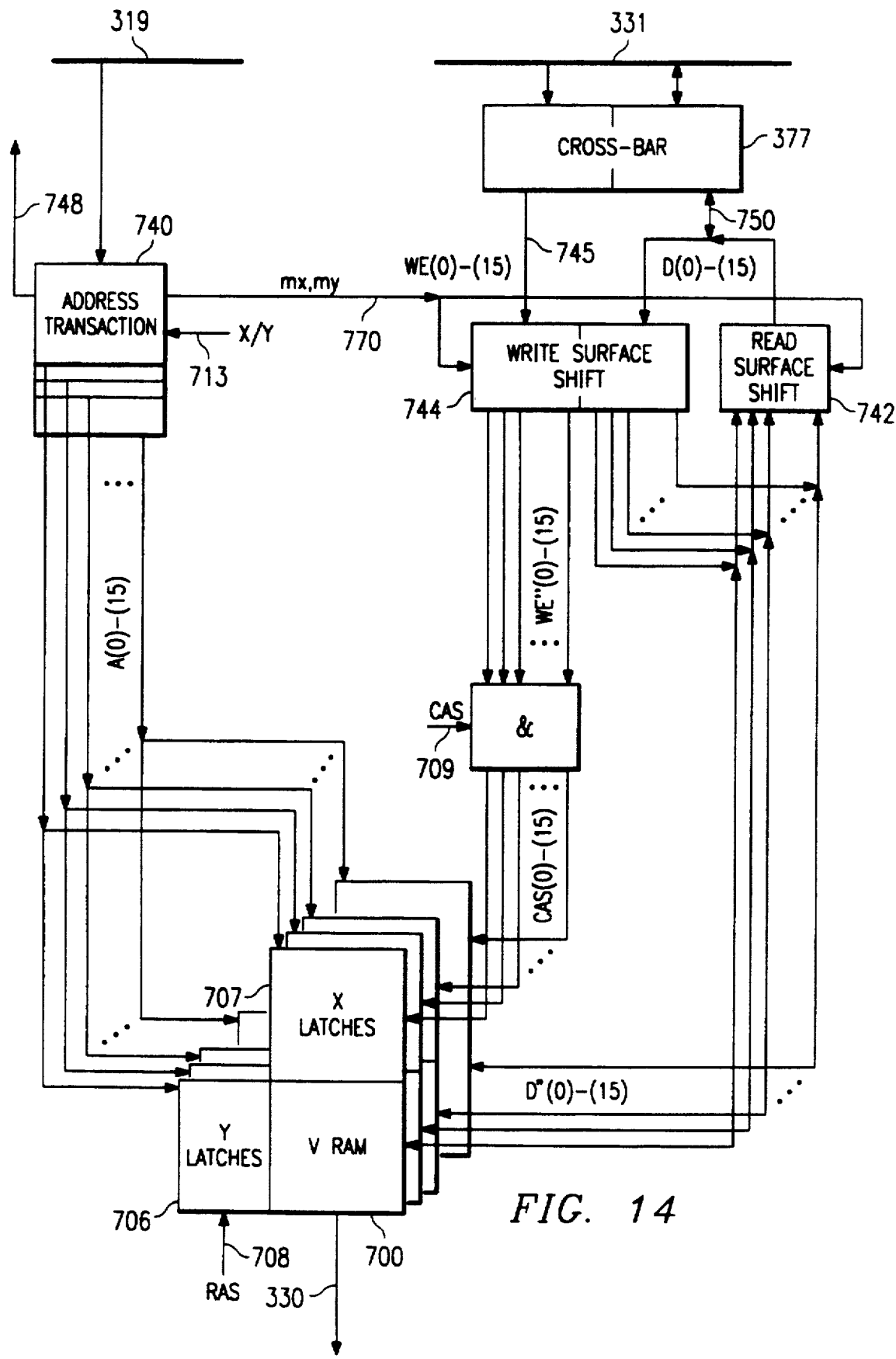
FIG. 14 is a schematic illustration in greater detail of part of the renderer of FIG.

As described above with reference to FIG. 4, the VRAM 700 is addressed by the address processor 310 via the address translator 740, communicates data with the grid processor 312 via the exchange 326 and provides data to the video processor 34. A greater degree of detail of the address translator, VRAM and exchange is shown in FIG. 14.

The address translator 740 receives a 48-bit virtual address on bus 319 of a patch origin address. The translator determines whether the required page(s) to access the addressed patch are resident in the VRAM physical memory 700. If not, a page or superpage fault is flagged on line 748, as will be described in detail below. However, if so, the address translator determines the addresses in the sixteen XY banks of the physical memory of the sixteen pixels making up the patch, and addresses the memory 700 firstly with the Y addresses on the sixteen sets of 9-bit lines A(0) to A(15) and then with the X addresses on these lines. The X and Y addresses are generated under control of the X/Y select signal on line 713.

The exchange 326 includes a read surface shifter 742 and a write surface shifter 744. Pixel data is transferred, during a read operation, from the memory 700 to the read surface shifter 742 by a set of sixteen 32-bit data lines D"(0) to D"(15), and, during a write operation, from the write surface shifter 744 to the memory 700 by the same data lines D"(0)to D"(15). The read and write surface shifters 742, 744 receive 4-bit address data from the address translator on line 770, consisting of the least significant two bits of the X and Y address data. This data represents the misalignment (mx, my) of the accessed patch "p" from the basic aligned patch "a". The purpose of the surface shifters is re-order the pixel data in non-aligned patches, that is to apply the translation (−mx, −my) when reading and an opposite translation (mx, my) when writing. Pixel data to be written is supplied by a crossbar 327 forming part of the exchange 326 to the write surface shifter 744, and pixel data which has been read is supplied by the read surface shifter 742 to the crossbar 327, on the 512-bit line 750 made up of a set of 16 32-bit lines. The write surface shifter also receives on line 745 16-bit write enable signals WE(0)–WE(15) from the crossbar 327 one for each pixel, and the write surface shifter 744 re-organises these signals in accordance with the misalignment (mx, my) of the patch "p" to be accessed to provide the sixteen column write enable signals WE"(0) to WE"(15). Each of these signals is then ANDed with a common CAS signal on line 709 to form sixteen CAS signals CAS(0) to CAS(15), one for each of the sixteen banks of memory. This enables masking of pixels within a patch during writing, taking into account any misalignment of the patch.

The address translator 740 will now be described in more detail primarily with reference to FIG. 15. The translator 740 includes as shown, a contents addressable memory (CAM) 754, a page address table 756, a near-page-edge table 758, and X and Y incrementers 760X, 760Y. The translator 740 also includes sixteen sections 764(0) to 764(15), one for each output address line A(0) to A(15), and thus for each memory bank B(0) to B(15).

The translator 740 receives a 48-bit virtual address of the origin (0,0) pixel of a patch on the bus 319. It will therefore be appreciated that up to $_2 48$ (i.e. 281, 474, 976, 710, 656) different pixels can be addressed. Many formats of the 48-bit address can be employed, but the following example will be considered in detail.

| | BITS | IDENTITY |
|---|---|---|
| LSB | 0,1 | X misalignment (mx) of patch (p) to be accessed relative to basic aligned patch (a) |
| | 2–6 | X address (px) of aligned patch (a) in page A |
| | 7,8 | X address of page A |
| | 9–15 | X portion of superpage address |
| | 16,17 | Y misalignment (my) of patch (p) to be accessed relative to basic aligned patch (a) |
| | 18–22 | Y address (py) of aligned patch (a) in page A |
| | 23,24 | Y address of page A |
| | 25–31 | Y portion of superpage address |
| MSB | 32–47 | Image ID portion of superpage address |

Figure 16:
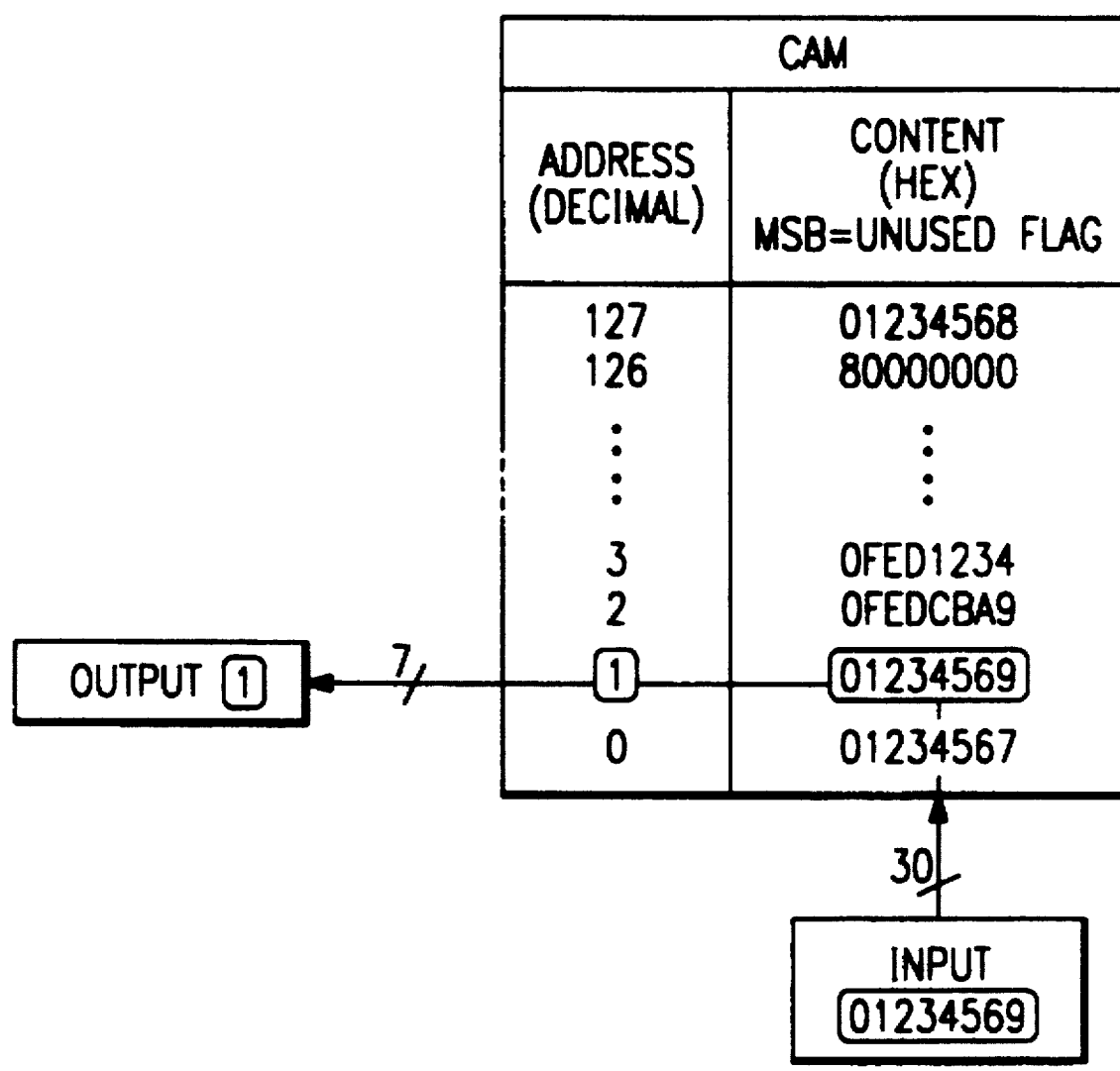
FIG. 16 is an illustration of the operation of a contents addressable memory used in the address translator of FIG. 15.

The bits identifying the superpage (i.e. bits 9 to 15, 25 to 31 and 32 to 47) are supplied to the CAM 754. The CAM 754 is an associative memory device which compares the incoming 30-bit word with all of the words held in its memory array, and if a match occurs it outputs the location or address in the memory of the matching value on line 767. The CAM 754 has a capacity of 128 32-bit words. Thirty of these bits are used to store the virtual address of a superpage which is registered in the CAM 754. Thus up to 128 superpages can be registered in the CAM. One of the other bits is used to flag any location in the CAM which is unused. The remaining bit is spare. FIG. 16 illustrates how the CAM 754 operates. Upon input of a 30-bit superpage; address, e.g. 0123456 (hex), this input value is compared with each of the contents of the CAM. If a match is found and provided the unused flag is not set, the address in the CAM of the match is output, e.g. 1 in the illustration. If no match is found with the contents at any of the 128 addresses of the CAM, then a superpage fault is flagged on line 748S, and the required superpage is then set up in the CAM in the manner described in detail later.

Referring back to FIG. 15, the 7-bit superpage identification output from the CAM 754 on line 767 is used as part of an address for the page address table 756, implemented by a 4 k word×16-bit SRAM. The remaining 5 bits of the address for the page table 756 are made up by: bits 7, 8, 23 and 24 of the virtual address which identify the page within a superpage; and an X/Y select signal on line 713. The page table 756 has registered therein the X and Y page addresses in the VRAM 700 of: a) the basic page A in which the pixel to be accessed is located; b) the page B which is to the right of the page A in the virtual address space; c) the page C which is above the page A in the virtual address space; and d) the page D which is to the right of page C and above page B in the virtual address space, and these addresses are output on lines 771A to 771D, respectively. If these pages A to D are required, but are not stored in the VRAM 700 and thus are not registered in the page table 756, then a page fault is flagged on a line 748p (as described below with reference to FIG. 21) and the required page of data is then swapped into the VRAM 700 in the manner described in detail below. However, if all of the pages A to D which may possibly need to be accessed are stored, their addresses are made available on the lines 771A to 771D to all of the sections 764(0) to 764(15), the Y or X addresses being output depending on the state of the X/Y select signal on line 713.

Bits 2 to 6 and 188 to 22 of the virtual address are also supplied to each of the sections 764(0) to 764(Z5) on lines 772X and 772Y. These denote the patch address (px, py). The X and Y patch addresses together with bits 0,1, 16 and 17 of the virtual address (,which indicate the misalignment tax, my of the patch p to be accessed) are also supplied to the near-page-edge table 758, implemented using combinatorial logic, which provides a 2-bit output to the sections 764(0) to 764(15) on line 774, with one bit being high only if the patch X address px is 31 and the X misalignment mx is greater than zero and the other bit being high only if the patch Y address py is 31 and the Y misalignment mv is greater than zero.

Furthermore, the X and Y patch addresses (px, py) are also supplied to the X and Y incrementers 760X, 760Y, and these incrementers supply the incremented values px+1, mod 32 and py+1, mod 32, to each of the sections 76/4(0) to 764(15) on lines 776X, 776Y.

The four bits 0,1, 16 and 17 giving the misalignment mx and my are also supplied to the sections 764(0) to 764(15) on lines 770X, 770Y and are also supplied to the surface shifters 742, 744, on line 770.

Each section 764(0) to 764(15) comprises: a page selection logic circuit 778; X and Y increment select logic circuits 780X 780Y; X and Y 4=:1 4-bit page address multiplexers 782X, 782Y; X and Y 2=1% bit patch address multiplexers 784X, 784Y; and a 2:1 9-bit address selection multiplexer 786.

The page selection logic circuit 778 implemented using combinatorial logic, provides a 2-bit signal to the page address multiplexers 782X,Y to control which page address A, B, C or D to use. The page selection logic circuit 778 performs this selection by being configured to act as a truth table which corresponds to the table of FIG. 12. The circuit 778 receives the 2-bit signal on line 774 from the near-page-edge table 758 and this determines which of the four columns of the table of FIG. 12 to use. The circuit 778 also receives the misalignment (mx, my) on lines 770X, 770Y, and this data in combination with which section 764(0) to 764(15) (and thus which bx and by applies) determines which of the four rows in FIG. 12 to use. The X and Y page address multiplexers 782X, 782Y therefore supply appropriate page address as four bits to complementary inputs of the X/Y address selection multiplexer 786.

The increment selection logic circuits 780X, 780Y, which are implemented using combinatorial logic, receive the respective X and Y misalignments mx, my and provide respective 1-bit signals to control the patch address multiplexers 784X, 784Y. The increment selection circuits perform this selection by being configured to act as truth tables which correspond to the upper and lower parts, respectively, of the table of FIG. 13. It will be noted that selection depends upon the misalignment mx or my in combination with the bx or by position of the memory bank (and thus which of the sections 764(0) to 764(15) is being considered). The X and Y patch address multiplexers 784X, 784Y therefore output the appropriate 5-bit patch addresses px or px+1 (mod. 32) and py or py+1 (mod. 32) which are combined with the X and Y page addresses at the inputs to the X/Y selection multiplexers 786. This latter multiplexer receives as its control signal the X/Y selection signal on line 713 and therefore outputs the 9-bit X or Y address appropriate to the particular section 764(0) to 764(15).

The address translator 740 therefore deals with the problems described above of addressing pixels from different aligned patches a, b, c, d in the memory 700 when a patch "p" to be accessed is misaligned, and of addressing pixels from different pages A, B, C, D in the memory 700 when a patch "p" to be accessed extends across the boundary of the basic page A.

Figure 17:
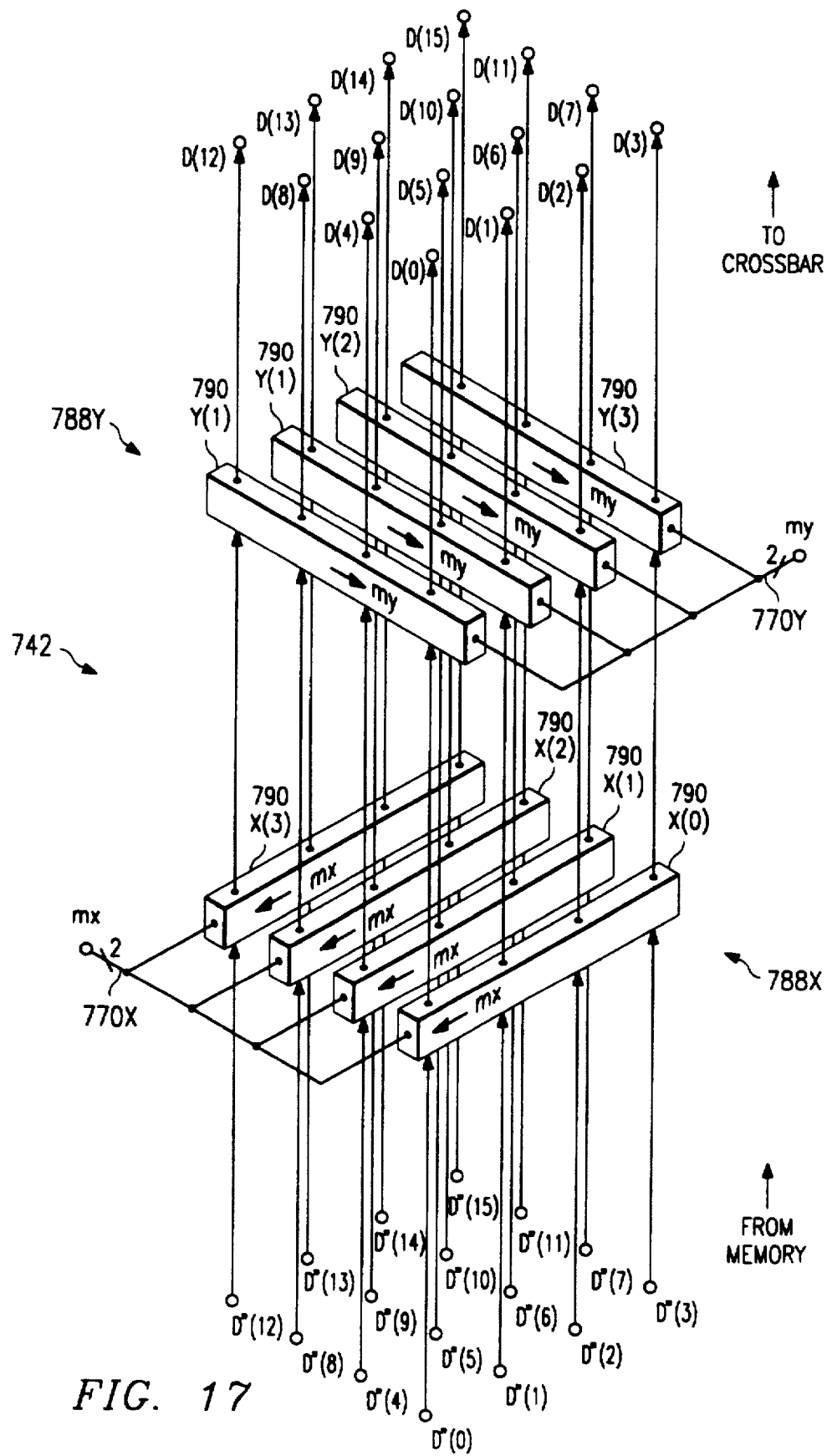
FIG. 17 is a schematic illustration in greater detail of a read surface shifter used FIG. 14.

It is still necessary also to perform a translation of the pixel positions in the accessed patch of (−mx,−my) if reading, or (mx,my) if writing. This is performed by the surface shifter 7142 for reading and the surface shifter 744 for writing. The read surface shifter 742 will now be described with reference to FIGS. 17 and 18.

The read surface shifter 742 comprises a pair of 4×4 32-bit barrel shifters, 788X, 788Y. The X barrel shifter 788X has four banks 790X(0) to 790(3) of multiplexers arranged in one direction, and the outputs of the X barrel shifter 788X are connected to the inputs of the Y barrel shifter 788Y, which has four banks 790Y(0) to 790Y(3) of multiplexers arranged in the orthogonal direction. As control signals, the X and Y barrel shifters 788X, Y receive the X and Y misalignments mx, my, respectively.

Figure 18:
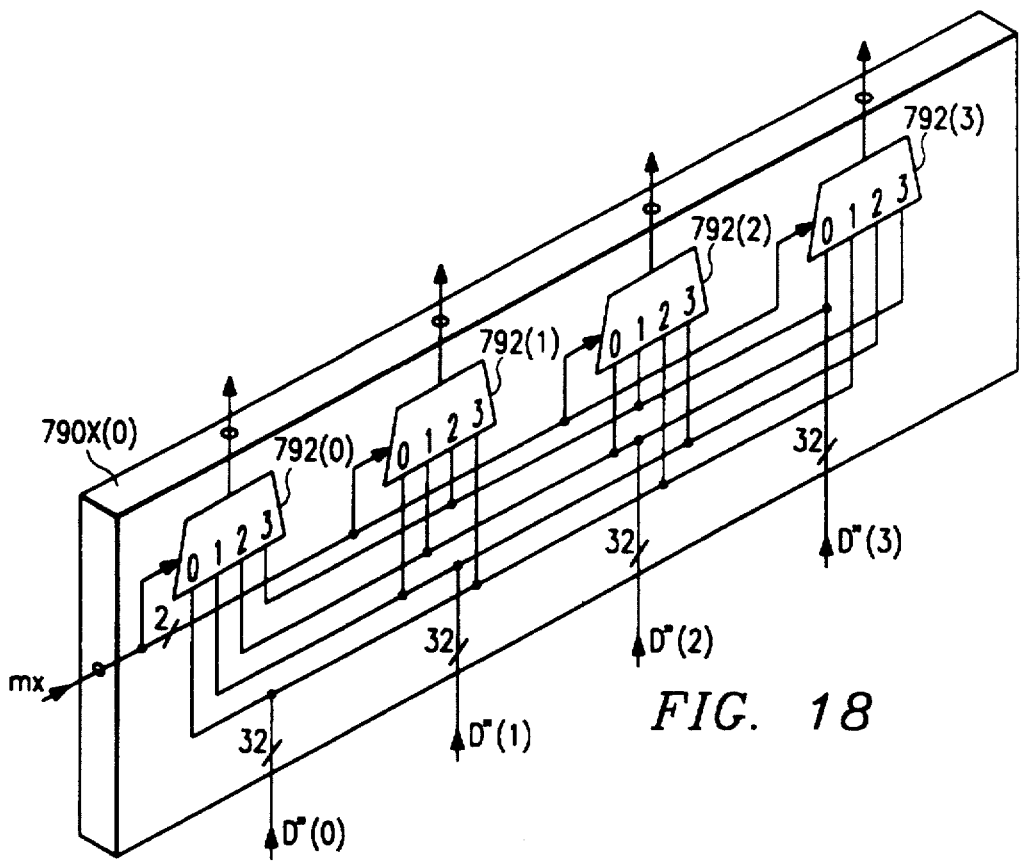
FIG. 18 shows in greater detail an array of multiplexers forming part of the surface shifter of FIG. 17.
Figure 19:
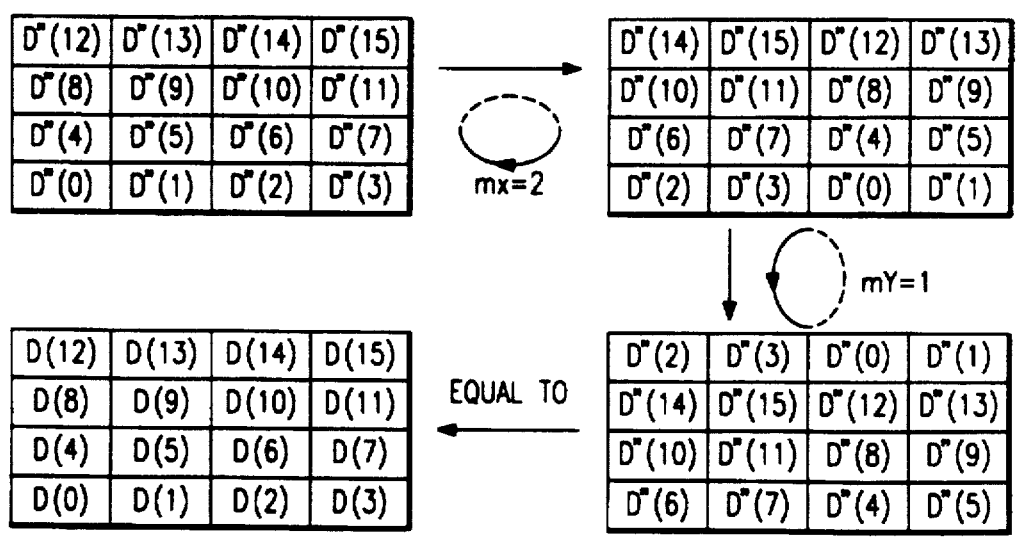
FIG. 19 illustrates the translation made by the surface shifter of FIG. 17.

One of the banks of muliplexers 790X(0) is shown in greater detail in FIG. 18, and comprises four 32-bit 4:1 multiplexers 792(0) to 792(3). The data from bank (0,0) is supplied to inputs 0, 3, 2 and 1, respectively, of the multiplexers 792(0) to 792(3). The data from bank (1,0) is supplied to inputs 1, 0, 3 and 2, respectively, of the multiplexers 792(0) to 792(3). The data from bank (2,0) is supplied to the inputs 2, 1, 0 and 3, respectively, of the multiplexers 792(0) and 792(3). The remaining data from bank (3,0) is supplied to the remaining inputs 3, 2, 1, 0, respectively, of the multiplexers 792(0) to 792(3). The other banks of multiplexers 790X(1) to 790X(3) in the X barrel shifter 788X are similarly connected, and the banks 790Y(0) to 790Y(3) in the Y barrel shifter 788Y are also similarly connected. It will therefore be appreciated that the read surface shifter performs a translation with wrap-around in the -X direction of mx positions and a translation with wrap-around in the -Y direction of my positions as shown in FIG. 19.

As shown in the drawings, the write surface shifter 744 may be provided by a separate circuit to the read surface shifter. In this case the write surface shifter is configured similarly to the read surface shifter, except that the inputs 1 and 3 to the multiplexers 792 in the barrel shifter banks are transposed. This results in translations of +mx and +my in the X and Y directions, rather than -mx and -my for the read surface shifter. The part of the write surface shifter which operates on the write enable signals WE(0) to WE(15) is identical to the part which operates on the data signals, except that the signals are 1-bit, rather than 32-bit.

As an alternative to employing separate circuits for the read and write surface shifters 742, 744, a single circuit may be employed, with appropriate data routing switches, and in this case translation provided by the surface shifter may be switched between (-mx, -my) and (+mx, +my), in dependence upon whether the memory is being read or written, as described with reference to FIGS. 46 and 47.

As mentioned above, if a required superpage is not registered in the CAM 754, then a superpage fault is flagged, on line 748S. This superpage fault is used to interrupt the address processor 310, which is programmed to perform a superpage interrupt routine as follows. Firstly, the address processor checks whether the CAM 754 has any space available for a new superpage to be registered. If not, the address processor selects a registered superpage which is to be abandoned in the manner described below and causes the, or each, page of that superpage which is stored in the VRAM 700 to be copied to its appropriate location in the paging memory. The registration of that superpage is then cancelled from the CAM 754. Secondly, the new superpage is registered in the CAM 754 at the, or one of the, available locations.

Figures 20, 21:
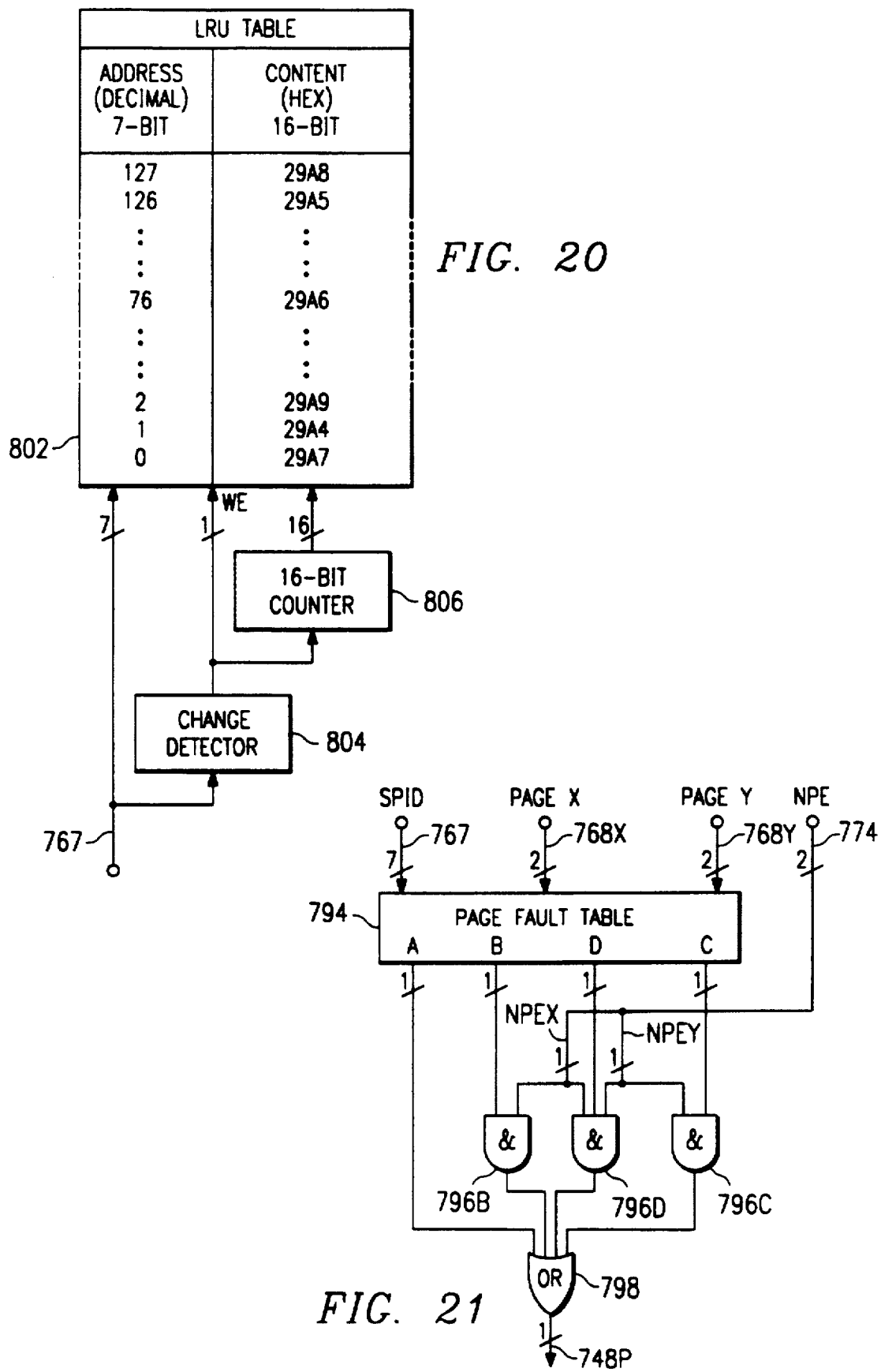
FIG. 20 is an illustration of the operation a least-recently-used superpage table which may be used with the address translator of FIG. 15.
FIG. 21 is a schematic diagram showing a page fault table which may be used with the address translator of FIG. 15.

In order to select which superpage to abandon, a determination is made as to which is the least recently used (LRU),superpage which is registered in the CAM 754. To do this, a 128×16-bit LRU table 802 is provided, as illustrated in FIG. 20. Each of the 128 addresses represents a respective one of the superpages registered in the CAM 754. The 7-bit superpage identification output from the CAM 754 on line 767 is used to address the LRU table 802 each time the superpage identification changes, as detected by the change detector 804. The change detector 804 also serves to increment a 16-bit counter 806, and the content of the counter 806 is written to the addressed location in the LRU table 802.

Accordingly, for all of the registered superpages, the LRU table contains an indication of the order in which those superpages were last used. When registering a new superpage in the CAM 754, the address processor 310 checks the contents of the LRU table 802 to determine which superpage has the lowest count and in that way decides which superpage to abandon.

As also mentioned above, if the required pages of the registered superpage are not stored in the VRAM 700, a page fault is flagged, on line 748P. The page fault generator is shown in FIG. 21, and comprises a page fault table 794 constituted by a 2 k×4-bit SRAM, a set of three AND gates 796B, C, D and an OR gate 798. The page fault table 794 is addressed by the 7-bit superpage identity code on line 767, and by the X and Y page addresses on line 768X, Y. At each address, the page fault table 794 contains a 4-bit flag in which the bits denote whether the basic addressed page A and the pages B, C and D, respectively, to the right, above, and to the right and above, page A are stored in the VRAM 700. The page B flag is ANDed by gate 796B with the bit of the near-page-edge signal on line 774, denoting whether the patch "p" to be accessed extends across the boundary between pages A and B. Similarly, the page C flag is ANDed by gate 796C with the bit of the near-page-edge signal on line 774 denoting whether the patch "p" to be accessed extends across the boundary between pages A and C. Furthermore, the page D flag is ANDed by gate 796D with both bits of the near-page-edge signal, which in combination denote whether the patch "p" to be accessed extends in page D above page B and to the right of page C. The outputs of the three AND gate 796B, C, D and the page A flag are then ORed by the OR gate 798, the output of which provides the page fault flag on line 748P.

From the above, it will be appreciated that a page fault is always generated if the basic page A is not stored in the VRAM, but if page B, C or D is not stored in the memory, a page fault will be generated in response thereto only if the respective page B, C or D will be used, as indicated by the two bits of the near-page-edge signal on line 774.

The page fault signal on line 748P is used to interrupt the address processor 310. The address processor then searches a table in its PRAM 318 for a spare page address in the VRAM 700, causes the required page to be swapped into the VRAM at the spare page address, and update the table in its PRAM 318.

GRID PROCESSOR AND EXCHANGE

As described above with reference to FIG. 4, in the operation of the preferred embodiment, the exchange 326 and the VRAM 700 communicate in patches of sixteen pixels of data, each pixel having 32 bits. Furthermore, the grid processor 312 has sixteen processors, each of which processes pixel data and communicates with the exchange 326. Also, the grid processor 312 and the address processor 310 can communicate address data via the FIFO 332.

Figure 22:
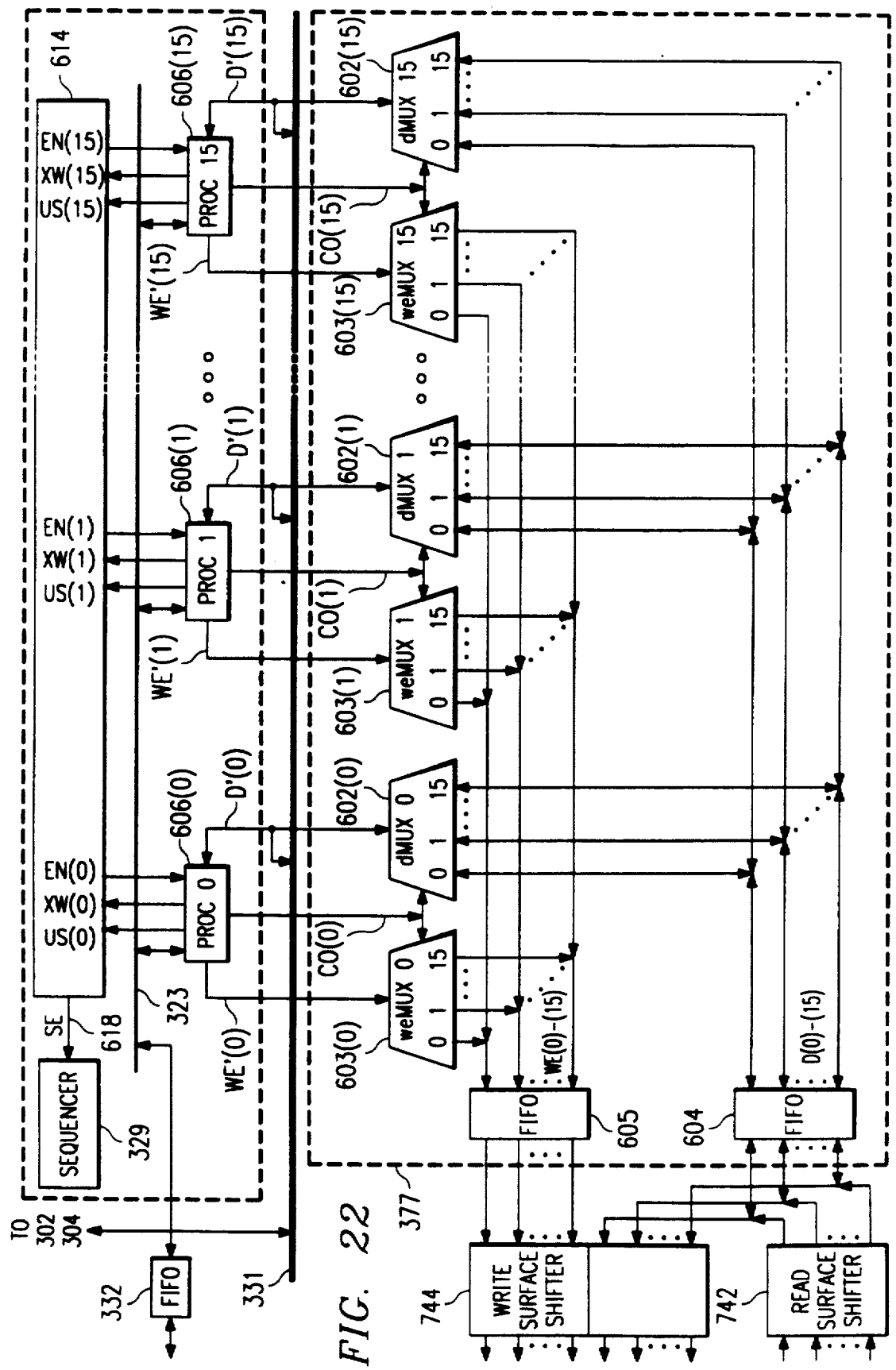
FIG. 22 is a schematic diagram of an exchange and grid processor of the renderer of FIG. 4.

The exchange 326 includes a crossbar 377, and a logical implementation of the crossbar 377 and of the grid processor 312 is shown in more detail in FIG. 22. As shown, the crossbar 377 comprises sixteen 16:1 32-bit data multiplexers 602(0) to 602(15); sixteen 16:11-bit write enable multiplexers 603(0) to 603(15); a 512-bit bidirectional FIFO 604 for pixel data; and a 16-bit bidirectional FIFO 605 for the write enable signals. During a read operation, the 16 pixels of a 4×4 patch are supplied from the VRAM 700 (FIG. 8) via the read surface shifter 742 and via the FIFO 604 as data D(0) to D(15) to the sixteen inputs of each data multiplexer 602(0) to 602(15). During a write operation, the data multiplexers 602(0) to 602(15) supply data D(0) to 0(15) via the FIFO 604 and the write surface shifter to 744 the VRAM and the write enable multiplexers 603(0) to 603(15) supply write enable signals WE(0) to WE(15) via the FIFO 605 to the write surfaces shifter 744. The FIFOs 604, 605 and also the FIFO 332 are employed so that the grid processor 312 does not need to be stalled to take account of different access speeds of the VRAM 700 in dependence upon whether page-mode of non-page-mode access is taking place.

Each of the data multiplexers 602(0) to 602 (15) is associated with a respective one of sixteen processors 606(0) to 606(15) and communicates therewith respective data signals D'(0) to D'(15), which are logically 32 bits, but which in practice may be implemented physically as 16 bits, with appropriate multiplexing techniques. The data signals D'(0) to D'(15) are also supplied to respective parts of the bus 331. Also, each of the write enable multiplexers 603(0) to 603(15) is associated with a respective one of the sixteen processors 606(0) to 605(15) to 606(15) which supply respective 1-bit write enable signals WE'(0) to WE'(15) to the write enable multiplexers. Each processor 606(0) to 606(15) provides a logical control signal CO(0) to CO(15) to control both its associated data multiplexer 602 and write enable nultiplexer 603. Thus, during writing to the memory, any processor may provide any respective one of the data signals by providing the number 0 to 15 of the required data signal as its control signal to its data and write enable multiplexers. Furthermore, during reading from the memory, any processor may read any of the data signals by providing the number 0 to 15 of the required data signal to its data multiplexer. Thus, there is no restriction on data being processable only relative to a particular processor, and each processor can select and control the routing of its own data.

The crossbar 377 shown in FIG. 22 is simplified for reasons of clarity, and shows, for example, bi-directional multiplexers, which in practice are difficult to implement. A modified form of the exchange, incorporating the crossbar and the surface shifters, is shown in FIG. 46.

Figure 46:
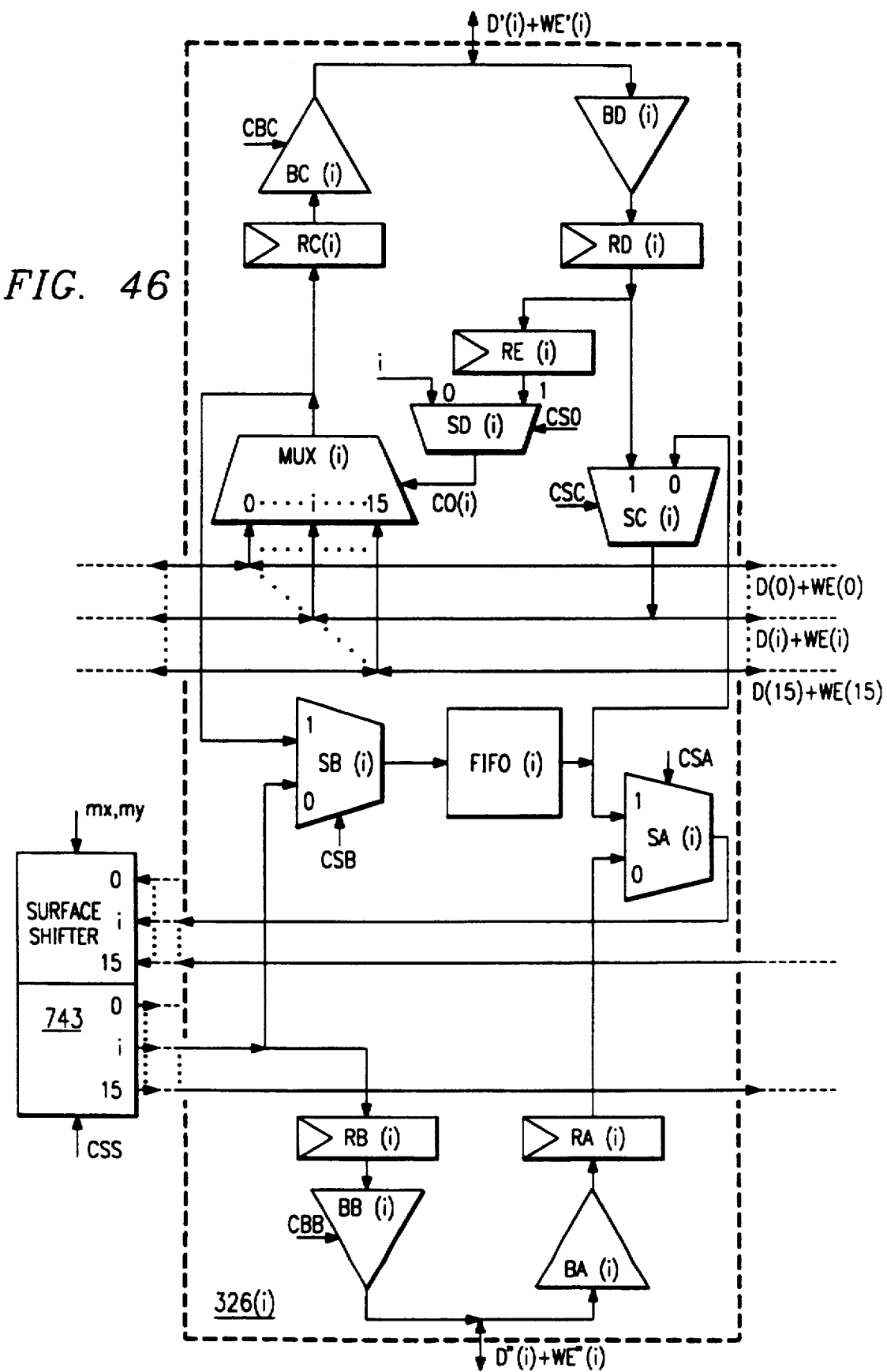
FIG. 46 is a circuit diagram of a modification to the exchange of FIG. 22.

The exchange of FIG. 46 comprises sixteen sections, of which one typical section 326(i) is shown for simplicity. The data D"(i) from the memory is supplied via a buffer BA(i) and register RA(i) to one input of a 2:1 multiplexer SA(i) acting as a two-way switch. The output of the switch SA(i) is fed to an input i of the surface shifter 743 which performs surface shifting for read and for write. The corresponding output i of the surface shifter 743 is fed to one input of a multiplexer switch SB(i) and is also fed back to the data D"(i) input via a register RB(i) and a tri-state buffer BB(i). The output of the switch SB(i) is input to a FIFO(i), the output of which forms the other input of switch SA(i) and is also fed to one input of a further switch SC(i). The set of sixteen data lines D(0) to D(15) connect the exchange sections 326(0) to 326(15) and the output of switch D(i) is connected to data line D(i). In the general case, the output of each switch SC(0) to SC(15) is connected to the data line of the same number.

The sixteen inputs of a 16:1 multiplexer MUX(i) are connected to the data lines D(0) to D(15), and the output of the multiplexe MUX(i) is connected via a register RC(i) and a tri-state buffer BC(i) to the respective processor PROC(i) via the data line D'(i). The output of the multiplexer MUX(i) is also connected to the other input of switch SB(i). Furthermore, the data line D'(i) frown the processor PROC(i) is also connected via a buffer BD(i) and a register RD(i) to the other input of the switcth SC(i).

The control signal CO(i) for the multiplexer MUX(i) is provided by a switch SD(i) which can select between a hardwired value i or the output of a register RE(i)which receives its input from the output of the register Also, control signals CSB, CSC, CSD and CBC are supplied to the nultiplexer switches SB(0) to (15), the multiplexer switches SC(0) to (15), the multiplexer switches SD(0) to SD(15), the tri-state buffers BC(0) to (15) from the microcode memory 308 (FIG. 4) of the processing section 321. Furthermore, control signals CSA, CBB and CSS derived from the microcode memory 307 of the address processing section 309 are supplied to the multiplexer switches SA(0) to (15), the tristate buffers BB(0) to (15) and the surface shifter 743.

The exchange 326 of FIG. 46 is operable in three modes. In a read mode, the processors PROC(0) to PROC(15) can read the memory; in a write mode, they can write to the memory; and in a transfer mode, they can transfer pixel data between each other. The values of the control signals for these three modes are as follows:

|  | CSA | CSB | CSC | CSD | CBB | CBC | CSS |
|---|---|---|---|---|---|---|---|
| READ | 0 | 0 | 0 | 0/1 | 0 | 1 | 0 |
| WRITE | 1 | 1 | 1 | 0/1 | 1 | 0 | 1 |
| TRANSFER | X | X | 1 | 1 | X | 0/1 | X |

Figure 47A:
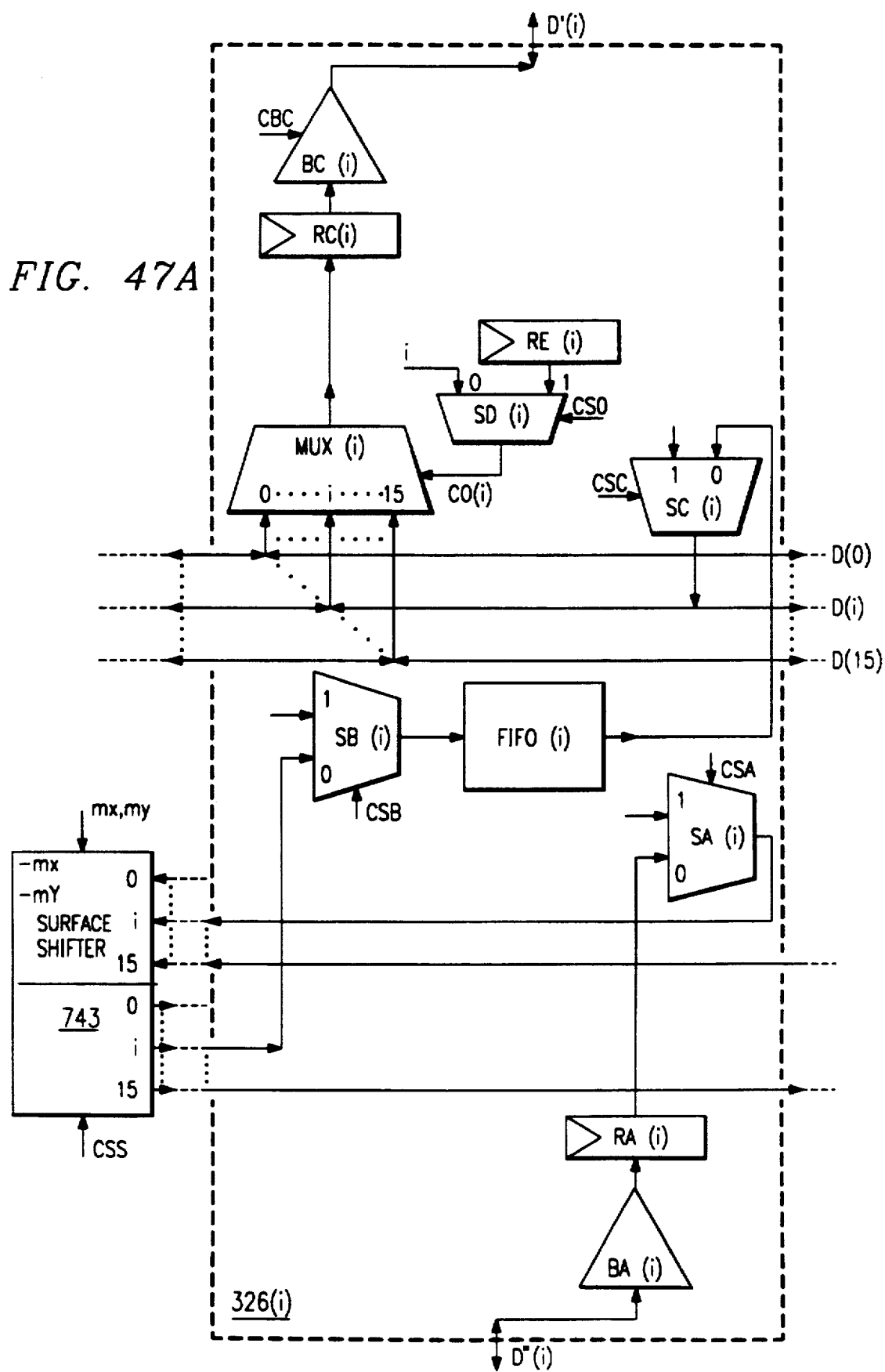
FIG. 47A to 47C are simplified forms of the circuit of FIG. 46 when operating in three different modes.

It should be noted that the control signal CSD can select between a "straight-through" mode in which each multiplexer MUX(i) selects its input and thus data D(i), or a "processor-selection" mode in which it selects an input j and thus data D(j) in accordance with the value j which the processor has loaded into the register The effective configuration of a generalised one of the exchange sections 326(i) of FIG. 46 in the read mode is shown in FIG. 47A. In this configuration, the data path from the data line D"(i) is via the register RA(i) to the surface shifter 743. In the read mode, the surface shifter applies a shift of (−mx,−my) (mod. 4) to the data paths. From the surface shifter, the data path continues via the FIFO(i) to the data line D(i). The multi-plexer MUX(i) can select if CSD=0 the straight-through path in which its output is D(i), or if CSD=1 the processor selection path in which its output is were j is the value loaded into the register RE(i). The output data passes via the register RC(i) as data D'(i) to the processor PROC(i).

Figure 47B:
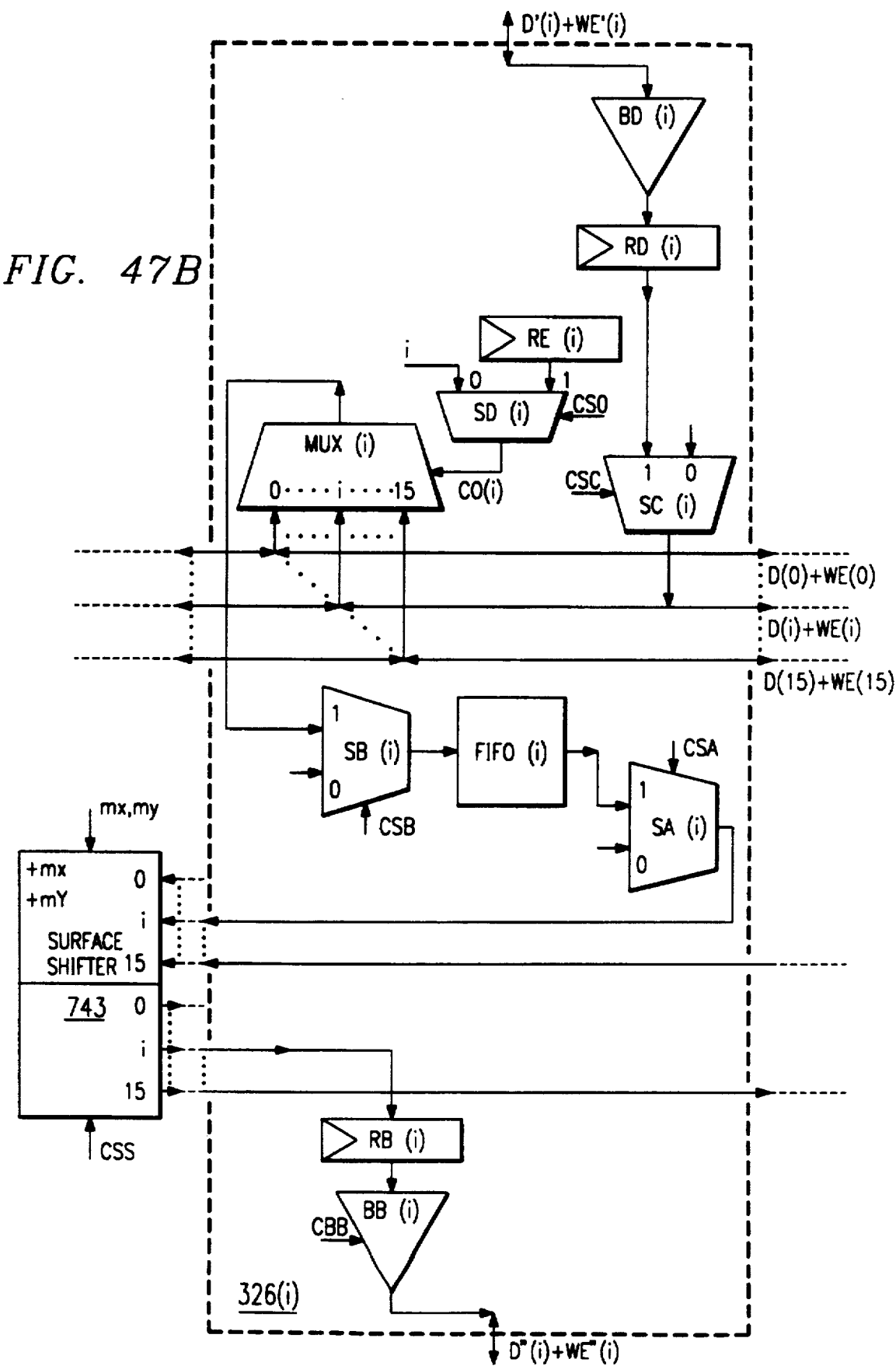

The effective configuration of the exchange section 326(i) in the write mode is shown in FIG. 47B. The data D'(i) from the respective processor PROC(i) passes via the register RD(i) to the data line D(i). The multiplexer MUX(i) can se t, if CSD=0, the straight-through path in which its output is D(i), or if CSD=1 the processor selection path in which its output is D(j) where j is the value loaded into the register RE(i). The output data passes via the FIFO(i) to the surface shifter 743. In the write mode, the surface shifter applies a shift (+mx,+my) (mod. 4) to the data paths. From the surface shifter, the data path continues via the register RB(i) as data D"(i) to the VRAM 700.

It should be noted from FIGS. 46 and 47B that, in the write mode, the write-enable signal follows the same path WE'(i) to WE(i) to WE"(i) as the data signal path D'(i) to D(i) to D"(i). Thus these paths are logically 33 bits made up from 32 bits for the data signal and 1 bit for the write-enable signal.

Figure 47C:
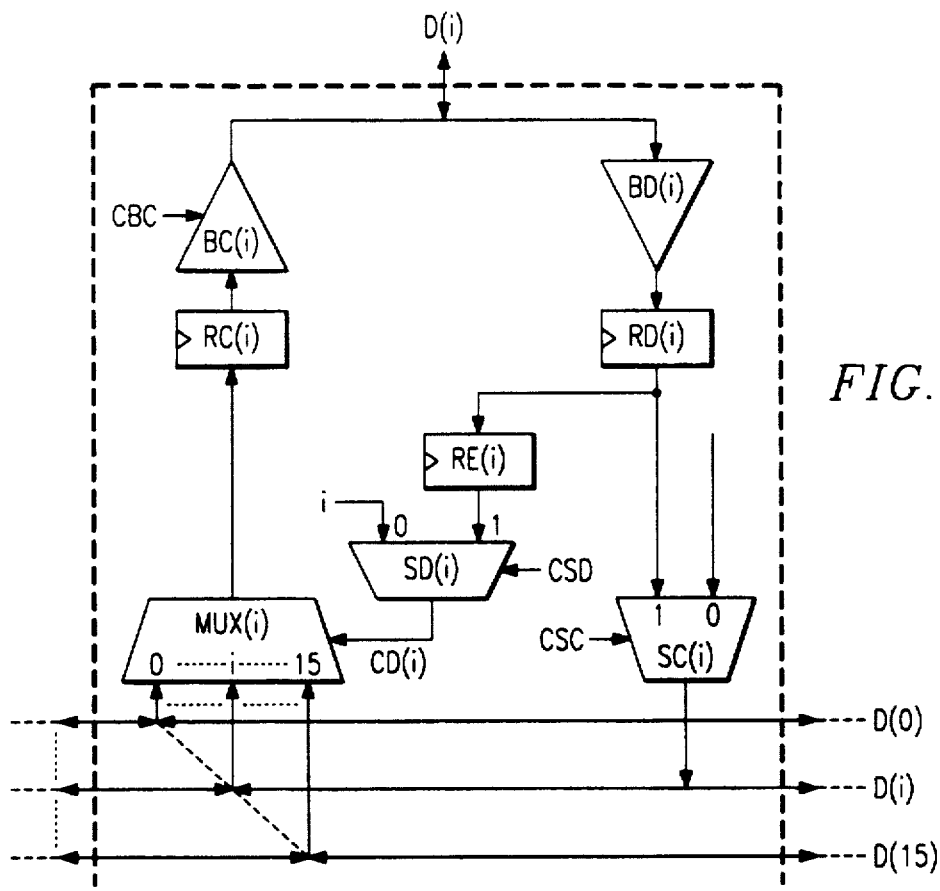

In the transfer mode, the effective configuration of the exchange section 326(i) is as shown in FIG. 47C. In this configuration the control signal CSD to the switch SD(i) is set to 1 so that the multiplexer MUX(i) receives as its control signal the value j loaded into the register RE(i). There are four phases to a transfer. In the first phase the processors output the values j of the data D(i) which they wish to receive as the lowest four bits of their data lines, and these values j are clocked into the registers RD(i). In the second phase, the processors output the data to be transferred out, and this data is clocked into the registers RD(i), while the values j are clocked out of the registers RD(i) and into the registers RE(i), thus setting the multiplexers MUX(i) to receive the data on the respectively selected lines D(j). In the third phase, the data in the registers RD(i) is clocked out onto the lines D and each multiplexer MUX(i) receives and outputs the data on respectively selected line D(j). In the fourth phase, the outputs of the multiplexers are clocked into the registers RC(i) and the tristate buffers BC(i) are enabled so that the processors can transfer in the data from the buffers BC(i). Thus, each processor PROC(i) receives the data (j) from the processor PROC(j) which was selected by the processor PROC(i) by its output value, j in the first phase.

Referring back to FIG. 22, the processors 606(0) are connected to the data broadcast bus 323 and to a priority encoder 614 having 16 sections and which is associated with the sequencer 329. The processors 606(0) to 606(15) communicate address data with the data broadcast bus 323 and the FIFO 332 connects the data broadcast bus 323 with the address processor 310. The processors 606(0) to 606(15) can also supply respective "unsatisfied" signals US(0) to US(15) and respective "X waiting" signals XW(0) to XW(15) to the respective sections of the priority encoder and can receive respective "process enable" signals EN(0) to EN(15) from the respective sections of the priority encoder 614. Lastly, the priority encoder 614 has a sequencer enable (SE) output on line 618 to the sequencer 329 which controls the sequence of processing of a series of microcode instructions by the processors 606.

Figure 23A:
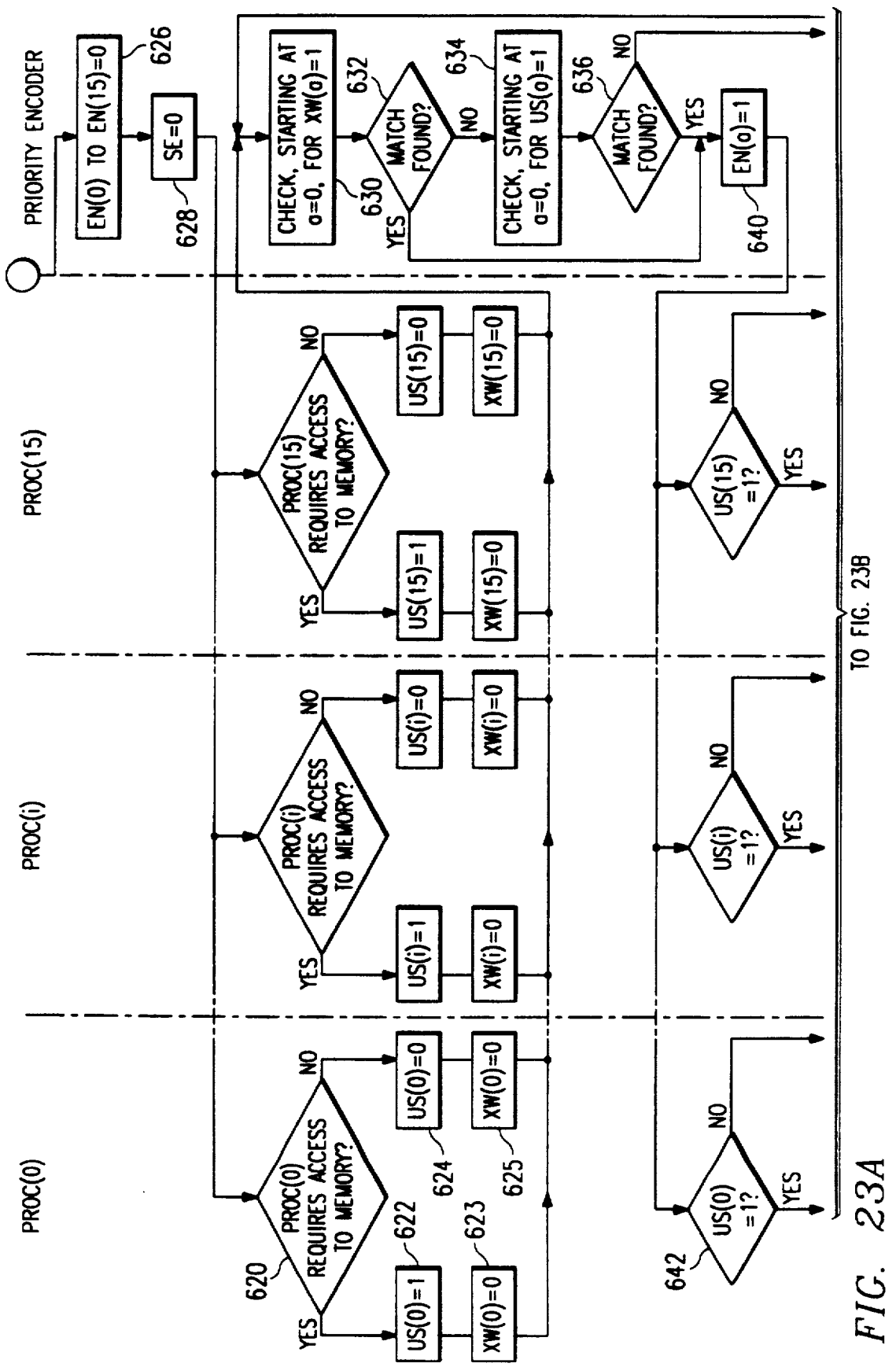
FIG. 23 is a flow diagram illustrating the operation of the processors and a priority encoder of the grid processor of FIG. 22.
Figure 23B:
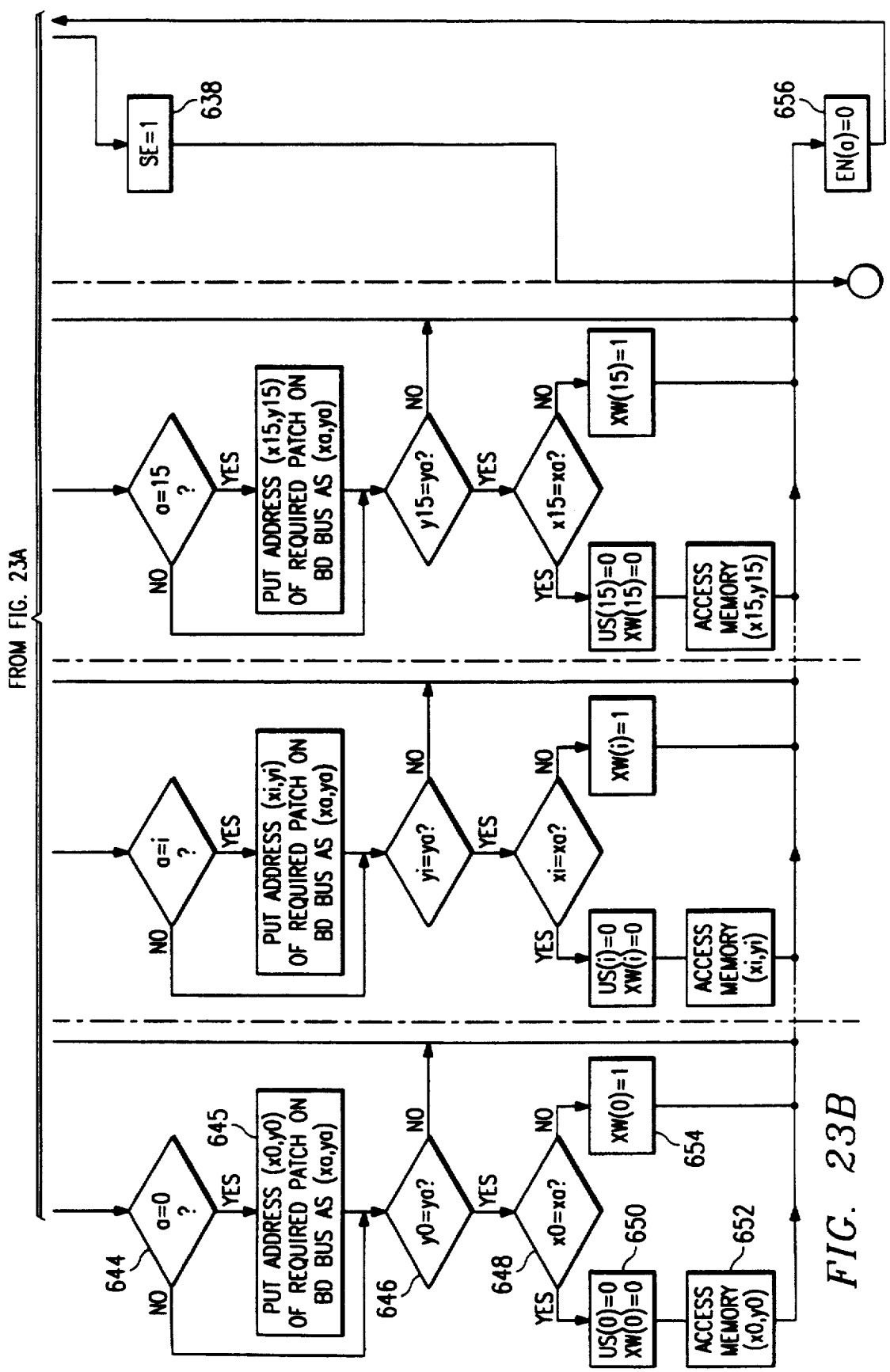

The purpose of the priority encoder 614 is to provide high efficiency in the accessing by the processors 606 of the memory 700. In order to do this, the encoder 614 and processors perform the following process, which is shown in the flow diagram of FIG. 23. In FIG. 23, the left-hand three columns contain steps which are taken by the processors 606(0) . . . 606(i) . . . 606(15), or PROC(0) . . . PROC(i) . . . PROC(15), in parallel with each other, the right-hand column contains steps performed by the priority encoder.

At the beginning of each microcode instruction, there are a series of initialisation steps 620 to 628. In steps 620 to 625, those processors which require access to the memory set (1) their respective unsatified signals US and reset (0) their X waiting signals XW, and those processors which do not require access reset (0) their unsatisfied signals US and their X waiting signals XW. In steps 626, 628, the priority encoder resets (0) the process enable signals EN for all of the processors and also resets (0) the sequencer enable signal SE.

After initialisation, the priority encoder 614 checks through the XW signals, starting with XW(0) in step 630 to find any processor which is X waiting, and if a match is found (step 632) at a processor, designated PROC(q), then the routine proceeds to step 640. If a match is not found, however, in step 632, then the priority encoder checks through the US signals, starting with US(0) in step 634 to find a processor which is unsatisfied, and if a match is found (step 636) for a processor, designated PROC(q), then the routine proceeds to step 640. If a match is not found, however, in step 636, then this indicates that all processors are satisfied, and accordingly the microcode program can proceed. Therefore, the sequence enable signal SE is set in step 638, and the routine terminates.

In step 640, the process enable signal EN(q) for the selected processor PROC(q) is set. In steps 642, each processor determines whether it is unsatisfied, and if not exits the subroutine of steps 642 to 654. For any processor which is unsatisfied, then in steps 644, that processor determines whether it is the selected processor, and if so supplies, in step 645, to the data broadcast bus 323 as (xq, yq) the virtual address of the base pixel (0,0) of the patch of pixel data which it wishes to process. This address is supplied via the FIFO 332 to the address processor 310, which in response accesses the appropriate locations in the memory 700, swapping in and out pages of pixel data, if required, as described above.

Then, in steps 646, each unsatisfied processor determines whether the y address yi of its required patch of pixel data is equal to the y address yq of the patch which is being accessed. If not, then the processor exits the subroutine of steps 642 to 654. If, however, yi=yq, then in step 648 the processor determines whether the X address xi of its required patch of pixel data is equal to the X address xq of the patch which is being accessed. If so, then the processor resets (0) its unsatisfied signal US(i) and X waiting signal XW(i) in step 650, and accesses the memory for read or write, as appropriate, in step 652. The processor then exits the subroutine of steps 642 to 654. If, in step 648, xi<>xq then in step 654 the X waiting signal XW(i) is set (1), and then the subroutine is exited.

Upon exit frown the subroutine of steps 642 to 654 of all processors PROC(0) to PROC(15), the routine proceeds to step 656, where the priority encoder resets (0) the process enable signal EN(q) for the selected processor. The routine then loops back to step 630.

It will be appreciated from the above that (A) the lowest numbered processor (an arbitrary choice) which is unsatisfied is selected and given access to the memory initially, together with any other processors which require access to the same address as that selected processor. Then, (B) of any remaining unsatisfied processors which require access to the same y address as the selected processor, the lowest numbered processor is given access, together with any other processors requiring the same address. Then, (C) of any remaining unsatisfied processors which require access to the same y address as the last satisfied processor, the lowest numbered processor is given access, together with any other processors which require access to the same address. Step C is repeated, if necessary, and then steps A and B are repeated until all of the processors have been satisfied. The next microcode instruction sequence is then processed.

Figure 24:
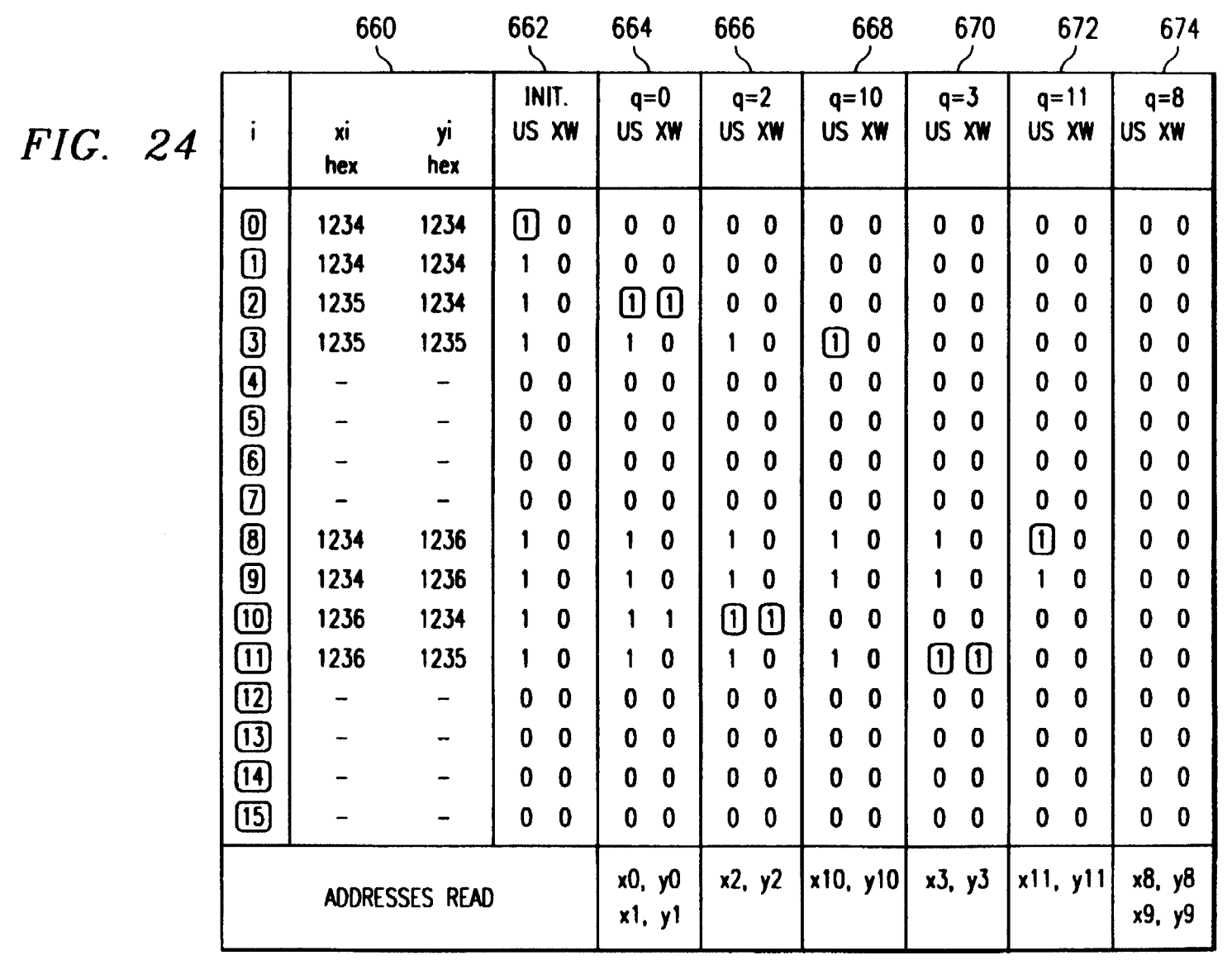

As example of the operation of the priority encoder and processors in accessing the memory will now be described with reference to the table of FIG. 24. In the example, PROC(0) to (3) and (8) to (11) require access to the patches having the base pixel X and Y addresses listed in column 660 of the table, the addresses being in hexadecimal notation. Thus, after the initialisation routine, US(0) to (3) and (8) to (11) are set to 1 and the other US signals and the XW signals are reset to 0, as shown in column 662.

In the first loop of the main routine, PROC(0) is selected, i.e. q=0, and thus accesses the memory at (1234, 1234). Because PROC(1) requires the same address, it also becomes satisfied, i.e. US(1)=0, and accesses the memory at (1234, 1234). Furthermore, because PROC(2) and PROC(10) require the same Y address as PROC(0), they become X waiting, i.e. XW(2)=XW(10)=1. This is shown in column 664.

In the next loop of the main routine, PROC(2) is found to be X waiting XW(2)=1), and thus PROC(2) is selected, i.e. q=2. Therefore PROC(2) becomes satisfied, (US(2)=XW(2)=0), as shown in column 666, and accesses the memory at (1235, 1234).

In the next loop of the routine, PROC(10) is found to be X waiting XW(10)=1), and thus PROC(10) is selected, i.e. q=10. Therefore PROC(10) becomes satisfied, (US(10)=XW(10)=0), as shown in column 668, and accesses the memory at (1236, 1234).

In the next loop of the routine, no processor is found to be X waiting, and PROC(3) is found to be the first completely unsatisfied processor, i.e. US(3)=1, YS(3)=0. Therefore PROC(3) is selected (q=3), becomes satisfied (US(3)=XW(3)=0) and accesses the memory at (1235, 1235). Also because PROC(11) has the same Y address as PROC(3), PROC(11) becomes X waiting, i.e. XW(11)=1, as shown in column 670.

In the next loop of the routine, PROC(11) is found to be the only X waiting processor, (US(11)=XW(11)=1). Therefore, PROC(11) is selected (q=11), becomes satisfied (US(11)=XW(11)=0) and accesses the memory at (1236, 1235), as shown in column 672.

In the next loop of the routine, PROC(8) is found to be the first unsatisfied processor (US(8)=1). Therefore, PROC(8) is selected (q=8), becomes satisfied, and accesses the memory at (1234, 1236). Furthermore, because PROC(9) requires the same address, it also becomes satisfied (US(9)=0) and accesses the memory.

During the next loop of the routine, no processors are found to be unsatisfied, and therefore the sequence enable signal SE is set and the next microcode instruction is processed.

By using the priority encoder as described above, processors which require access to the same patch can access that patch simultaneously. Furthermore, when a plurality of processors require access to different patches having the same Y address, their accesses are made immediately one after the other, in "page mode". Therefore the address translator does not need to re-latch the Y address(es) in the Y address latches 706(0) to (15) (FIGS. 8 and 14) between such accesses. Thus, a considerable improvement in performance is achieved as compared with a case where the processors PROC(0) to (15) access their required patches one at a time, sequentially and without reference to any similarity between the addresses to be accessed.

In the system described above, up to sixteen pixels in a patch are processed in parallel by sixteen processors. Preferably, the system is also arranged so that a group of patches, for example, up to 32 patches, are processed in series in order to reduce pipeline start and finish overheads. In this case, the method of operation may be modified, as compared with that shown in FIG. 23, in order to increase efficiency, by permitting any processor requiring access to, say, a jth pixel in the group to request that pixel without firstly waiting for all the other processors to complete access to their (j−1)th pixels in the group. To do this, between steps 623 and 630 in FIG. 23, for each processor the step "set address of first required pixel in group as (xi, yi)" is included for each processor PROC(i). Furthermore, steps 650 and 652 for each processor as shown in FIG. 23 are replaced by the steps shown in FIG. 48. In step 682, the memory is accessed at address xi, yi for the particular processor PROC(i). Then, in step 684, it is determined whether or not the processor PROC(i) requires access to a further pixel in the group, and if not in step 686, the unsatisfied flag US(i) and the X waiting flag XW(i) are both reset to 0, similarly to step 650 in FIG. 23. However, if so in step 684, then in step 688 the processor PROC(i) sets the address of the next required pixel as (xi, yi). Then, in step 690, it is determined whether or not the new y address yi is equal to the Y address yq of the last accessed pixel. If so, then in step 692, the X waiting flag XW(i) is set to 1, whereas if not, then in step 694, the X waiting flag XW(i) is reset to 0. After steps 692 or 694, the routine proceeds to step 656 as in FIG. 23. It will therefore be appreciated that, once any processor has accessed a pixel in its series of required thirty-two pixels, it can immediately make itself ready to access the next pixel in its series, irrespective of how many of their required thirty-two pixels each of the other processors has accessed. This therefore makes good use of the page mode accessing of the VRAM in which a series of pixels with the same Y address are accessed without the need to re-latch the Y address between each access.

Figure 48:
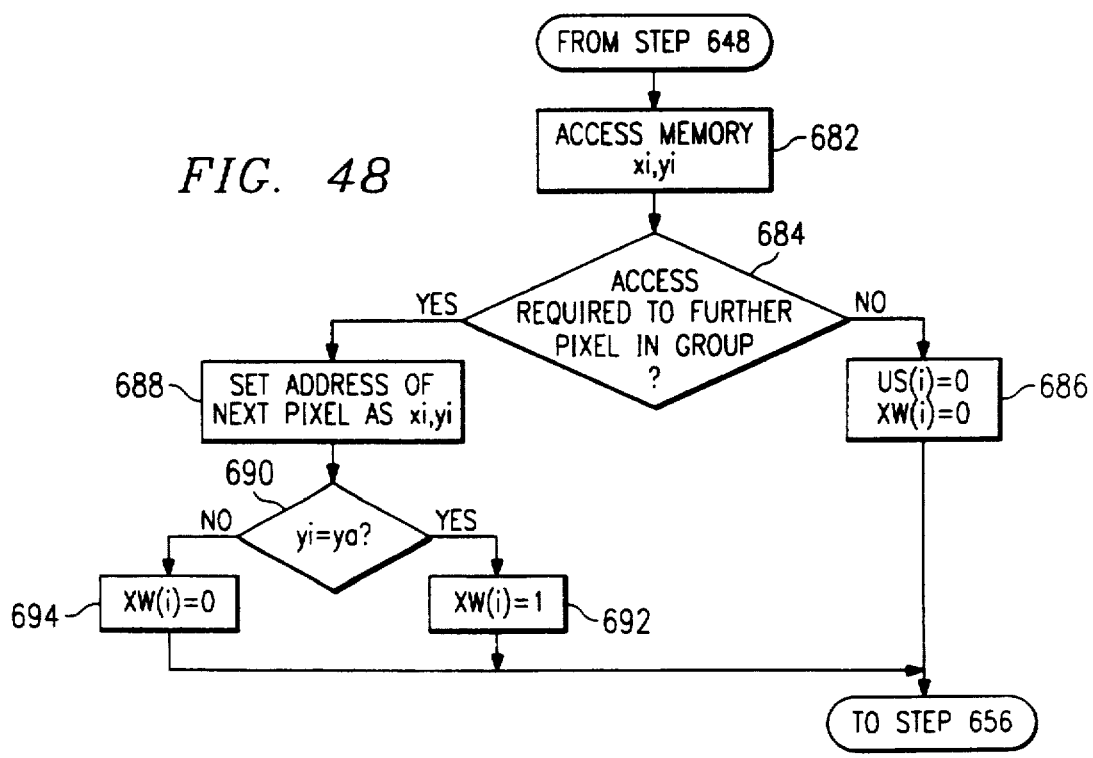
FIG. 48 shows a modification to part of the flow diagram at FIG. 23.

A problem which can arise with the modification of FIG. 48 is that some of the processors can inordinately race ahead of others of the processors in accessing their thirty-two pixels. For example, in the case where the processors require access to many different Y addresses, it may arise that PROC(0) accesses all of its thirty-two required pixels first, then PROC(1) accesses its thirty-two pixels, and so on. In order to obviate this problem, the following further modification may be made. Basically, access is permitted with the following order of priority: (a) of highest priority, processors which require access in page-mode (i.e. with the same Y address as the last access) are arbitrated for access; (b) of second priority, processors which have progressed least through their series of thirty-two accesses are arbitrated for access; and (c) of lowest priority there is arbitrary selection of any processors still requiring access. This is achieved by maintaining in a register file of each processor a respective local pointer LP(i) indicating which of its 32 accesses it is waiting for, a common low watermark pointer WM for all the processors, and a common high watermark pointer HP for all the processors. Furthermore, the significance of each unsatisfied flag US(i) is FIGS. 23 and 48 is modified so that US(i)=1 only if LP(i)=WM and the processor PROC(i) is unsatisfied. The process of FIGS. 23 and 48 is then modified as follows. In the initialisation steps 622 to 625, the additional steps are included of resetting to zero LP(i) and WM in the register files of all processors, and setting HP to the number of accesses in the series, usually 31. The step 642 in FIG. 23 is replaced by "LP(i)<>HP?". Furthermore, accompanying step 682 in FIG. 48, where a processor accesses the memory, it also increments it local pointer to LP(i)+1. This then has the affect of dealing with priorities "a" and "b" described above. In order to deal with the priority "c" above, an additional decision is included between steps 636 and 638 in FIG. 23. If the low watermark pointer WM is less than the high pointer HP, then the low watermark pointer in each of the processor register files is incremented to WM+1, and the process loops back to step 630. However, if WM=31 the process proceeds to step 638. From the above, it will be appreciated that the low watermark pointer is always less than or equal to the lowest local pointer LP(i). When there is no page mode, only those processors whose local pointer LP(i) is equal to the low watermark pointer WM are initially involved in the access arbitration. If there are none, the watermark pointer is incremented, unless it is equal to HP.

SPLIT-LEVEL PATCHES

It will be noted from the above that the memory is capable of storing pixel data of 32 bits and that the grid processor is capable of processing pixel data logically of at least 32 bits. In some applications, pixel data having a resolution as great as 32 bits is not needed, and that may be required is 16-bit or 8-bit pixel data. In such cases it is possible to use only 16 or 8 bits of the 32 bits available for each pixel but this would then result in the VRAM not being used to its full capacity, and pages of pixel data would need to be swapped between the VRAM and the paging memory more often than is necessary.

It may therefore be considered expedient to split the whole image memory into two for 16-bit data, or four for 8-bit data, and thus overlay whole pages of data one on top of another. This would make available the whole capacity of the VRAM, but would suffer from the disadvantage that severe complications would arise when swapping, for example, just one page of 16-bit or 8-bit data between the VRAM and page memory, because it would be necessary to select only half or a quarter of the stored data for transfer from the VRAM to the paging memory, and it would be necessary to mask off half or three-quarters of the VRAM when transferring a page of data from the paging memory to the VRAM.

There now follows a description of an arrangement which avoids these problems associated with transfer of 16-bit or 8-bit data between the VRAM and paging memories.

In essence, the data is overlaid so that at no single address for each of the 128 VRAMs 710 does there exist data for more than one page. This is achieved by overlaying the 8- or 16-bit pixel data in units of a pixel, or more preferably units of a patch, as described below.

Figure 25:
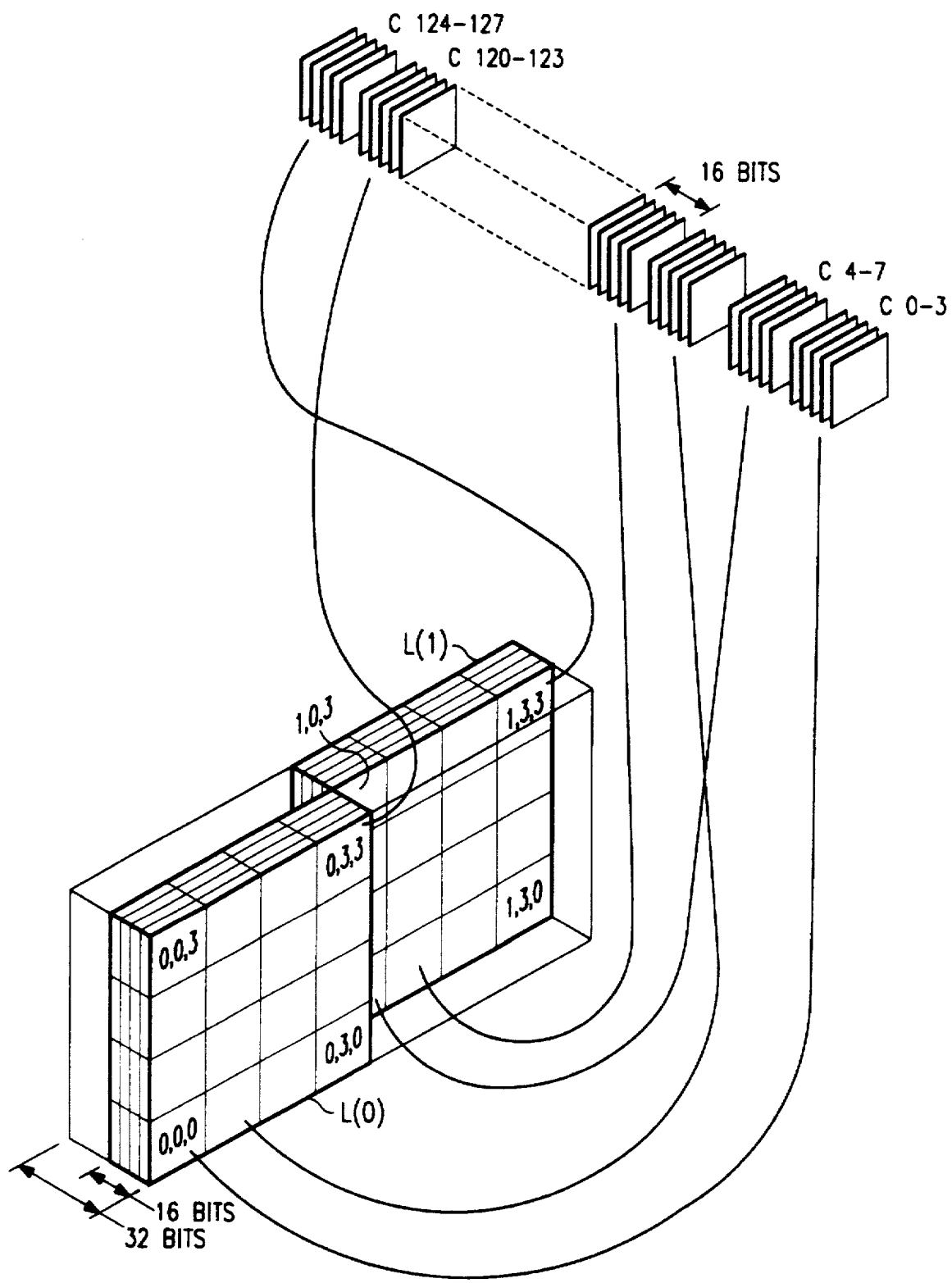
FIG. 25 illustrates the correlation between aligned memory cells and two levels of a patch in a 16-bit split patch system.

Referring to FIG. 25, an aligned set of memory cells C(0) to C(127), one from each VRAM chip, and each 4 bits wide, is shown. In the 32-bit arrangement described above, these cells form an aligned patch of 4×4 pixels.

In the 16-bit patch-overlay modification, these cells form two layers L(0), L(1) of a 8×4 patch. L(0) is provided by C(0) to (3), C(8) to (11), C(16) to (19) . . . C(120) to (123). L(1) is provided by the remaining cells C(4) to (7), C(12) to (15), C(20) to (27) . . . C(124) to (127). When the image represented by the two layers of the patch is to be displayed, layer L(0) is displayed immediately to the left of the layer L(1), as shown in FIG. 25.

In the 8-bit patch-overlay modification the cells form four layers L(0) to (3) of 16 pixel×4 pixel patch. The layers are provided by the cells as follows:

Layer L(0): C(0), C(1), C(8), C(9) . . . C(120), C(121)
Layer L(1): C(2), C(3), C(10), C(11) . . . C(122), C(123)
Layer L(2): C(4), C(5), C(12), C(13) . . . C(124), C(125)
Layer L(3): C(6), C(7), C(14), C(15) . . . C(126), C(127)

When the image represented by the four layers of a patch is to be displayed, the layers are displayed left to right in the order L(0), L(1), L(2), L(3).

A different address format needs to be employed when using 16-bit and 8-bit overlayed patches as compared with that used for the more straightforward 32-bit case, and is given in the table below:

|  | BITS OF VIRTUAL ADDRESS | | |
|---|---|---|---|
|  | 32-bit mode | 16-bit mode | 8-bit mode |
| X misalignment | 0,1 | 0,1 | 0,1 |
| Level | — | 2 | 2,3 |
| X patch address | 2–6 | 3–7 | 4–8 |
| X page address | 7,8 | 8 | — |
| X portion of superpage address | 9–15 | 9–15 | 9–15 |
| Y misalignment | 16,17 | 16,17 | 16,17 |
| Y patch address | 18–22 | 18–22 | 18–22 |
| Y page address | 23,24 | 23,24 | 23,24 |
| Y portion of superpage address | 25–31 | 25–31 | 25–31 |
| Image ID portion of superpage address | 32–47 | 32–47 | 32–47 |

It will be noted that, between the different modes, there is no change of identity of the sixteen bits representing the image ID (32–47), the sixteen bits representing the Y address (16–31), the seven bits representing the X portion of the superpage address (9–15), and the two X misalignment bits (0,1). The X patch address is, however, represented by bits 2–6 for 32-bit mode, by bits 3–7 for 16-bit mode, and by bits 4–8 for 8-bit mode. This makes available bit 2 in the 16-bit mode, and the two bits 2 and 3 in the 8-bit mode, to provide the level data, and leaves only one bit 8 in the 16-bit mode, and no bits in the 8-bit mode, for the X page address.

The patch and page arrangements and the address notations used for them are represented in FIGS. 26–29. FIG. 26 shows the arrangement of patches in a single 16-bit page, and FIG. 27 shows the arrangement of 8 pages in one complete 16-bit superpage. FIG. 28 shows the arrangement of patches in a single 8-bit page, and FIG. 29 shows the arrangement of 4 pages in one complete 8-bit superpage.

Figures 31, 32:
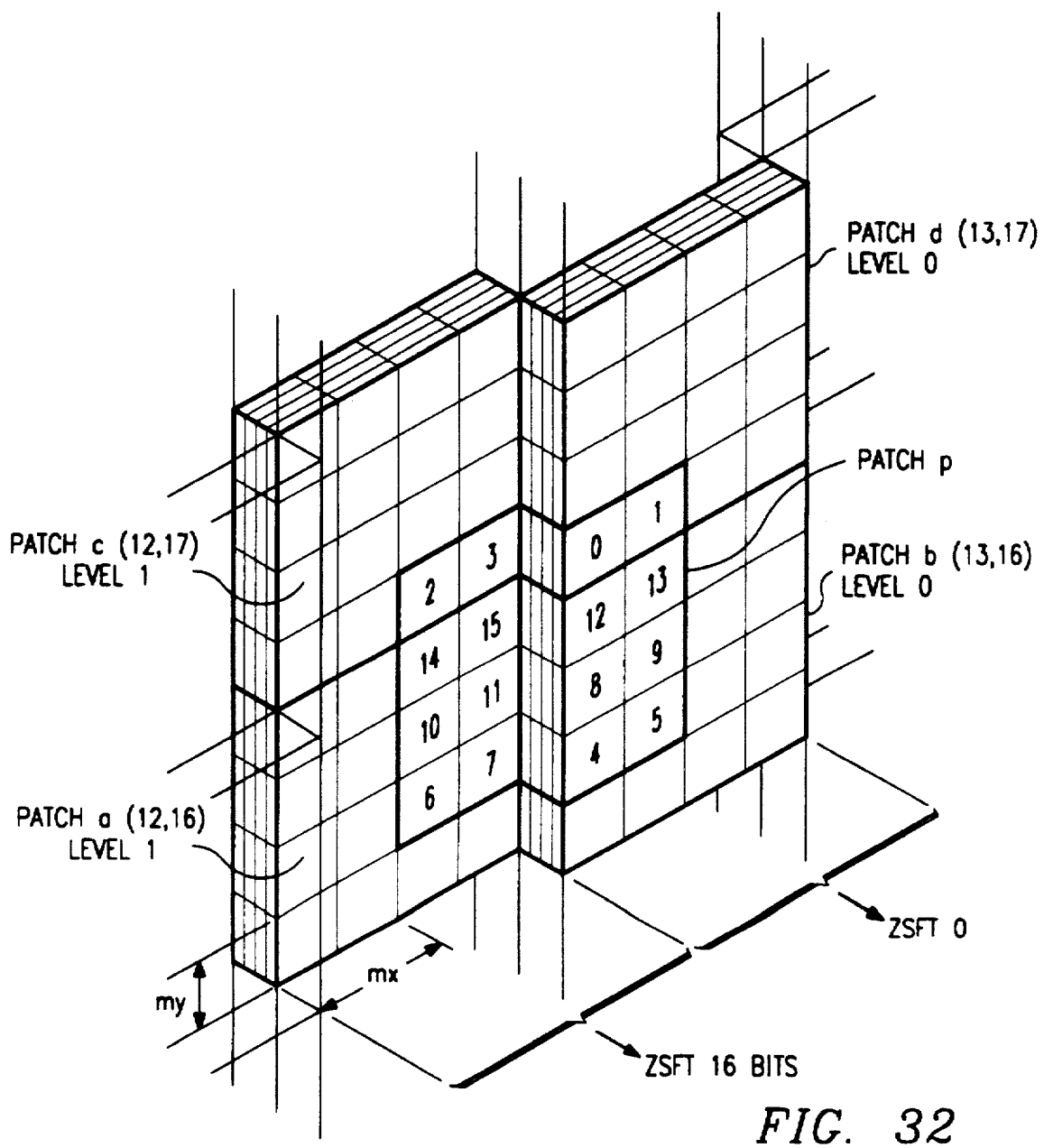
FIG. 31 is a table to explain the operation of a funnel shifter used in the circuit of FIG. 30A.
FIGS. 32 and 33 illustrate non-aligned split patches in a 16-bit and an 8-bit patch system, respectively.

A number of complications arise when dealing with 16- or 8-bit data. Firstly, it is necessary to ensure that the X bits of the address are used in the proper manner. In order to do this, the supply of data from the virtual address bus 319 to the page table 756, near page edge table 758 and X patch address incrementor 760X as shown in FIG. 15A is modified as shown in FIG. 30A. As before, the page Y bits, 23,24 are fed directly to the page table 756 and the patch Y bits, 18–22 are fed directly to the patch Y address multiplexers 784Y, etc. However, the X bits 2–8 (which form the page and patch X addresses in the 32-bit version) are input to a funnel shifter 812. The shift provided by the funnel shifter is controlled by a mode select signal MS on line 814 which is generated by a separate circuit in response to image header information provided prior to an image or graphics processing operation and which indicates whether the pixel data is 32-, 16- or 8-bit. The funnel shifter provides a page address of up to two bits, a 5-bit patch X address, and the level data L of up to two bits. The relationship between the inputs to and outputs from the funnel shifter 812 is shown in the table of FIG. 31, and it will be noted that it corresponds to the required shifting derivable from the table set out above.

The next complication arises due to the need to present the 16- or 8-bit pixels to the grid processor during reading such that the appropriate 16 or 8 bits of each pixel will be processed and not the remaining irrelevant 16 or 24 bits. This complication is overcome by supplying, during a read operation, all 32 bits from a location in the memory to the grid processor, together with shift data ZSFT in response to which the grid processor shifts the read pixel data by an amount corresponding to the ZSFT data, and then processes predetermined bits of the shift data, e.g. bits 0–15 for 16-bit processing, or bits 0–7 for 8-bit processing.

A further complication arises due to the possibility of a read patch of data not being aligned with the patch level boundaries. This complication is overcome in a somewhat similar manner to that described above with respect to 32-bit patches not being aligned with the patch boundaries in the memory. To illustrate the above, reference is made to FIG. 32, which shows a 16-bit patch p in which the base pixel is in level L=1 of base patch a at (12,16) and is misaligned (mx,my)=(2,1). The address of the patch p in its respective page would therefore be (px,py)=(12,16); L=1; (mx,my)= (2,1). It will be seen that, because patch p has a non-zero x misalignment, mx>0, part of the patch is at the other level L=0, and furthermore because both mx>0 and the level of the base pixel is 1, part of the patch p is in another aligned patch b having patch address (13,16). Furthermore, because also the y misalignment my>0, the patch p also extends into aligned patches c and d at patch addresses (12,17) and (13,17) respectively and at levels 1 and 0, respectively. The determination of the further aligned patch addresses b, c, d is performed by the patch x and y address multiplexers 784

X,Y and the patch y address increment select tables 780 Y described above with reference to FIG. 15 and by a modified form of the patch X address increment select table 780X which is responsive to the level data L and the mode select signal MS in addition to the X misalignment mx, as shown in FIG. 30B. The modified table 780X provides a 1-bit output to the X patch address multiplexer 784X in accordance with the truth table set out in FIG. 30C.

The amount of shifting ZSFT required for each pixel in the grid processor so that each pixel occupies bits 0–15 in 16-bit mode and bits 0–7 in 8-bit mode at the grid processor is determined as follows. It will be appreciated from viewing the 16-bit example of FIG. 32, that the pixels labelled 6, 7, 10, 11, 14, 15, 2 and 3 will require ZSFT of 16 bits and that the pixels labelled 4, 5, 8, 9, 12, 13, 0 and t require zero ZSFT. This is specific to the case where the x misalignment mx=2 and the base level is 1. It will be appreciated that for the general case of a misalignment mx, where 0<=mx<=3 and a level L=0 or 1, the required ZSFT for a pixel at an X location x relative to the base pixel of the patch p will be 0 bits if mx+x<4 and L=0, or if mx+x>3 and L=1, and will be 16 bits if mx+x>3 and L=0, or if mx+x<4, and L=1.

Figure 33:
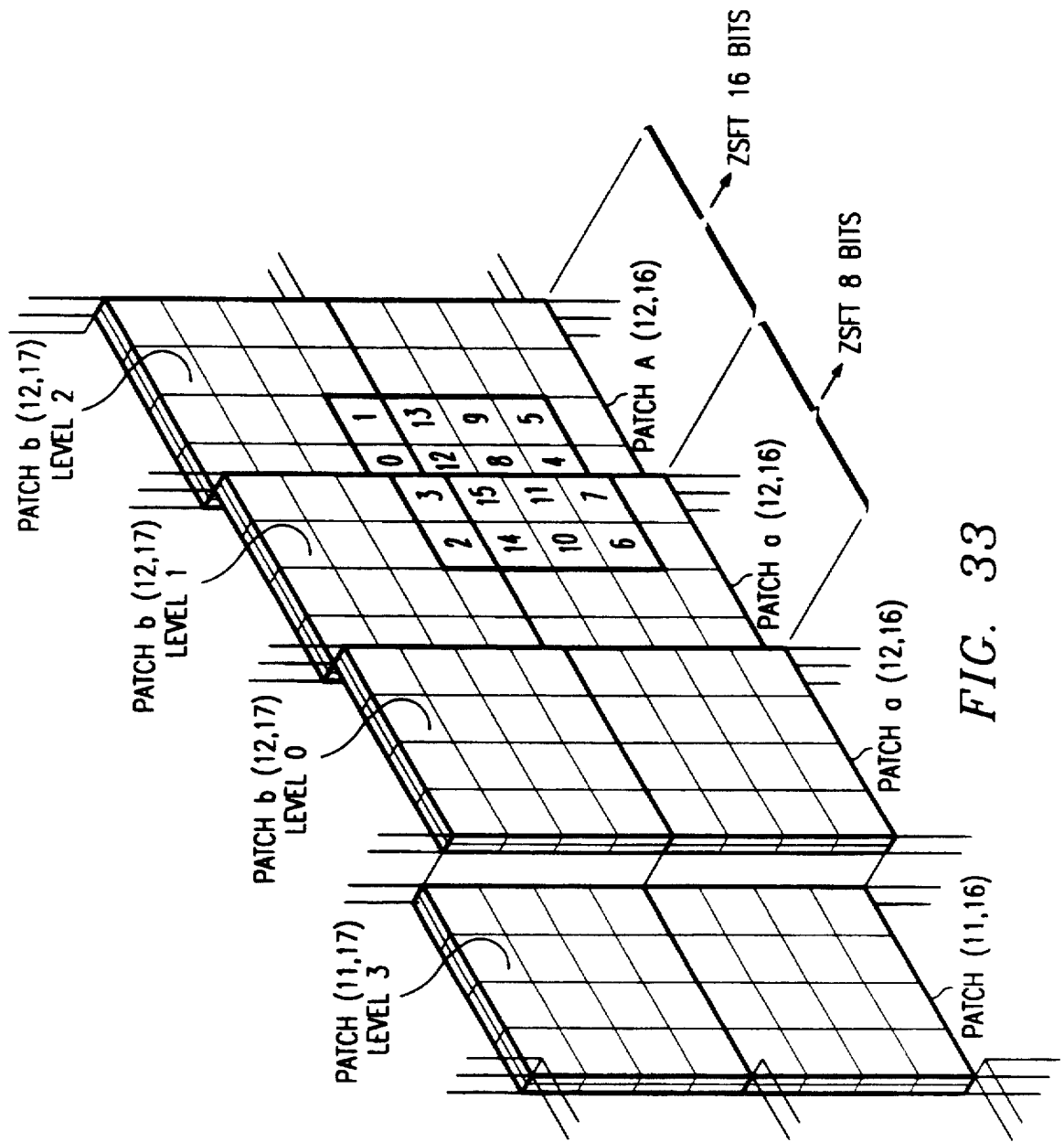

As a further illustration, reference is made to FIG. 33, which shows an 8-bit patch p which has an address in its respective page of (px,py)=(12,16); L=1; (mx,my)=(2,1). In this case, the pixels labelled 6, 7, 10, 11, 14, 15, 2 and 3 require a ZSFT of 8 bits, and the pixels labelled 4, 5, 8, 9, 12, 13, 0 and 1 require a ZSFT of 16 bits. In the general case of a misalignment tax, where 0<=mx<=3, and a level L where 0<=L<=3, the required ZSFT for a pixel at an X location x relative to the base pixel of the patch will be zero bits if mx+x<4 and L=0, or if mx+x>3 and L=3; will be 8 bits if mx+x<4 and L=1 or if mx+x>3 and L=0; will be 16 bits if mx+x<4 and L=2; or if mx+x>3 and L=1; and will be 24 bits if x mx+x<4 and L=3, if mx+x>3 and L=2.

Figure 15B:
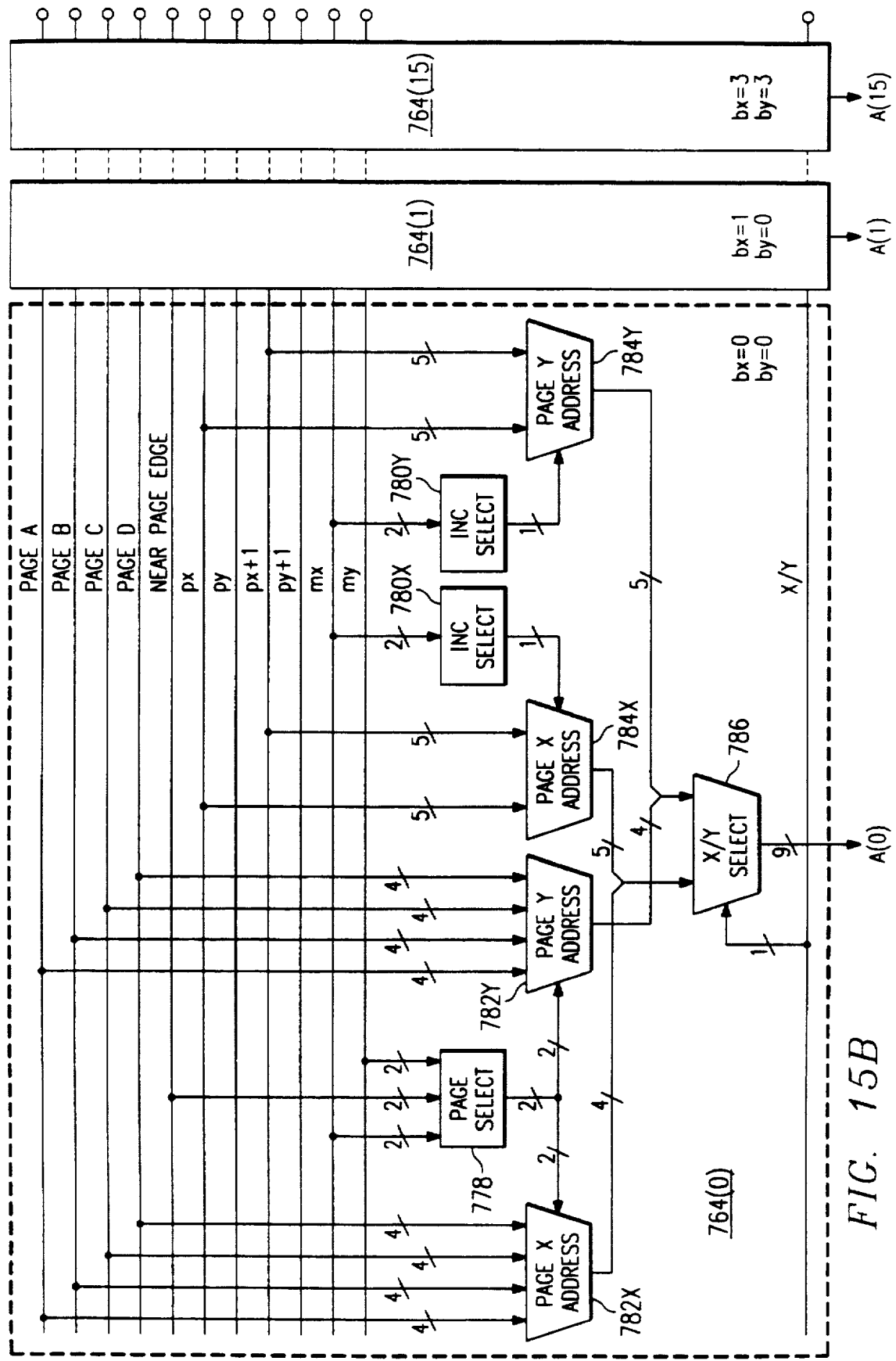
Figures 34, 35A, 35B:
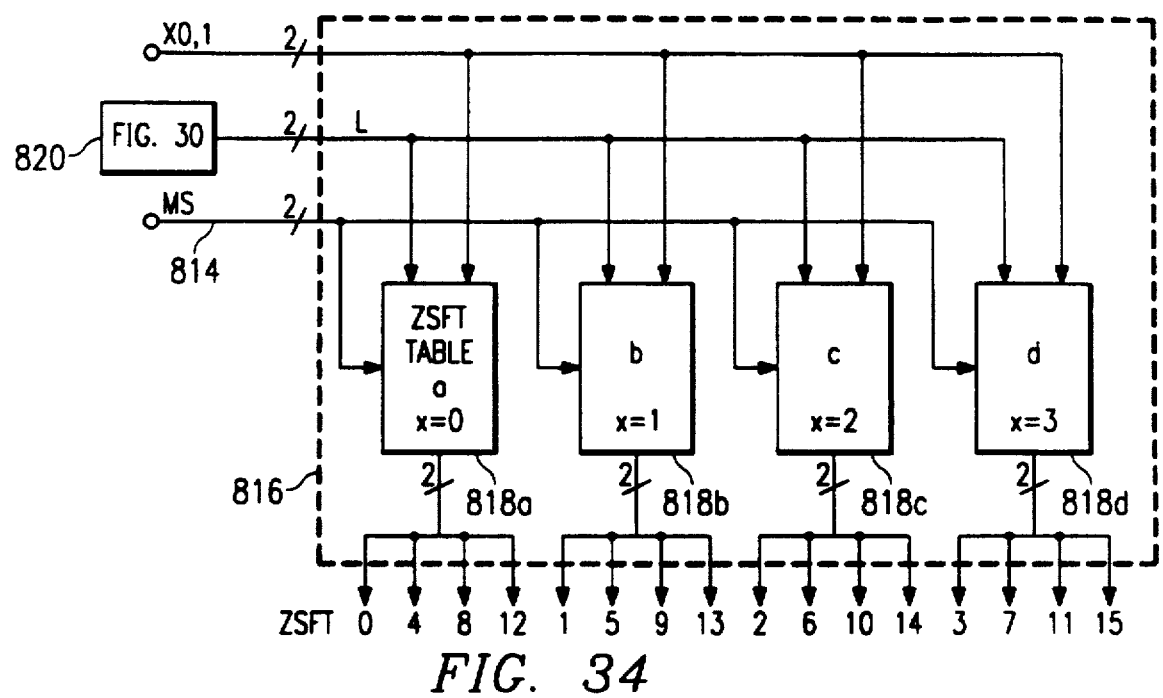
FIG. 34 shows a further modification of part of the address translator of FIG. 15 used in the split patch system.
FIGS. 35A and 35B are tables which illustrate the operation of look-up tables in the circuit of FIG. 34.

In order to provide the required ZSFT value for each pixel, circuit of FIG. 15 includes the addition shown in FIG. 34, in addition to being modified as described above with reference to FIGS. 30 and 31. The level value L and also the bits 0,1 of the ritual address for the misalignment mx are supplied as addresses to four ZSFT tables 818 a to d implemented using combinational logic. The ZSFT tables 818 also receive the mode select signal MS on line 814 and have three sections for 32-, 16- and 8-bit operation which are selected in dependence upon the MS signal. The ZSFT table 818a supplies the ZSFT values ZSFT(0), (4), (8), (,12) corresponding to data D(0), (4), (8), (12) supplied from the read surface shifter 742 to the exchange 326; ZSFT table 818b supplies ZSFT (1), (5), (9), (13) for data D(1), (5), (9), (13); ZSFT table 818c supplies ZSFT (2), (6), (10), (14) for data D(2), (6), (10), (14); and ZSFT table 818d supplies ZSFT (3), (7), (11), (15) for data D(3), (7), (11) and (15). It will therefore be appreciated that the four ZSFT tables 818a to d correspond to pixels having X addresses of x=0, x=1, x=2 and x=3, respectively, in the patch p relative to the base pixel of the patch p.

The table set out in FIG. 35A defines the values of ZSFT stored in the ZSFT tables 818a to d for different input misalignments mx, levels L and modes (8-, 16- or 32-bit) and in dependence upon the x value for the particular ZSFT table. As a further example, FIG. 35B sets out the values of ZSFT for the particular ZSFT table 818b (x=1) for all possible values of mx, L and mode. In these tables, the ZSFT values of 0, 1, 2, 3 represent a required shift of 0, 8, 16 and 24 bits respectively.

Figures 36A, 36B:
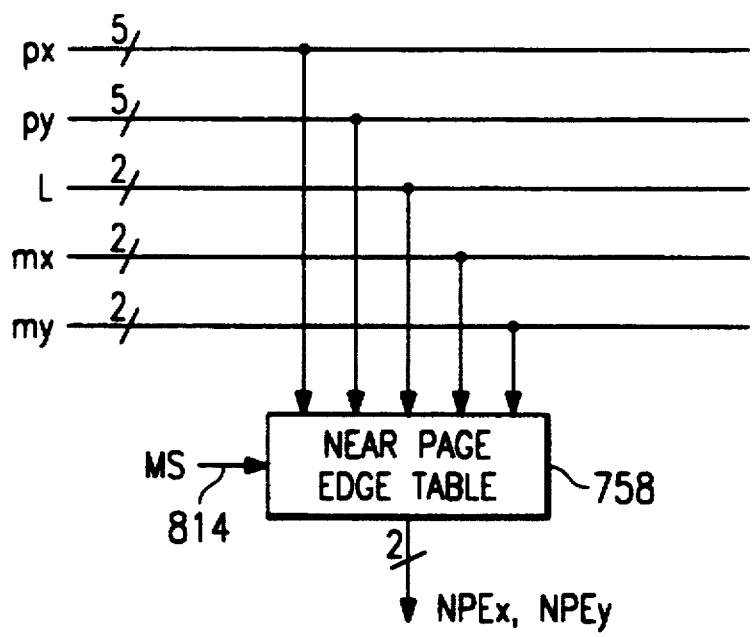
FIGS. 36A and 36B shows modifications of a near-page-edge table of FIG. 15A used in the split patch system.

A further complication which arises when dealing with 8 or 16 bit data is that the X near-page-edge signal no longer needs to be dependent solely upon whether or not 4 px+mx>124, but is also dependent upon the mode selected and the level data L. The X near-page-edge signal is set only if the highest X patch address is designated (i.e. px=31), and if the highest level data is designated (i.e. L=1 in 16-bit mode, or L=3 in 8-bit mode), and if the misalignment mx is non-zero. Accordingly, the near-page-edge table 758 shown in FIG. 15A is modified as shown in FIG. 36A so as to receive the mode select signal MS on line 814 and the level signal L, in addition to the patch address (px,py) and the misalignment (mx,my). The modified table 758 of FIG. 36A produces X and Y values NPEx and NPEy of the 2-bit NPE signal as shown by the table set out in FIG. 36B.

Figure 37:
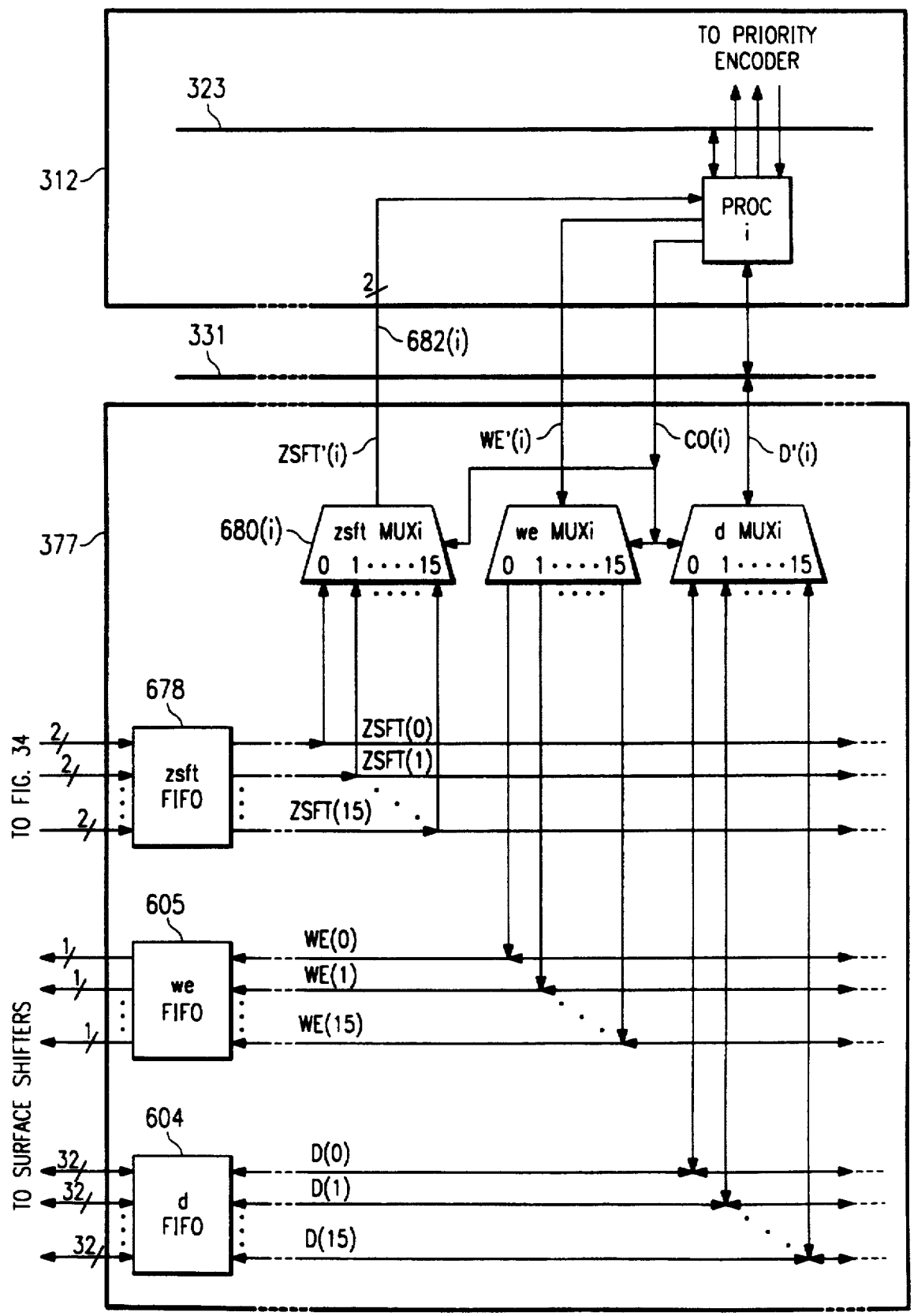
FIG. 37 illustrates, in part, a modification to the exchange and grid processor of FIG. 22 used in the split patch system.

As described above, during reading, ZSFT data ZSFT(0) to (15) is supplied to the crossbar 327 with the pixel data D(0) to (15). Also, as described earlier with respect to FIG. 22, each processor PROC(0) to (15) is capable of reading any of the data D(0) to (15). It is therefore necessary to ensure that the ZSFT data appropriate to the selected pixel data is supplied each processor. FIG. 37 shows a modification to the crossbar 377 and part of the grid processor arrangement of FIG. 22 for a generalised processor PROC(i) where 0<=i<=15. The modified arrangement is similar to the arrangement of FIG. 15 except in the following respects. Firstly, a 16×2-bit ZSFT FIFO 678 is provided to receive ZSFT(0) to (15). The output of the ZSFT FIFO 678 is supplied to each of sixteen 16:1 2-bit multiplexers 680(0) to 680(15). The 2-bit outputs of the ZSFT multiplexers 680(0) to 680(15) are supplied to the respective processors PROC(0) to PROC(15) as signals ZSFT'(0) to (15). The ZSFT multiplexers are controlled by the same logical control signals CO(0) to CO(15) as the associated data and write enable multiplexers. It will therefore be appreciated that each processor receives the appropriate ZSFT data for the pixel data which is selects and can then shift the received pixel data by 0, 8, 16 or 24 bits in dependence upon the value 0, 1, 2 or 3 of the received ZSFT data so that the received pixel data then always occupies the first 8 bits of the processor's input register in 8-bit mode, or the first 16 bits of the input register in 16-bit mode.

It will be appreciated that the arrangement of the multiplexers and FIFOs shown in FIG. 37 may be modified in a similar manner to the modification of FIG. 22 which is described above with reference to FIGS. 46 and 47.

A further complication which arises when dealing with 16-bit or 8-bit pixel data is that, during writing to the memory 700, only the appropriate 16 or 8 bits should be written, and the remaining 16 or 24 should not be overwritten. For example, referring to FIG. 32, during writing of the patch p as shown, the memory cells which are to store the 16-bit pixels labelled 6, 7, 10, 11, lz4, 15, 2 and 3 need to have bits 16 to 31 written, with writing of bits 0 to 15 disabled, and the memory cells which are to store the pixels labelled 4, 5, 8, 9, 12, 13, 0 and 1 need to have bits 0 to 15 written, with bits 16 to 31 being disabled. As a further example, referring to FIG. 33, the memory cells which are to store the 8-bit pixels labelled 6, 7, 10, 11, 14, 1.5, 2 and 3 need to have bits 8 to 15 written, with bits 0 to 7 and 16 to 31 being disabled, and the memory cells which are to store the pixels labelled 4, 5, 8, 9, 12, 13, 0 and 1 need to have bits 16 to 23 written with bits 0 to 15 and 24 to 31 disabled.

Figures 38, 39, 40:
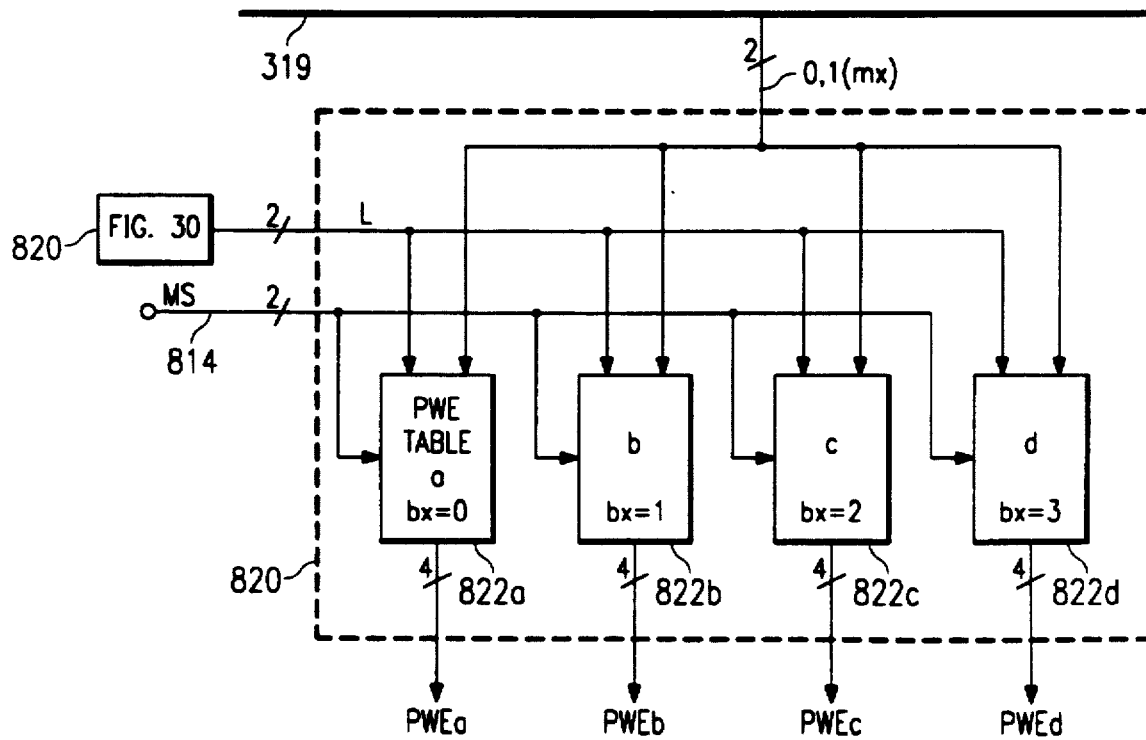
FIGS. 38 and 39 are tables which illustrate the operation of further tables in a further modification of part of the address translator of FIG. 15.
FIG. 40 shows the further modification to FIG. 15.
Figure 41:
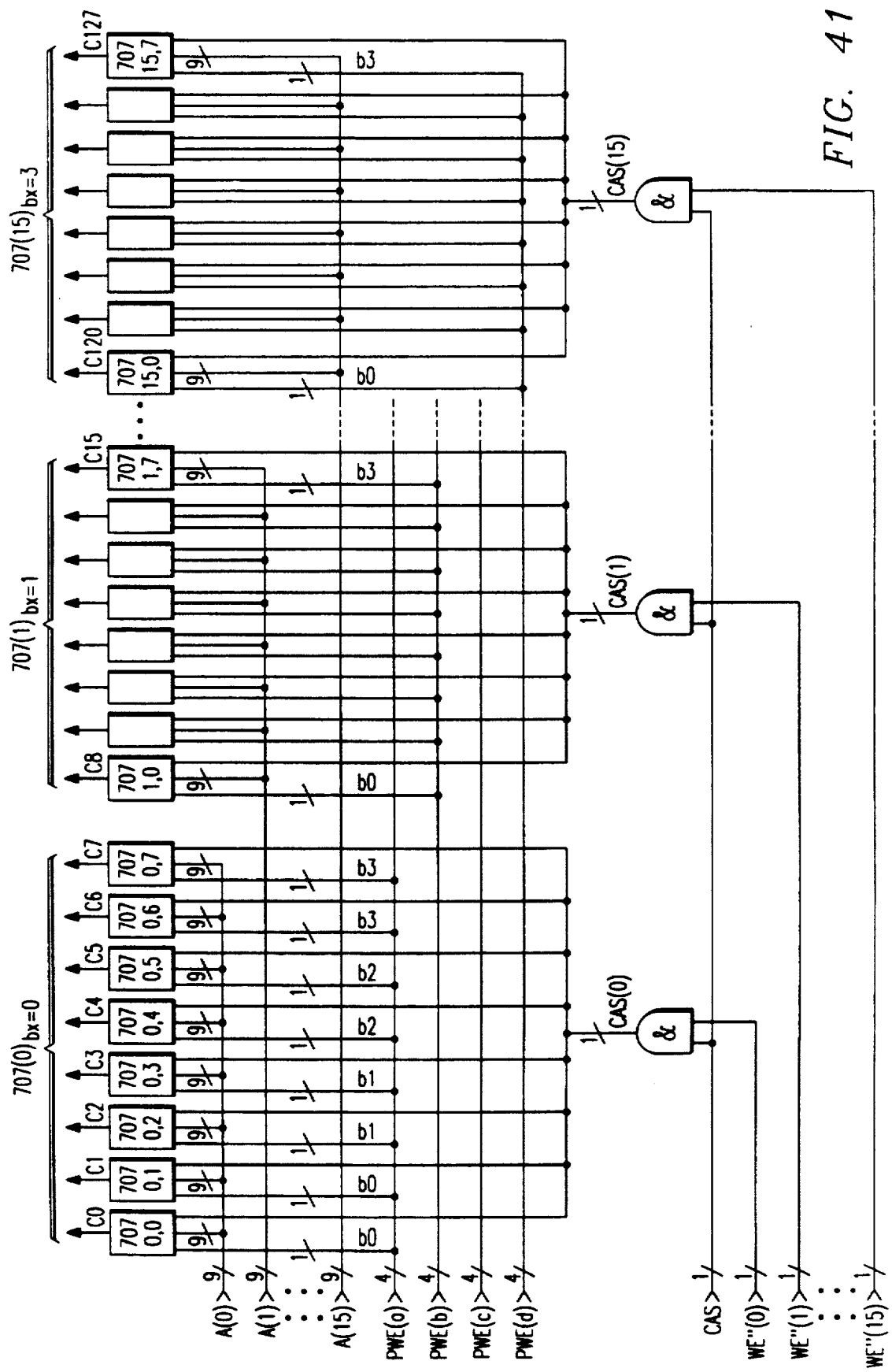
FIG. 41 shows a modification to FIG. 8 which is made in addition to the modification shown in FIG. 40.

In order to deal with this complication, the circuit of FIG. 40 is employed, which provides partial write enable signals PWEa to PWEd for the memory banks having x addresses of bx=0, 1, 2 and 3, respectively. The circuit of FIG. 40 comprises four PWE tables 822a to d for the values bx=0 to 3, respectively. Each PWE table 822 is provided with the bits 0,1 of the virtual address on bus 319 indicating the X misalignment tax, the value L from the circuit 820 of FIG. 30, and the mode select MS signal on line 814. The PWE tables contain the data as set out in FIG. 38 and therefore a table having a particular value of bx can provide the 4-bit value PWE in dependence upon the input values of mx, L and MS.

in addition to adding the circuit of FIG. 40, the connections to the X latch groups 707(0) to (15) (see FIGS. 8 and 14) are modified as shown in FIG. 41. The column address strobe CAS signal is still ANDed with the write enable signals WE"(0) to (15) to produce the signals CAS(0) to (15) and the addresses A(0) to (15) are also applied to respective groups 707(0) to 707(15) of X latches. The various bits of the partial write enable signals PWE(a) to (d) are connected to write enable inputs of the X latches for the cells 0 to 127 as follows:

| PWE bits | | Cells |
| --- | --- | --- |
| PWE(A) | bit 0 | 0, 1, 32, 33, 64, 65, 96, 97 |
| | bit 1 | 2, 3, 34, 35, 66, 67, 98, 99 |
| | bit 2 | 4, 5, 36, 37, 68, 69, 100, 101 |
| | bit 3 | 6, 7, 38, 39, 70, 71, 102, 103 |
| PWE(b) | bit 0 | 8, 9, 40, 41, 72, 73, 104, 105 |
| | bit 1 | 10, 11, 42, 43, 74, 75, 106, 107 |
| | bit 2 | 12, 13, 44, 45, 76, 77, 108, 109 |
| | bit 3 | 14, 15, 46, 47, 78, 79, 110, 111 |
| PWE(c) | bit 0 | 16, 17, 48, 49, 80, 81, 112, 113 |
| | bit 1 | 18, 19, 50, 51, 82, 83, 114, 115 |
| | bit 2 | 20, 21, 52, 53, 84, 85, 116, 117 |
| | bit 3 | 22, 23, 54, 55, 86, 87, 118, 119 |
| PWE(d) | bit 0 | 24, 25, 56, 57, 88, 89, 120, 121 |
| | bit 1 | 26, 27, 58, 59, 90, 91, 122, 123 |
| | bit 2 | 28, 29, 60, 61, 92, 93, 124, 125 |
| | bit 3 | 30, 31, 62, 63, 94, 95, 126, 127 |

It will therefore be appreciated that, during writing in the 8-bit or 16-bit mode, only the relevant memory cells are write enabled, and the remaining cells are disabled.

It will be recalled that, in 8-bit mode, the data is processed as the first 8 bits of their 32-bit capacity by the processors, and in 16-bit mode as the first 16 bits. Therefore, in order to ensure that, upon writing, the processors can write to bits 8 to 31 of the memory in 8-bit mode, or bits 6 to 31 of the memory in 16-bit mode, prior to writing, each processor which is to write duplicates, in 8-bit mode, the pixel data of locations 0 to 7 in its output register at bit locations 8 to 15, 16 to 23 and 24 to 31 of the output register, and duplicates, in 16-bit mode, the pixel data of bit locations 16 to 31. Accordingly, when the enabled bits of the pixel data are written to the memory, the complete data for the pixel is written.

FLAGGING OF MODIFIED PAGES

Figure 42:
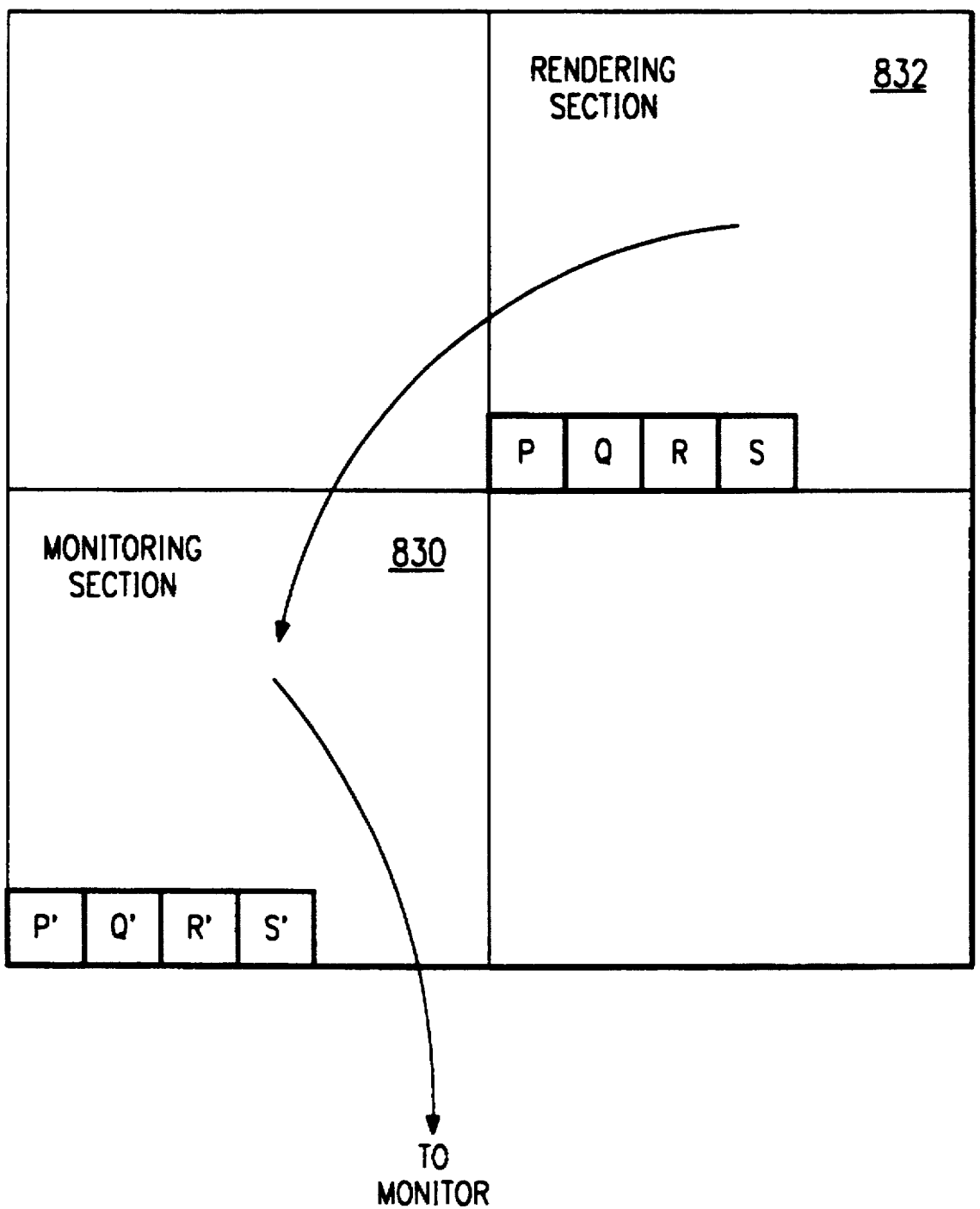

Referring to FIG. 42, it is convenient that a predetermined section 830 of the VRAM 700 is always mapped to the monitor 40, and for simplicity the section will be considered between page addresses (0,0) and (7,7) giving a total mapped area of 8×8×31×31×4×4=1 Mpixel. It is also convenient that images are rendered in another section of the VRAM 780, and for simplicity the section 832 between pages addresses (8,8) and (15,15) will be considered. Then, periodically, the data of the rendering section 832 is copied to the monitoring section, for display on the monitor. It will be appreciated that the data for some pixels may not change between one copying operation and the next, and indeed it can arise that no pixel data changes between two successive copying operations. If these unchanged pixels are unnecessarily copied from the rendering section to the monitoring section, then the performance of system is impaired.

In order to overcome this problem, it may be considered expedient to flag each pixel which is modified during a rendering operation and to copy only those pixels which have been flagged. However, this would require an inordinate amount of memory to store the flags and would require an excessive amount of flag setting, testing and resetting, which would degrade the system performance. In the arrangement described below, therefore, pages which have been changed, or dirtied, in a rendering operation are flagged, and only the flagged dirty pages are copied to the monitoring section of the memory.

It will furthermore be appreciated that, if a page of pixel data is copied from the paging memory to the VRAM, and that if that page is not modified, or dirtied, in the VRAM, then there is no need to copy that page of data back to the paging memory when the time comes to replace that page in the VRAM with a different page from the paging memory. Accordingly, in the arrangement described in detail below, a flag is set when a page is dirtied in any rendering operation while it is in the VRAM, and when the page is to be replaced, it is copied back to the paging memory only if the flag is set.

Figure 11B:
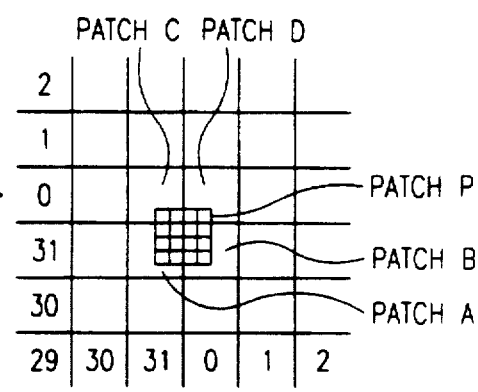
Figure 11B:
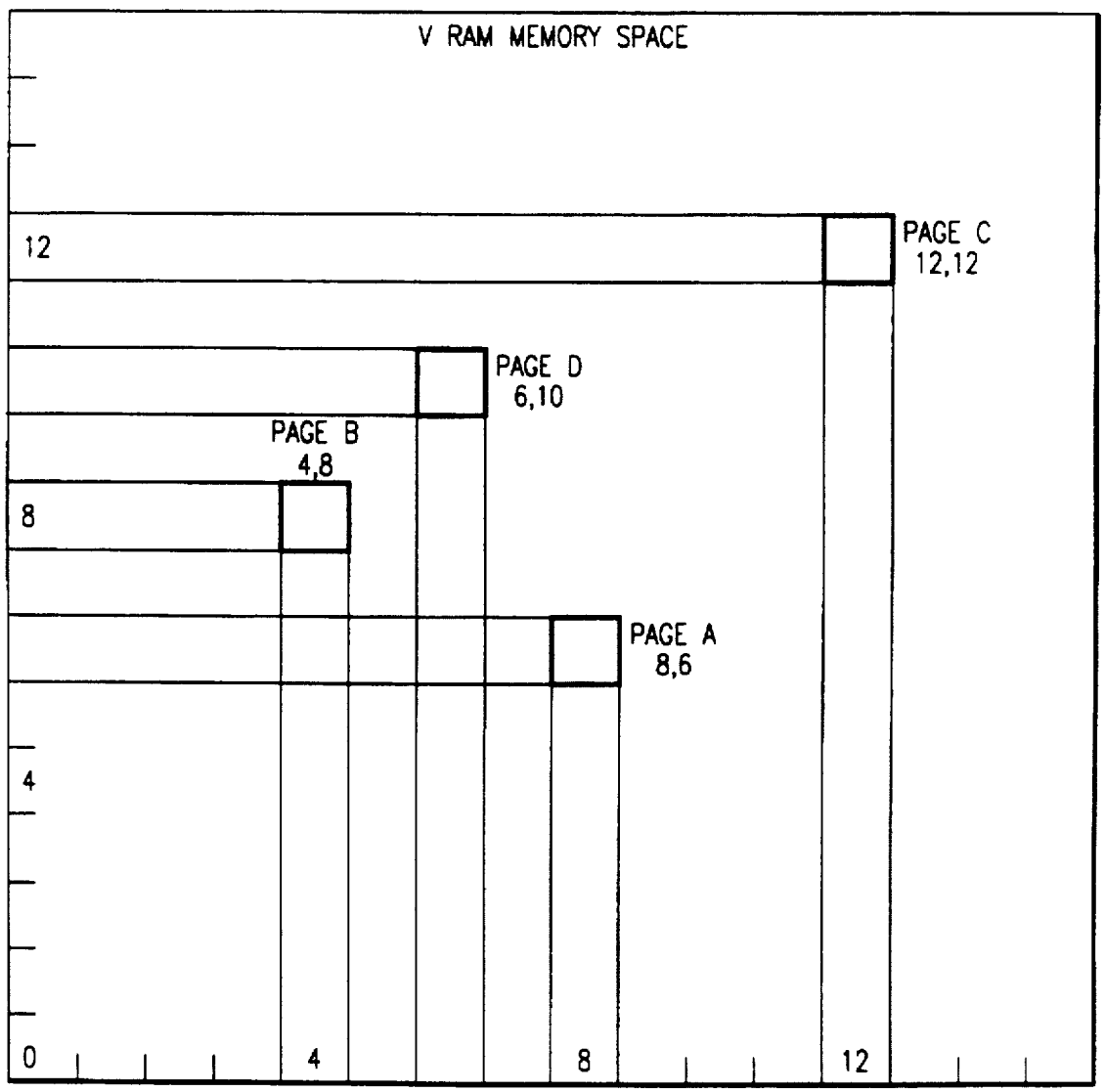

It should be noted that pixel data in the VRAM is processed in patches and that a non-aligned patch may extend across a page boundary. Therefore the arrangement described below also includes for each page, dirty flags for the pages B, C and D, as shown in FIG. 11, to the right, above and the right and above, of the page A in question. It should be noted that if page A has a virtual page address (PX,PY) then pages B, C and D have; virtual page addresses (PX+1, PY), (PX, PY+1) and (PX+1, PY+1), respectively.

Figure 43:
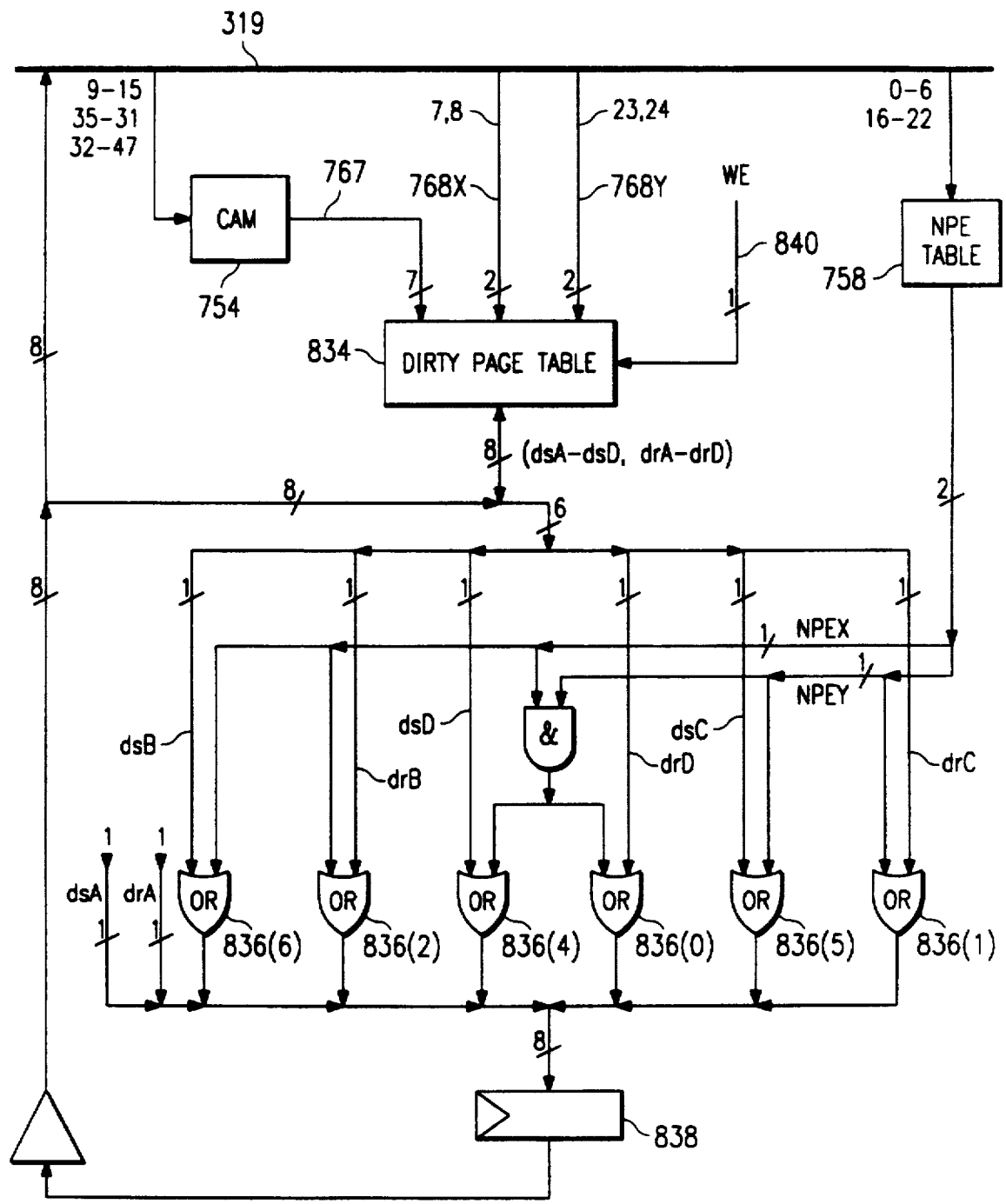

Referring to FIG. 43, a dirty-page table 834 is provided by a 2K SRAM which is addressed by the 7-bit superpage identification on line 767 from the CAM 754, and the 2-bit page X address and 2-bit page Y address from the virtual address bus 314 on lines 768X,Y. The eight data bits at each location in the table 834 are assigned as follows:

| bit 7 | Page A dirty swap | dsA |
| bit 6 | Page B dirty swap | dsB |
| bit 5 | Page C dirty swap | dsC |
| bit 4 | Page D dirty swap | dsD |
| bit 3 | Page A dirty render | drA |
| bit 2 | Page B dirty render | drB |
| bit 1 | Page C dirty render | drC |
| bit 0 | Page D dirty render | drD |

Bits 0 to 2 and 4 to 6 of the dirty page data are supplied to respective OR gates 836 (0) to (2) and 836 (4) to (6). At gates 836 (6) and (2), the signals dsB and drB are ORed with the near-page-edge X signal NPEX. At gates 836 (5) and (1) dsC and drC are ORed with the near-page-edge Y signal NPEY, and at gates 836 (4) and (0), the signals dsD and drD are ORed with an ANDed form of the near page edge X and Y signals on line 774. The six bits output from the OR gates, together with a pair of high bits, representing the new signals dsA and drA, are then passed via a register 838 for writing back into the dirty page table 834 under control of a dirty pages write-enable signal DWE on line 840. The 8-bit data line of the dirty page table 834 is also multiplexed onto the 48-bit virtual address bus 319, and the address processor is operable (a) to reset the appropriate dirty swap bits and set the appropriate dirty render bits when a new page is swapped from the paging memory to the VRAM, (b) to set the appropriate dirty swap bits and dirty render bits for a page when rendering operation is carried out on that page, (c) to test the appropriate dirty swap bits for a page when that page is to be replaced by a different page in the VRAM, and (d) to test the appropriate dirty render bits for a page when that page is to be copied from the rendering section to the monitoring section of the VRAM and to reset the dirty render bits.

An example of the operation of the dirty page arrangement will now be described with reference to FIGS. 42 and 43, the table of FIG. 44 and the flow diagrams of FIG. 45. Suppose that b, pages P, Q, R, S of pixel data at (X,Y) page addresses (0,0), (1,0), (2,0), (3,0) in the same superpage are copied into the VRAM at contiguous page addresses (8,8), (8,9), (8,10), (8,11), and that the superpage has an identification code of 25 in the CAM 754. Suppose also that the rendering section 832 between page addresses (8 8) and (15,15) in the VRAM is copied over to the monitoring section 830 between pages addresses (0,0) and (7,7) in the memory. Suppose also that three rendering operations are carried out in the rendering section, the first rendering operation affecting page Q, the second operation affecting page P and including a misaligned patch which extends into page Q, and the third operation affecting pages Q and S; the pages P to S then being replaced by four other pages.

The dirty page data for pages P to S will be located at addresses 400 (=25×16+0+0), 401,402 and 403 in the dirty page table 840. Referring to FIGS. 44 and 45A, when page P is copied from the paging memory into the VRAM, it is treated as page A for the purposes of FIG. 45A. In step 842 bit 7 (dsA) of the dirty flag for page A is reset and bit 3 (drA) of the dirty flag for page A is set. In step 844, the address processor determines whether there is a page B' stored in the physical memory, that is the page to the left of page A. If so, in step 846, bit 6 (dsB) and bit 2 (drB) of the dirty flag for page B' are reset and set respectively. Similar steps 848, 850 and 852, 854 are carried out for pages C' and D', that is pages below and to the left and below of page A in the paging memory. Then, in step 856, page A is copied from the paging memory of the VRAM. The process of FIG. 45A is then repeated for pages Q,R & S. It will therefore be appreciated that the dirty flags for pages P to S attain the state as shown in column 902 of FIG. 44.

Figure 44:
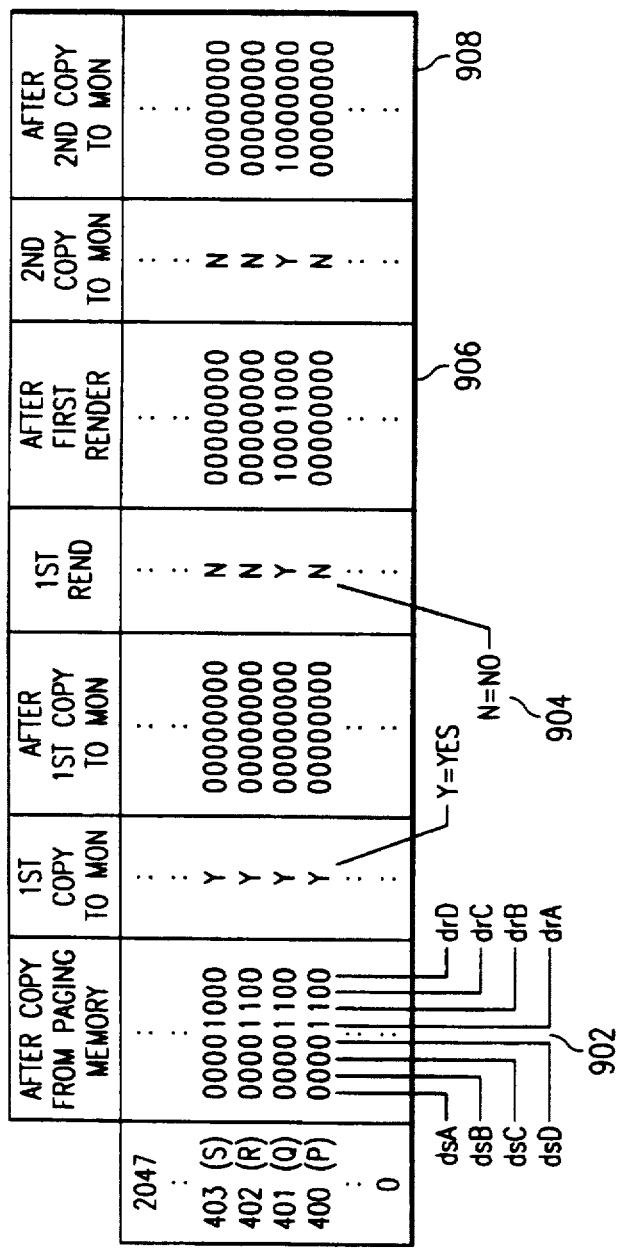
Figure 44:
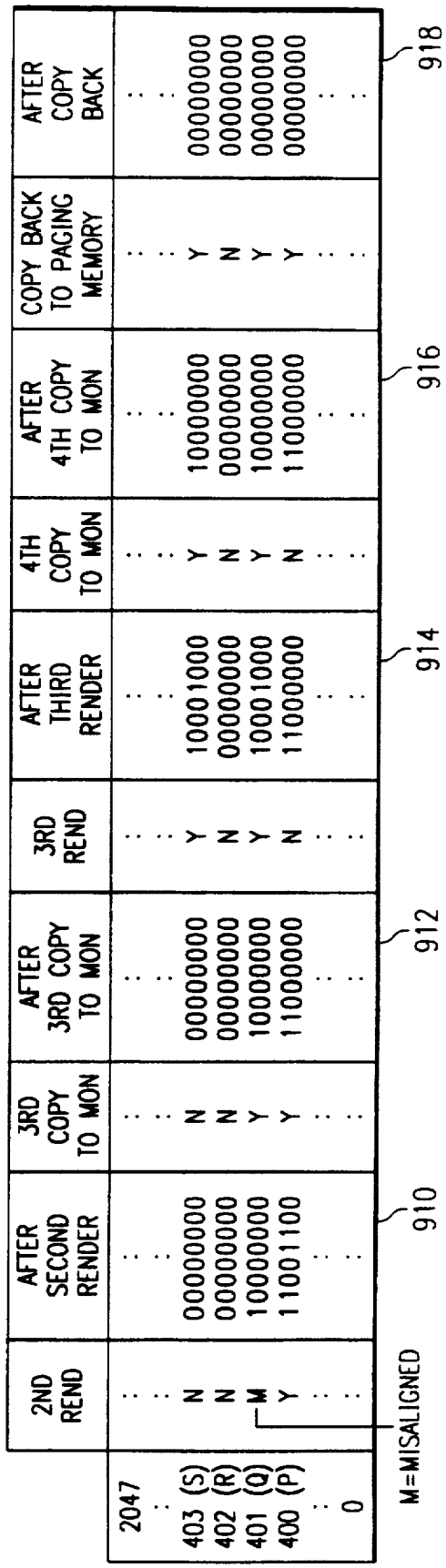
Figures 45A, 45D:
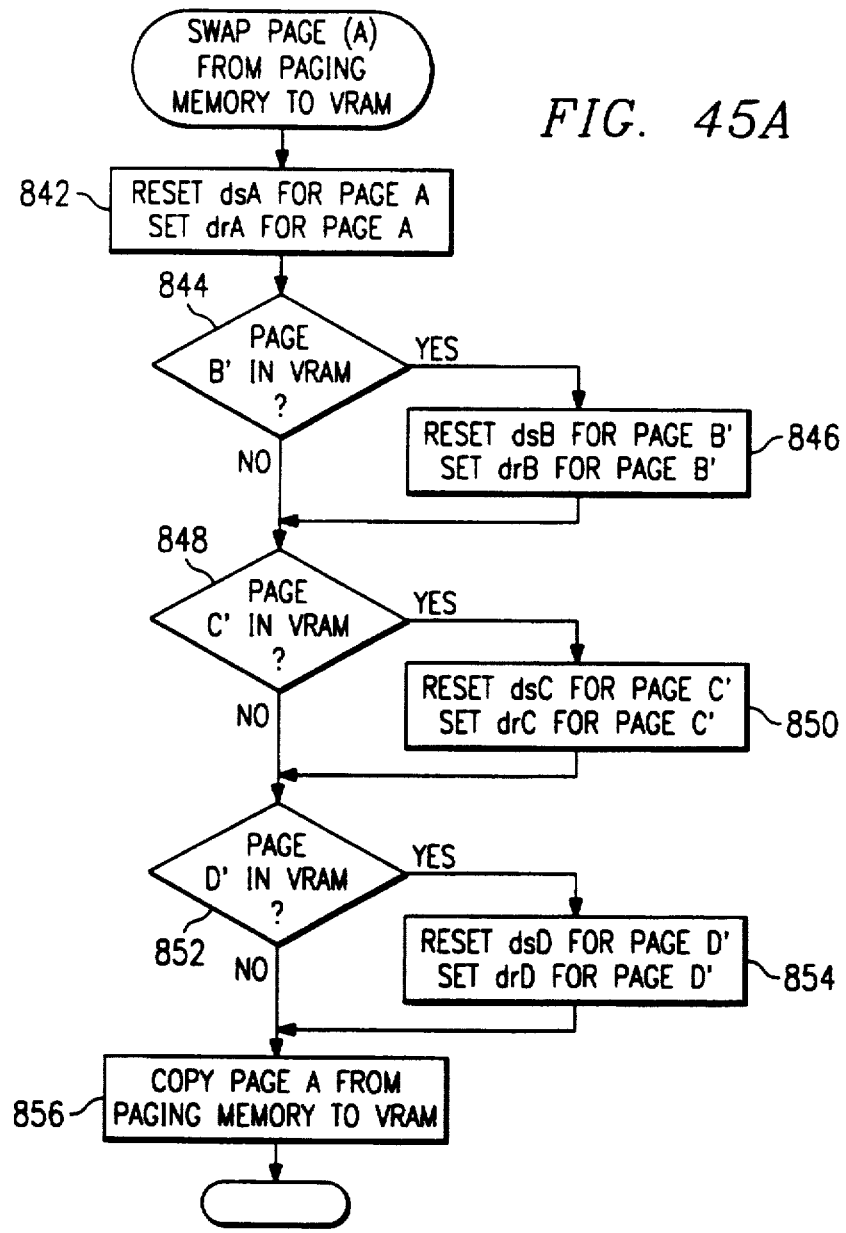
FIGS. 45A to 45C are flow diagrams illustrating the copying operations and FIG. 45D shows the notation used in FIGS. 45A to 45C.
Figure 45B:
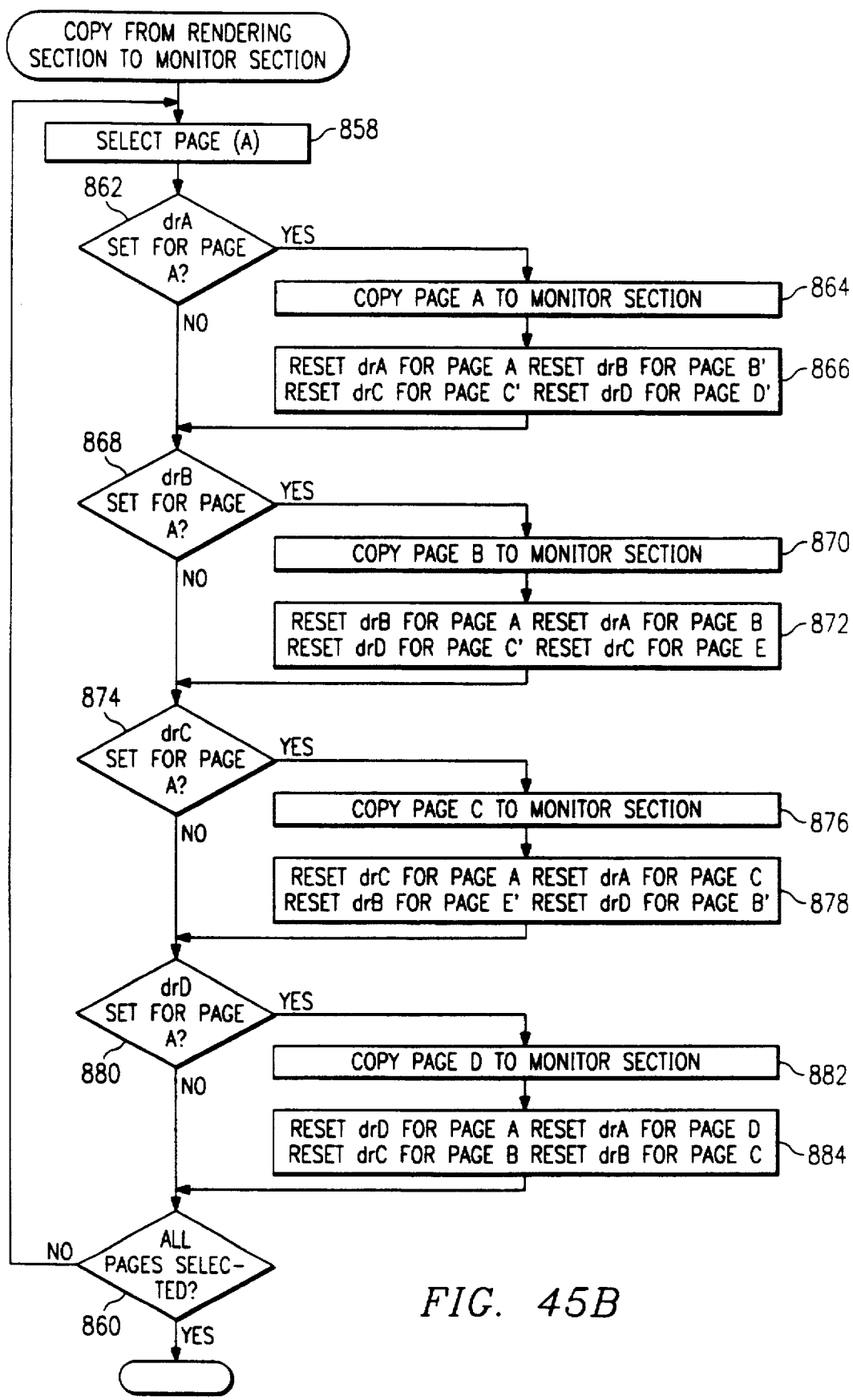

The monitoring section 830 of the VRAM is then to be updated, the address processor 310 carries out the process shown in FIG. 45B. In the loop of steps 858 and 860, all of the pages of the rendering section which may possibly need to be copied are selected one-by-one. In step 862, bit 3 (drA) of the selected page (A) is tested, and if set page A is copied to the monitoring section in step 864, and in step 866 bit 3 (drA) for page A, bit 2 (drB) for page B' to the left of page A, bit 1 (drC) for page C' below page A and bit 0 (drD) for page D' to the left and below page A are reset. In step 868, bit 2 (driB) of page A is tested, and if set page B relative to page A is copied to the monitoring section in step 870, and in step 872 bit 2 (drB) of page A and bit 3 (drA) for page B to the right of page A, bit 0 (drD) for page C' below page A, and bit 1 (drC) for page E below and to the right of page A are reset. Somewhat similar steps 874 to 884 are performed for bits 1 and 0 (drC, drD), as shown in FIG. 45B, and if set the respective page C or D is copied to the monitoring section and various bits are reset as shown. It will therefore be appreciated that when this process is carried out with the dirty flags in the state as shown in column 902 of FIG. 44, all four pages P to S are copied to the monitoring section of the VRAM, and the dirty flags attain the states as shown in column 904.

In the first rendering operation, page Q only is modified, and it will therefore be appreciated that the circuit of FIG. 43 serves to set bit 7 (dsA) and bit 3 (drA) for page Q, as shown in column 906 of FIG. 44.

The monitoring section of the VRAM is again updated in accordance with the process of FIG. 45B. The only dirty render flag bit set is drA for page Q, and therefore only page Q is copied, and the bit drA for page Q is reset, as shown in column 908.

In the second rendering operation, page P is modified, and also a misaligned patch in page P modifies page Q. As a result, bits 7, 6, 3 and 2 (dsA, dsB, drA, drB) of the page P dirty flag are set, as shown in column 910. Because bits drA and drB for page P are set, pages P and Q are copied to the monitoring section by the process of FIG. 45B, and bits 3 and 2 (drA, dr8) for page P are then reset, as shown in column 912.

In the third rendering operation, pages Q and S are modified. As a result, bits 7 and 3 (dsA, drA) of the page S flag are set; bit 3 (drA) of the page Q flag is set, and bit 7 (dsA) of the page Q flag remains set, as shown in column 914. Because bits 3 (dr.A) of pages Q and S are set, pages Q and S are copied to the monitoring section of the VRAM, and these bits are then reset, as shown in column 916.

Figure 45C:
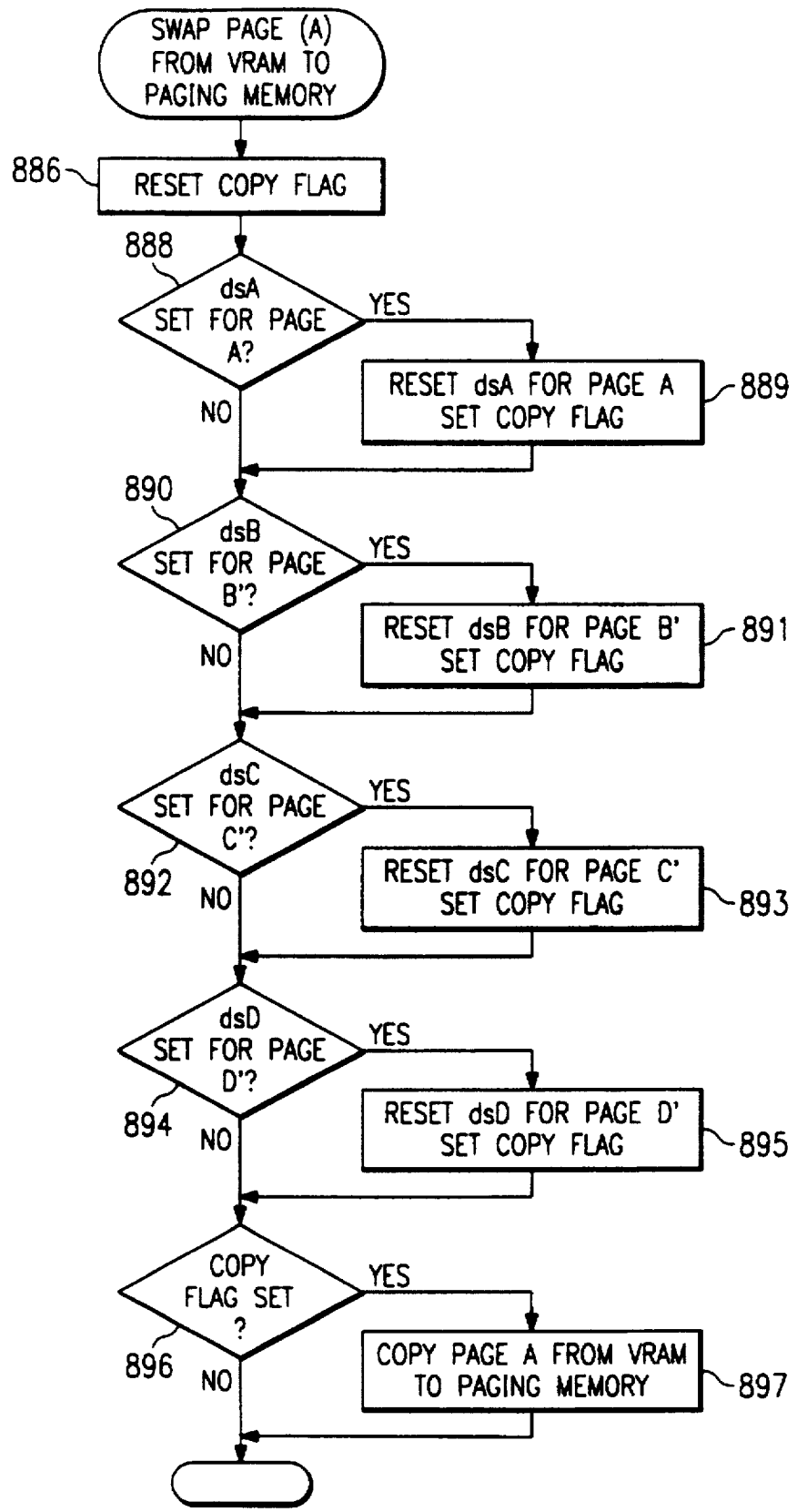

When the pages P to S are to be replaced, the address processor performs the process of FIG. 45C for each selected page to be replaced. In step 886, a copy flag is reset. Then in step 888, it is determined whether bit 7 (dsA) for page A is set, and if so in step 889 that bit is reset and the copy flag is set. Steps 888 and 889 are then repeated as steps 890 to 895 for bits 6, 5 and 4 (dsB, dsC, dsD) respectively of the dirty page flags for pages B', C' and D' relative to page A. Then in steps 896 and 897, if the copy flag has been set, page A is copied to the paging memory.

Referring back to column 916 of FIG. 44, it will be appreciated that as a result of performing the process of FIG. 45C for page P, this page is copied to the paging memory because dsA is set for page P (step 888). This is then reset (step 889). Page Q is copied to the paging memory because dsA is set for page Q (step 888). Even if it were not, page Q would be copied because dsB is set for page P (step 890). The flag bits dsA for page Q and dsB for page P are also reset (steps 889 and 891). Page R is not copied because none of dsA for page R (step 888), dsB for page Q (step 890), and dsC and dsD for the pages below, and below and to the left, of page R (step 892 and 894) are set. Page S is copied because dsA is set for page S (step 888). This bit is then reset (step 889). Accordingly, pages P, R and S are copied back to paging memory, and the flags attain the status shown in column 918 of FIG. 44.

CONDITIONAL PROCESSING

The processors 606(0) to (15) of the grid processor 312 described above are arranged basically as a SIMD array, SIMD standing for 'Single Instruction—Multiple Data' and meaning that all of the processors receive the same instruction and apply it to their own particular data elements. This can be an efficient and simple way of obtaining good performance from a parallel-processing machine, but it does assume that all of the data elements need exactly the same instruction sequence. However, the processors are preferably arranged, as described below, to be able to deal with conditional instructions. Further detail of such an arrangement is shown in FIG. 49.

Figure 49:
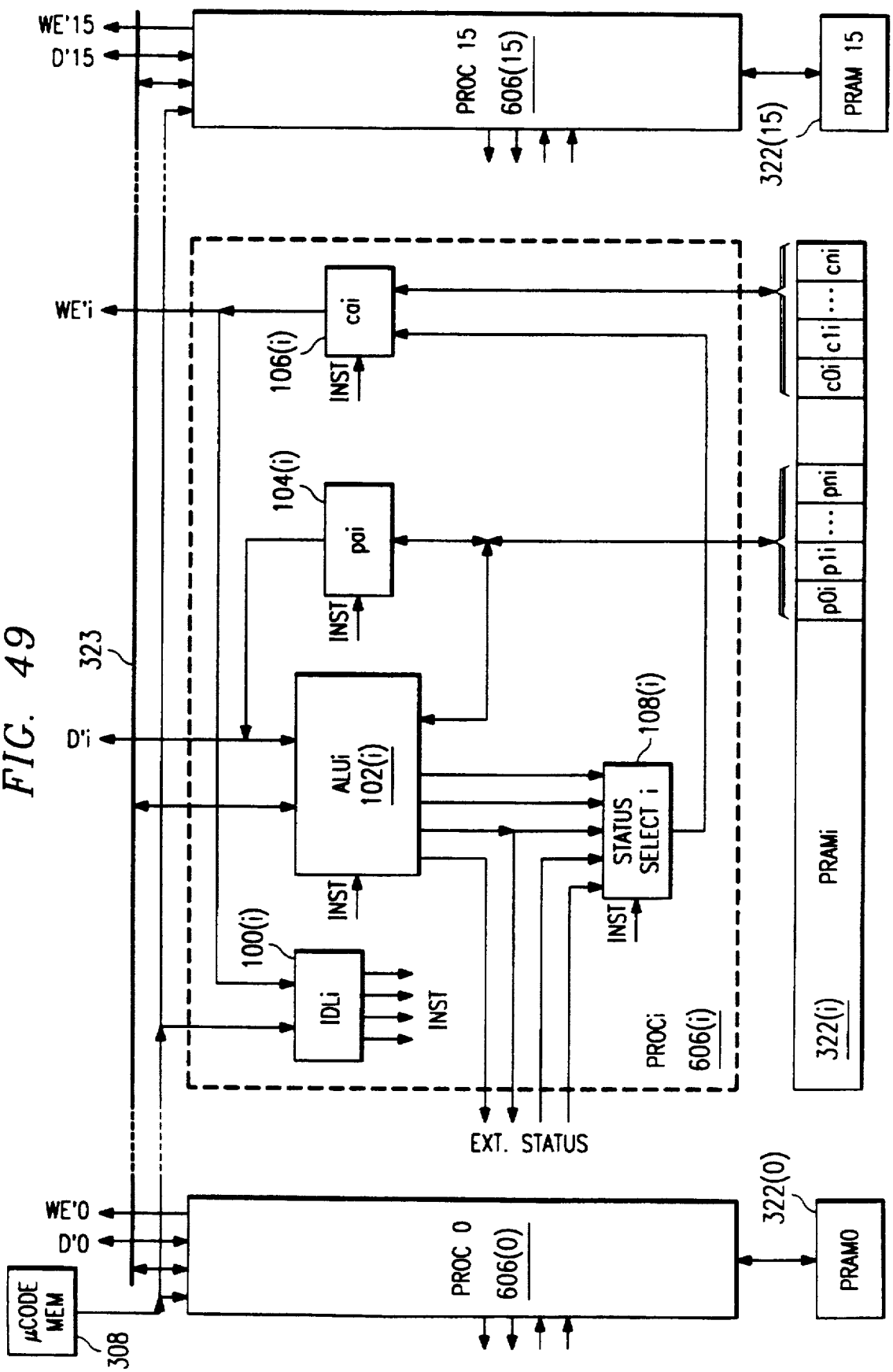
FIG. 49 is a schematic diagram of the processors and a microcode memory, with one of the processors shown in detail.

FIG. 49 shows three of the processors PROC 0, PROC i and PROC 15, with PROC i being shown in greater detail, their PRAMs 322(0), (i), (15), the microcode memory 308 and the processing section broadcast bus 323. The microcode memory 308 supplies microcode instructions of about 90 bits to each respective instruction decode logic (IDL) circuit 100 in each of the processors. The same microcode instruction is supplied to each processor. The instruction decode logic is provided by a gate array which decodes the 90 bit instruction to provide about 140 control bits to various elements in the respective processor including an arithmetic logic unit ALU 102, a 32-bit pixel accumulator (pa) 104, a 1-bit condition accumulator (ca) 106 and a status select circuit 108 which is provided by a gate array. The ALU 102 connects with the data bus D' via the exchange 326 to the VRAM 700, the pa 104 and a stack of pixel registers p0 to pn in the PRAM 322. The main data paths for pixel data are from the data bus D' to the ALU 102 and the pa 104; from the pa 104 to the ALU 102, the data bus D' and selected pixel registers p0 to pn; from the ALU 102 to the data bus D' and the pa 104; and from selected pixel registers p0 to pn to the ALU 102. Various status bits are output from the ALU 102 to the status select circuit 108, such as a "negative" bit, a "zero" bit and an "overflow" bit. Some of these status bits are also fed out externally. Also, external status bits such as the EN flag (see FIGS. 22, 23) are fed in to the status select circuit 108. Under control of the IDL 100, the status select circuit 108 can select a respective status bit and output it to the ca 106. The ca 106 is associated with a stack of condition registers c0 to cn in the PRAM 322. The ca 106 also connects to the IDL 100 and provides the write enable output WE' of the processor, The main paths for condition and status bits are: from the ALU 102 to the status select circuit 108 and to the external outputs; from the external inputs to the status select circuit 108; from the status select circuit 108 to the ca 106; from the ca 106 to the condition stack registers c0 to cn, the write enable output WE' and the ALU 102; and from the condition stack registers c0 to cn to the ca 106.

Figure 50A:
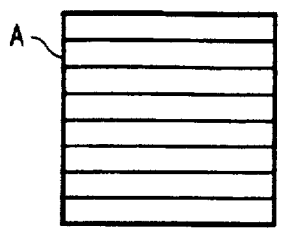
FIGS. 50A to 50D illustrate three images (FIGS. 50A to C) which are, processed to form a fourth image (FIG. 50D)
Figure 50B:
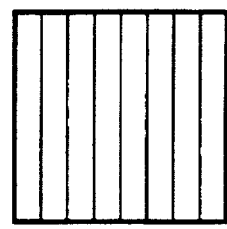
Figure 50C:
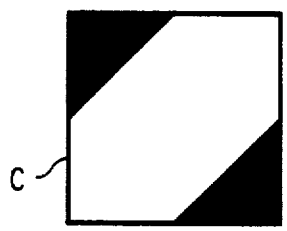

The 1-bit input from the ca 106 to the IDL 100 is important. This input condition bit enables the IDL 100 to modify the control outputs from the IDL 100 in dependence upon the value of the condition bit, and accordingly the arrangement provides direct support for microcode instructions from the microcode memory 308 to the IDL 100 which in high-level language would be represented by, for example, if (condition) then (operation X) else (operation Y). As an example, reference is made to FIGS. 50A to 50D. Suppose that the VRAM 700 contains three images: image A of FIG. 50A which in this simple example is a rectangle of horizontal lines; image B of FIG. 50B which is a rectangle of vertical lines; and image C of FIG. 50C which is a mask in which the upper-left and lower-right corners are black (say pixel values of 0) and the remainder is white (say pixel values of ($2^{32}$-1). In the example, it is desired to combine images A and B using image C as a mask to form an output image D such that image A appears where the mask image C is black and image B appears where the mask image C is white. The process performed by the processors under control of the microcode instructions from the microcode memory 308 to perform this operation can be considered, using high-level pseudo-language, to be as follows:

```
1.  For each patch (x,y) in the rectangle:
2.    If pixel in rectangle, ca = 1, else ca = 02.
3.    c0 = ca
4.    pa = A(x,y)
5.    p0 = pa
6.    pa = B(x,y)
7.    p1 = pa
```

```
a.    pa = C(x,y)
9.    ca = zero-status (pa)
10.   If ca = 1 then pa = p0 else pa = p1
11.   ca = c0
12.   D(x,y) = pa
13. Next patch
```

In the above, steps 1 and 13 set up a loop for each patch (x,y) having its origin in the rectangle. For each patch, each processor PROC 0 to PROC 15 will process a different pixel in the patch. In step 2 a test is made to determine whether the particular processor's pixel in the patch is in the rectangle, and if so the ca 106 is set, otherwise it is reset. This value of ca will form the write-enable signal WE'. In step 3, this value which is stored in the ca 106 is put onto the condition stack in c0 and an associated condition stack pointer is modified accordingly. In step 4, the value of the processor's pixel in the current selected patch in image A is loaded into the pa 104, and in step 5 is transferred to the p0 register. Similarly in step 6, the value of the processor's pixel in the current selected patch in image B is loaded into the pa 104, and in step 7 is transferred to the p1 register. In step 8, the value of the processor's pixel in the current selected patch in the mask image C is loaded into the pa 104, and then in step 9 the zero status bit of the ALU 102 is selected by the status select circuit 108 and is loaded into the ca 106. Thus, if the pixel in-the mask image is black, the ca 106 value becomes 1, and if it is white, the ca 106 value becomes 0. The next step 10 is a conditional instruction "If ca=1 then pa=p0 else pa=p1". The IDL 100 modifies this instruction in dependence upon the value in the ca 106 so that it becomes simply "pa=p0" or "pa=p1" and the modified instruction is used by the processor. In step 11, the signal which was put onto the condition stack at c0 in step 3 is pulled off the stack and placed in the ca 106 in order to constitute the write enable signal WE' and the condition stack pointer is modified accordingly. Lastly, in step 12, the pixel value in the pa 104 is transferred out to the image D at the appropriate pixel position for the processor in the current selected patch.

Figure 50D:
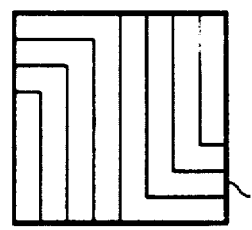

As a result of the above operations carried out by the processors on the pixels of all of the patches in the rectangle, an image D is formed as shown in FIG. 50D.

In the above simple example, the condition stack c0 to cn was used simply to store the initially generated value which will form the write enable signal, and only one register in the stack was employed. By virtue of the provision of more than one register in the condition stack, nesting of the conditional instructions is permitted.

PAGE FILING SYSTEM

Figure 51:
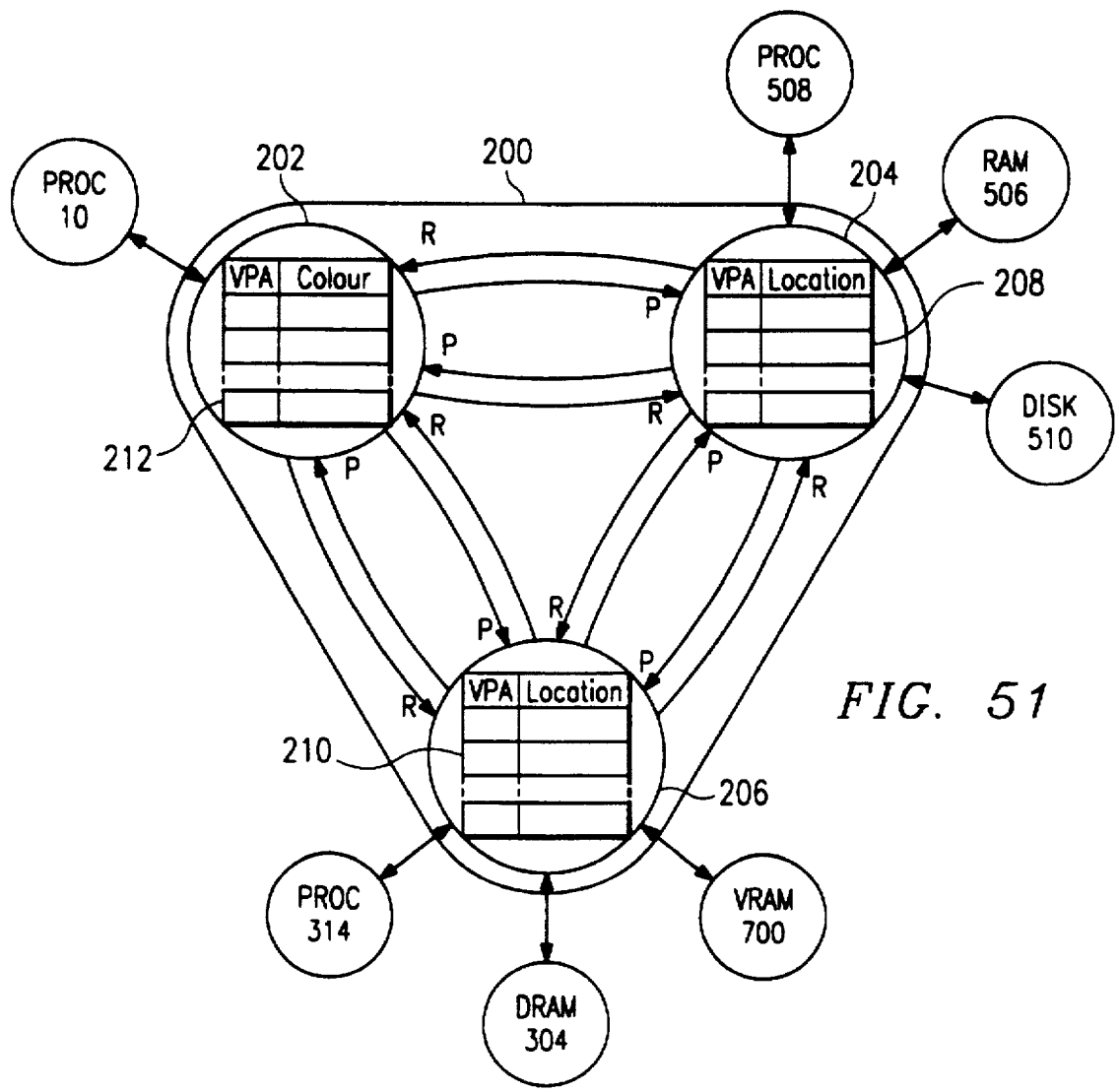
FIG. 51 is a system diagram showing in particular a page filing system.

As described above, pages of data can be swapped between the VRAM 700, on the one hand, and the paging memory comprising the DRAM 304 (FIG. 4), and the paging RAM 504 and fast disk 510 (FIG. 5), on the other hand. There now follows a description of how pages are handled as between the VRAM and the paging memory, with reference to the system diagram of FIG. 51

The total system is based on a distributing operating system denoted by the triangle 200. Part of this system constitutes a host page manager module 202 running on the processor 10 of the host computer. Another part constitutes a front-end page manager module 204 running on the i960 control processor 508 of the front-end board 22 and handling the paging RAM 504 and fast disk 510. A further part constitutes a renderer page manager module 206 running on the i960 control processor 314 of the renderer board 16 and handling the VRAM 700 and the DRAM 304. Each of these page manager modules 202, 204, 206 can make a request R to any other module for a page P of image data specified by the virtual page address (VPA) consisting of the following bits of the virtual address:

| 32–47 | Image ID component |
|-------|--------------------|
| 25–31 | Y superpage component |
| 23, 24 | Y page component |
| 9–15 | X superpage component |
| 7, 8 | X page component |

In response, the module to which a request R is made determines whether it is responsible for the requested page, and if so it transfers the page of data P and responsibility therefor to the requesting module, but if not it indicates to the requesting module that it is not responsible for the requested page.

To give two examples of how the filing system would be used, suppose that the page fault table 794 (FIG. 21) of the renderer has generated a page fault in respect of a particular page, this page fault is handled by the renderer page manager module 206. Firstly, the module 206 checks with itself whether the required page is stored in the renderer DRAM 304, and if so swaps the page of data into the VRAM 700. If not, the module 206 checks with the front-end page manager module 204 whether it is responsible for the page, and, if so, the page of data is swapped from the RAM 506 or disk 510, as appropriate, into the VRAM 700. If the front-end module 204 is not responsible, the renderer module 206 asks the host module 202 for the page of data, which is then swapped into the VRAM 700. As another example, suppose that the system is to be closed down and a complete image is to be saved to disk 510. Such saving of an image is handled by the front-end module 204. For each page in the image the module 204 firstly checks with itself whether it is responsible for that page. If it is and the page is already stored on the disk stays there, and if the page in question is stored in the front-end RAM 506 the data of that page is copied to the disk 510. If the module 204 is not responsible, it checks with the renderer module 206 whether the renderer module has responsibility for the page, and, if so, the page of data is copied from the VRAM 700 or DRAM 304 of the renderer to the disk 510. If not, the front-end module 204 requests the page in question from the host module 202, and the page of data is transferred to the disk 510.

In order to keep track of the pages for which they are responsible, the front-end module 204 and the renderer module 206 each maintain a table 208, 210 containing a list of the virtual page addresses of the pages, and against each address an indication of the location of that page. For example, the location data in the front-end table 208 would comprise an indication of whether the page is in the RAM 506 or on the disk 510. If in the RAM 506, the physical address of that page in the RAM would be included, and if on the disk 510, an indication of the location on the disk would be included. The location data for each virtual page address in the renderer table 210 may contain an indication of whether the page is in the DRAM 304 or the VRAM 700 and the physical address of the page in the respective memory. In the case of a page in the VRAM 700, the physical address of the page need not necessarily be kept in the table 210, because this address can be determined by the module 206 from the CAM 754 and the page table 756 (FIG. 15A) of the address translator 740, and indeed it i not necessary for the table 210 to include the virtual page address of the pages in the VRAM 700, because the module can check whether a page is present by referring to the CAM 754 and page table 756 and testing whether or not a page fault is generated.

An important feature of the filing system, in the preferred embodiment, is that the host page manager module 202 is not responsible for the storage of whole pages of data. The host module 202 is used when an image is initially created. The image is specified by the host processor 10 as being of a particular dimension, size, bit width (see FIGS. 25 to 41) and background colour. In response, the system software 200 allocates to that image the next available image ID (bits 32 to 47 of the virtual address). Until any rendering operations or copying operations are carried out on the image, the colour of every pixel in the new image is the background colour, and the host module 202 therefore merely sets up a table 212 containing the virtual page address of the or each page required in the new image, and against the or each page address the table 212 contains the 32-bit background colour of the image. There is no need for this 32-bit word of data for the page to be expanded into a full page of data, for example 16 k words, until the page is transferred to the control of one of the other modules 204, 206. Accordingly, when one of the other modules requests a page from the host module 202, the host module 202 determines from its table 212 the 32-bit background colour of that page, and then repeatedly sends that 32-bit word to the requesting module, once for each pixel in the page.

In the above description, it is assumed that only one of the modules 202, 204, 206 has responsibility for any given page at any given time and that when a page of data is transferred from one module to another, the sending module cancels the entry for that page from its table 212, 208, 210 and that the receiving module makes an entry in its table for the page. It will be appreciated that the dirty page-swap scheme described with reference to FIGS. 42 to 45 above will not be effective if the filing system operates in this way, because when, for example, a page is swapped from the disk 510 to the VRAM 700, the entry for that page is cancelled from the table 208 of the front-end module 204, and so even if the page is not dirtied in the VRAM 700, it would be necessary to swap all of the data-elements of the page back to the disk 510.

The filing system described above may be modified so that it works in conjunction with the dirty page-swap scheme, by including against each virtual page address in each table 208, 210, 212 a bit indicating whether that page is current. The operation of each module 202, 204, 206 is then modified so that when a module has responsibility for a page, the current bit is set 1 and when responsibility is transferred to a different module the current bit is reset to zero. Furthermore, when a page which has not be dirtied is to be swapped out of the VRAM 700, the renderer module 206 polls the other modules 202, 204 to check which has an entry in its tattle for the page with the current bit reset, and instructs that module to set the current bit, obviating the need to copy all of the data-elements for that page from the renderer module to the other module.

In the above arrangement, a single word representing the image background colour is stored for each new image. Rather than storing a single word, a few words may be stored, for example as a patch, and representing, for example, a pattern which is to be repeated in the new image.

MODIFICATIONS AND DEVELOPMENTS

Although preferred embodiments of the invention have been described above, it will be appreciated that many modifications and developments may be made within the scope of the invention. To take a few examples, the non-split-level patches, pages and superpages described above are two-dimensional and have a pixel resolution of 32-bits, a patch size of 4 pixels×4 pixels, a page size of 32 patches× 32 patches, and a superpage size of 4 pages×4 pages. It will be appreciated that the system may be configured so as to operate for example with one- or three-dimensional patches, and/or pages and/or superpages, with patches, pages and superpages of different sizes, and with different pixel resolutions. Furthermore, the system may be arranged to operate selectably in different configurations through appropriate use of funnel shifters, switches and the like. In the above description, examples of specific sizes of the memories have been given, but it will be appreciated that other sizes may be used. In the split level patch system, division into two and four in the X direction has been illustrated, but it will be appreciated that other divisors may alternatively or selectably be employed, that division in other directions may alternatively or selectably be employed, and that division on a pixel basis rather than a patch basis may alternatively or selectably be employed. The dirty page facility described above deals with copying between the rendering section and monitoring section of the VRAM and also with swapping between the VRAM and the paging memory, but it will be appreciated that either of these two features may be employed without the other. In the page filing system, the page manager modules are run on specific processors, but it will be appreciated that each page manager module may be run on different processors, and that the modules may be combined.

RELATED APPLICATIONS

This application is one of a series of eight applications filed the same day under filing numbers PCT/GB90/01209, PCT/GB90/01210, PCT/GB90/01211, PCT/GB90/01212, PCT/GB90/01213, PCT/GB90/01214, PCT/GB90/01215 and PCT/GB90/01216, and with agent's references PCT 98 1, PCT 99 1, PCT 100 1, PCT 101 1, PCT 102 1, PCT 103 1, PCT 104 1 and PCT 105 1, and the disclosures of the other applications are incorporated herein by reference as if printed below in full.

I claim:

1. A data-array processing system, comprising:

a first memory for storing an array of data elements;

a processor configured and connected to perform a series of processing operations on data-elements stored in a first section of said first memory and to perform a copying operation after each processing operation in which data-elements are copied from said first section to a second section of said first memory; and output hardware configured to output the data-elements in said second section of said first memory;

wherein said processor sets, during said processing operation, a respective flag indicative of each of a plurality of portions of said first section which is modified during said processing operation, and copies, during said copying operation, only each flagged portion.

2. A system as claimed in claim 1, wherein after each copying operation, each set flag is reset.

3. A system as claimed in claim 1, wherein said data-elements are stored in said first memory as a plurality of aligned pages, and wherein a respective flag is provided for each page of data-elements in the first section of said first memory.

4. A system as claimed in claim 3, further comprising a second memory, wherein said processor transfers data-elements between said first memory and said second memory page-by-page, and wherein said processor, contemporaneously with a processing operation, sets a respective second flag indicative of each said page of data-elements which has been modified since that page has been stored in said first memory, and wherein, when said page in said first memory is to be replaced by a further page from said second memory, said processor first copies said page of data elements in said first memory to said second memory only if said respective second flag is set.

5. A system as claimed in claim 4, wherein upon each copying operation of a page of data-elements from said second memory to said first memory, the second flag for that page of data-elements is reset.

6. A system as claimed in claim 1, wherein each page of data-elements is arranged in physical locations of said first memory as a plurality of aligned patches of data-elements, wherein said processor performs said processing operations on said patches of data-elements stored in said first memory so that at least some processed patches comprise data-elements from more than one patch, wherein each first flag has associated therewith at least one further flag which is set when one of said processed patches has data-elements in a respective further patch, and wherein said processor, during said copying operation from said first section to said second section of said first memory, also copies each flagged further group of data-elements.

7. A system as claimed in claim 1, wherein said first memory comprises a video RAM.

8. A system as claimed in claim 7, wherein said output hardware includes a video monitor.

9. A system as claimed in claim 1, wherein said data-elements are pixel data.

10. The system of claim 1, wherein said data elements comprise pixel data.

11. The system of claim 1, wherein said data elements comprise texel data.

12. The system of claim 1, wherein said output hardware includes a video processor.

13. The system of claim 4, wherein said second memory comprises a DRAM.

14. The system of claim 4, wherein said second memory comprises a virtual memory.

15. The system of claim 4, wherein virtual addressing is used when tranferring said data elements between said first and said second memory.

16. The system of claim 4, wherein a second flag bit indicates whether said data elements in said first section of said first memory is copied to said second section of said first memory or to said second memory.

17. The system of claim 4, wherein said data elements comprise pixel data.

18. The system of claim 4, wherein said data elements comprise texel data.

19. The system of claim 4, wherein said output hardware includes a video processor.

20. The system of claim 3, wherein said data elements in said first memory comprise at least four aligned pages.

* * * * *